(12) United States Patent
Klug et al.

(10) Patent No.: US 11,977,230 B2
(45) Date of Patent: May 7, 2024

(54) VIRTUAL AND AUGMENTED REALITY DISPLAY SYSTEMS WITH EMISSIVE MICRO-DISPLAYS

(71) Applicant: Magic Leap, Inc., Plantation, FL (US)

(72) Inventors: Michael Anthony Klug, Austin, TX (US); Evgeni Poliakov, San Mateo, CA (US); Jahja I. Trisnadi, Cupertino, CA (US); Hyunsun Chung, Weston, FL (US); Lionel Ernest Edwin, Hollywood, FL (US); Howard Russell Cohen, Weston, FL (US); Robert Blake Taylor, Porter Ranch, CA (US); Andrew Ian Russell, Weston, FL (US); Kevin Richard Curtis, Boulder, CO (US); Clinton Carlisle, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 265 days.

(21) Appl. No.: 17/418,687

(22) PCT Filed: Dec. 20, 2019

(86) PCT No.: PCT/US2019/067824
§ 371 (c)(1),
(2) Date: Jun. 25, 2021

(87) PCT Pub. No.: WO2020/139755
PCT Pub. Date: Jul. 2, 2020

(65) Prior Publication Data
US 2022/0050298 A1    Feb. 17, 2022

Related U.S. Application Data

(60) Provisional application No. 62/911,018, filed on Oct. 4, 2019, provisional application No. 62/800,363, filed
(Continued)

(51) Int. Cl.
*G02B 27/01* (2006.01)
*G02B 6/26* (2006.01)
(Continued)

(52) U.S. Cl.
CPC ......... *G02B 27/0172* (2013.01); *G02B 6/262* (2013.01); *G02B 27/0176* (2013.01);
(Continued)

(58) Field of Classification Search
CPC .......................... G02B 27/0172; G02B 6/262; G02B 27/0176; G02B 27/0972; G02B 27/18;
(Continued)

(56) References Cited

U.S. PATENT DOCUMENTS 6,188,382 B1    2/2001  Okamura et al.
6,850,221 B1    2/2005  Tickle
(Continued)

FOREIGN PATENT DOCUMENTS

JP    2013160929 A    8/2013
JP    2015148782 A    8/2015
(Continued)

OTHER PUBLICATIONS

International Search Report and Written Opinion for PCT Application No. PCT/US2019/067824, dated Apr. 9, 2020.
(Continued)

*Primary Examiner* — Chong Wu
(74) *Attorney, Agent, or Firm* — Tobias Intellectual Property Law, PLLC

(57) ABSTRACT

A wearable display system includes one or more emissive micro-displays, e.g., micro-LED displays. The micro-displays may be monochrome micro-displays or full-color micro-displays. The micro-displays may include arrays of light emitters. Light collimators may be utilized to narrow the angular emission profile of light emitted by the light
(Continued)

emitters. Where a plurality of emissive micro-displays is utilized, the micro-displays may be positioned at different sides of an optical combiner, e.g., an X-cube prism which receives light rays from different micro-displays and outputs the light rays from the same face of the cube. The optical combiner directs the light to projection optics, which outputs the light to an eyepiece that relays the light to a user's eye. The eyepiece may output the light to the user's eye with different amounts of wavefront divergence, to place virtual content on different depth planes.

19 Claims, 47 Drawing Sheets

Related U.S. Application Data on Feb. 1, 2019, provisional application No. 62/786,199, filed on Dec. 28, 2018.

(51) Int. Cl.
*G02B 27/09* (2006.01)
*G02B 27/18* (2006.01)
*G02B 27/30* (2006.01)
*G02B 27/40* (2006.01)
*G02B 27/62* (2006.01)
*G09G 3/00* (2006.01)
*G09G 3/32* (2016.01)
*H02N 2/02* (2006.01)
*G02B 27/10* (2006.01)
*G02B 27/14* (2006.01)

(52) U.S. Cl.
CPC ......... *G02B 27/0972* (2013.01); *G02B 27/18* (2013.01); *G02B 27/30* (2013.01); *G02B 27/40* (2013.01); *G02B 27/62* (2013.01); *G09G 3/002* (2013.01); *G09G 3/32* (2013.01); *H02N 2/028* (2013.01); *G02B 6/26* (2013.01); *G02B 2027/0112* (2013.01); *G02B 2027/0154* (2013.01); *G02B 2027/0178* (2013.01); *G02B 27/102* (2013.01); *G02B 27/149* (2013.01); *G09G 2310/08* (2013.01); *G09G 2340/0407* (2013.01)

(58) Field of Classification Search
CPC ........ G02B 27/30; G02B 27/40; G02B 27/62; G02B 6/26; G02B 27/102; G02B 27/149; G02B 2027/0112; G02B 2027/0154; G02B 2027/0178; G09G 3/002; G09G 3/32; G09G 2310/08; G09G 2340/0407; H02N 2/028
See application file for complete search history.

(56) References Cited

U.S. PATENT DOCUMENTS

| | | | |
|---|---|---|---|
| 9,858,637 | B1 | 1/2018 | Quach et al. |
| 11,567,320 | B2 | 1/2023 | Cheng et al. |
| 2006/0028436 | A1 | 2/2006 | Armstrong |
| 2007/0081123 | A1 | 4/2007 | Lewis |
| 2012/0127062 | A1 | 5/2012 | Bar-Zeev et al. |
| 2012/0162549 | A1 | 6/2012 | Gao et al. |
| 2012/0188245 | A1 | 7/2012 | Hyatt |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0242555 | A1 | 9/2013 | Mukawa |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2017/0131460 | A1 | 5/2017 | Lin et al. |
| 2017/0139211 | A1 | 5/2017 | Trail |
| 2017/0193701 | A1 | 6/2017 | Liu |
| 2017/0236466 | A1 | 8/2017 | Spitzer et al. |
| 2017/0255262 | A1 | 9/2017 | Liu |
| 2017/0293145 | A1 | 10/2017 | Miller et al. |
| 2017/0329075 | A1 | 11/2017 | Yeoh et al. |
| 2017/0329140 | A1* | 11/2017 | Yeoh .................. G02B 6/0035 |
| 2018/0017801 | A1 | 1/2018 | Chang et al. |
| 2018/0019233 | A1 | 1/2018 | Chang et al. |
| 2018/0113311 | A1 | 4/2018 | Klug et al. |
| 2018/0140942 | A1 | 5/2018 | Miller et al. |
| 2018/0210195 | A1 | 7/2018 | Chee et al. |
| 2018/0277523 | A1 | 9/2018 | Ahmed et al. |
| 2018/0284428 | A1 | 10/2018 | Guenter |
| 2018/0341111 | A1 | 11/2018 | Karvonen et al. |

FOREIGN PATENT DOCUMENTS

| | | |
|---|---|---|
| WO | WO 2017/152710 | 9/2017 |
| WO | 2018039586 A1 | 3/2018 |
| WO | 2018152337 A1 | 8/2018 |
| WO | 2018184837 A1 | 10/2018 |
| WO | WO 2020/139755 | 7/2020 |

OTHER PUBLICATIONS

International Preliminary Report on Patentability for PCT Application No. PCT/US2019/067824, dated Jun. 16, 2021.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
JP2021-537777 Official Action dated Dec. 1, 2023.

\* cited by examiner

VIRTUAL AND AUGMENTED REALITY DISPLAY SYSTEMS WITH EMISSIVE MICRO-DISPLAYS

PRIORITY CLAIM

This application is a US national phase of International Patent Application No. PCT/US2019/067824 filed on Dec. 20, 2019, which claims priority from: U.S. Provisional Application No. 62/800,363 filed on Feb. 1, 2019 and titled "VIRTUAL AND AUGMENTED REALITY DISPLAY SYSTEMS WITH EMISSIVE MICRO-DISPLAYS"; U.S. Provisional Application No. 62/911,018 filed on Oct. 4, 2019 and titled "AUGMENTED AND VIRTUAL REALITY DISPLAY SYSTEMS WITH SHARED DISPLAY FOR LEFT AND RIGHT EYES"; and U.S. Provisional Application No. 62/786,199 filed on Dec. 28, 2018 and titled "LOW MOTION-TO-PHOTON LATENCY ARCHITECTURE FOR AUGMENTED AND VIRTUAL REALITY DISPLAY SYSTEMS". The above-noted applications are hereby incorporated by reference herein in their entireties.

INCORPORATION BY REFERENCE

This application incorporates by reference the entireties of each of the following: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. Patent App. Pub. No. 2018/0061121, published Mar. 1, 2018; U.S. patent application Ser. No. 16/221,065, filed Dec. 14, 2018; U.S. Patent App. Pub. No. 2018/0275410, published Sep. 27, 2018; U.S. Provisional Application No. 62/786,199, filed Dec. 28, 2018; and U.S. application Ser. No. 16/221,359, filed on Dec. 14, 2018; U.S. Provisional Application No. 62/702,707, filed on Jul. 24, 2018; and U.S. application Ser. No. 15/481,255, filed Apr. 6, 2017.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

Some embodiments include a head-mounted display system. The display system comprises a head-mountable frame, a plurality of emissive micro-displays supported by the frame, and an eyepiece supported by the frame. The emissive micro-displays are configured to output image light. The eyepiece is configured to receive the image light from the emissive micro-displays and to direct the image light to an eye of a user upon mounting the frame on the user.

Some other embodiments also include a head-mounted display system. The display system comprises an emissive micro-display comprising an array of light emitters corresponding to pixels, and a waveguide assembly comprising one or more waveguides. The array of light emitters is configured to define images. Each waveguide of the waveguide assembly comprises an in-coupling optical element configured to incouple light from the micro-display into the waveguide; and an out-coupling optical element configured to outcouple incoupled light out of the waveguide. The waveguide assembly is configured to output the outcoupled light with variable amounts of wavefront divergence corresponding to a plurality of depth planes.

Some other embodiments also include a head-mounted display system. The display system comprises a head-mountable frame, an emissive micro-display supported by the frame and comprising an array of groups of micro-emitters, a micro-lens array proximate the array of groups of micro-emitters, and a projection lens structure configured to receive light from the micro-lens array. Each group of micro-emitters of the array of groups of micro-emitters comprises a first micro-emitter configured to emit light of a first color; a second micro-emitter configured to emit light of a second color; and a third micro-emitter configured to emit light of a third color. Each group of micro-emitters also has an associated micro-lens encompassing the micro-emitters of the group of micro-emitters.

Some further embodiments include an emissive micro-display system. The micro-display system comprises an array of light emitters comprising lines of the light emitters. Light emitters of each line are: elongated along an axis crossing the lines and configured to emit light of a same color. Multiple lines of the light emitters constitute a group of lines. Each line of a group of lines is configured to emit light of a different color than at least one other line of a group of lines.

Some additional examples of embodiments are provided below.

Example 1. A head-mounted display system comprising:
a head-mountable frame;
a plurality of emissive micro-displays supported by the frame, wherein the emissive micro-displays are configured to output image light; and
an eyepiece supported by the frame, wherein the eyepiece is configured to receive the image light from the emissive micro-displays and to direct the image light to an eye of a user upon mounting the frame on the user.

Example 2. The head-mounted display system of Example 2, further comprising an X-cube prism, wherein each of the emissive micro-displays face a different side of the X-cube prism.

Example 3. The head-mounted display system of Example 2, wherein an output side of the X-cube prism faces the eyepiece.

Example 4. The head-mounted display system of any one of Examples 1-3, wherein the emissive micro-displays are monochrome micro-displays.

Example 5. The head-mounted display system of any one of Examples 1-4, wherein the emissive micro-displays comprise arrays of micro-LED's.

Example 6. The head-mounted display system of any one of Examples 1-3, further comprising a plurality of arrays of light collimators, wherein each micro-display has an associated array of light collimators, and wherein each array of light collimators is configured to capture and reduce an angular emission profile of light from the micro-display.

Example 7. The head-mounted display system of Example 6, wherein each micro-display comprises an array of light emitters, wherein each light emitter has an associated light collimator.

Example 8. The head-mounted display system of any one of Examples 6-7, wherein the light collimators comprise micro-lenses.

Example 9. The head-mounted display system of any one of Examples 6-7, wherein the light collimators comprise nano-lenses.

Example 10. The head-mounted display system of any one of Examples 6-7, wherein the light collimators comprise reflective wells.

Example 11. The head-mounted display system of any one of Examples 6-7, wherein the light collimators comprise metasurfaces.

Example 12. The head-mounted display system of any one of Examples 6-7, wherein the light collimators comprise liquid crystal gratings.

Example 13. The head-mounted display system of any one of Examples 1-12, wherein each micro-display comprises rows of light emitters, wherein some rows of light emitters emit light of different colors than other rows light emitters, wherein light emitters of each row emit light of a same color.

Example 14. The head-mounted display system of Example 13, wherein the light collimators comprise gratings elongated along a long axis of an associated row of light emitters.

Example 15. The head-mounted display system of any one of Examples 1-14, further comprising a waveguide assembly comprising one or more waveguides, each waveguide comprising:
an in-coupling optical element configured to incouple light from the micro-display into the waveguide; and
an out-coupling optical element configured to outcouple incoupled light out of the waveguide.

Example 16. The head-mounted display system of Example 15, wherein the waveguide assembly is configured to output the outcoupled light with variable amounts of wavefront divergence corresponding to a plurality of depth planes.

Example 17. The head-mounted display system of any one of Examples 15-16, wherein the waveguide assembly comprises a plurality of sets of waveguides, wherein each set of waveguides comprises a dedicated waveguide for a component color, wherein each set of waveguides comprises out-coupling optical elements configured to output light with wavefront divergence corresponding to a common depth plane, wherein different sets of waveguides output light with different amounts of wavefront divergence corresponding to different depth planes.

Example 18. The head-mounted display system of Example 16, further comprising variable focus lens elements, wherein the waveguide assembly is between first and second variable focus lens elements, wherein the first variable focus lens element is configured to modify a wavefront divergence of light outputted by the waveguide assembly, wherein the second variable focus lens element is configured to modify a wavefront divergence of light from an external world to the second variable focus lens element.

Example 19. The head-mounted display system of Example 15, wherein the waveguide assembly comprises a stack of waveguides, wherein the plurality of emissive micro-displays are configured to output light of a plurality of component colors, wherein the waveguide assembly comprises at least one dedicated waveguide for light of each component color.

Example 20. The head-mounted display system of any one of Examples 15-19, further comprising:
a plurality of arrays of light collimators, wherein each micro-display has an associated array of light collimators;
an X-cube prism, wherein each of the emissive micro-displays face a different side of the X-cube prism; and
projection optics configured to receive light from the X-cube prism and to converge the received light towards the waveguide assembly.

Example 21. The head-mounted display system of any one of Examples 15-20, wherein the in-coupling optical elements of at least two waveguides are laterally offset as seen in a head-on view in a direction of light propagating to the in-coupling optical elements,
wherein at least one of the arrays of light collimators is configured to direct light into a corresponding side of the X-cube prism at a non-normal angle relative to the corresponding side, wherein light passing through the at least one of the light collimators converges on a corresponding in-coupling optical element while light passing through an other of the light collimators converges on a different in-coupling optical element.

Example 22. The head-mounted display system of any one of Examples 15-20, further comprising a color filter between two neighboring waveguides of the stack of waveguides, wherein a first of the neighboring waveguides precedes a second of the neighboring waveguides in a light path extending from the micro-display, wherein the color filter is configured to selectively absorb light of a wavelength corresponding to a wavelength of light configured to be in-coupled by the in-coupling optical element of the first of the neighboring waveguides.

Example 23. The head-mounted display system of Example 22, further comprising:
a third waveguide following the second of the neighboring waveguides in the light path; and an other color filter configured to selectively absorb light of a wavelength corresponding to a wavelength of light configured to be in-coupled by the in-coupling optical element of the second of the neighboring waveguides.

Example 24. The head-mounted display system of any one of Examples 15-23, wherein positions of the in-coupling optical elements of each waveguide of the waveguide assembly overlap as seen in a head-on view in a direction of light propagating to the in-coupling optical elements.

Example 25. The head-mounted display system of any one of Examples 15-23, further comprising absorptive color filters on major surfaces of at least some of the waveguides, wherein the absorptive color filters on major surfaces of a waveguide are configured to absorb light of wavelengths in-coupled into a corresponding waveguide.

Example 26. The head-mounted display system of any one of Examples 1-25, wherein the in-coupling optical elements are configured to in-couple light with the in-coupled light propagating generally in a propagation direction through an associated waveguide, wherein the in-coupling optical elements occupy an area having a width parallel to the propagation direction and a length along an axis crossing the propagation direction, wherein the length is greater than the width.

Example 27. A head-mounted display system comprising:
an emissive micro-display comprising an array of light emitters corresponding to pixels, wherein the array of light emitters is configured to define images; and
a waveguide assembly comprising one or more waveguides, each waveguide comprising:
an in-coupling optical element configured to incouple light from the micro-display into the waveguide; and
an out-coupling optical element configured to out-couple incoupled light out of the waveguide,
wherein the waveguide assembly is configured to output the outcoupled light with variable amounts of wavefront divergence corresponding to a plurality of depth planes.

Example 28. The head-mounted display system of Example 27, wherein the emissive micro-display is a micro-LED display.

Example 29. The head-mounted display system of any one of Examples 27-28, further comprising an array of light collimators proximate the array of light emitters, wherein each of the light emitters has an associated light collimator, wherein each light collimator is configured to receive and to concentrate light output by the associated light emitter.

Example 30. The head-mounted display system of Example 29, wherein the light collimators comprise micro-lenses.

Example 31. The head-mounted display system of Example 29, wherein the light collimators comprise nano-lenses.

Example 32. The head-mounted display system of Example 29, wherein the light collimators comprise reflective wells.

Example 33. The head-mounted display system of Example 29, wherein the light collimators comprise meta-surfaces.

Example 34. The head-mounted display system of Example 29, wherein the light collimators comprise liquid crystal gratings.

Example 35. The head-mounted display system of any one of Examples 27-34, further comprising projection optics configured to converge light from the emissive micro-display onto the incoupling optical elements of the one or more waveguides.

Example 36. The head-mounted display system of any one of Examples 27-35, wherein individual ones of the light emitters are configured to emit light of one of a plurality of component colors,
wherein the waveguide assembly comprises a plurality of sets of waveguides,
wherein each set of waveguides comprises a dedicated waveguide for each component color, wherein each set of waveguides comprises out-coupling optical elements configured to output light with wavefront divergence corresponding to a common depth plane, wherein different sets of waveguides output light with different amounts of wavefront divergence corresponding to different depth planes.

Example 37. The head-mounted display system of any one of Examples 27-35, further comprising variable focus lens elements, wherein the waveguide assembly is between first and second variable focus lens elements, wherein the first variable focus lens element is configured to modify a wavefront divergence of light outputted by the waveguide assembly, wherein the second variable focus lens element is configured to modify a wavefront divergence of light from an external world to the second variable focus lens element.

Example 38. The head-mounted display system of any one of Examples 27-37, wherein the waveguide assembly comprises a stack of waveguides.

Example 39. The head-mounted display system of Example 38, further comprising a color filter between two neighboring waveguides of the stack of waveguides, wherein a first of the neighboring waveguides precedes a second of the neighboring waveguides in a light path extending from the micro-display, wherein the color filter is configured to selectively absorb light of a wavelength corresponding to a wavelength of light configured to be in-coupled by the in-coupling optical element of the first of the neighboring waveguides.

Example 40. The head-mounted display system of Example 39, further comprising:
a third waveguide following the second of the neighboring waveguides in the light path; and
an other color filter configured to selectively absorb light of a wavelength corresponding to a wavelength of light configured to be in-coupled by the in-coupling optical element of the second of the neighboring waveguides.

Example 41. The head-mounted display system of Example 38-40, further comprising absorptive color filters on major surfaces of at least some of the waveguides, wherein the absorptive color filters on major surfaces of the waveguides are configured to absorb light of wavelengths in-coupled into a corresponding waveguide.

Example 42. The head-mounted display system of any one of Examples 27-41, wherein the in-coupling optical elements are configured to in-couple light with the in-coupled light propagating generally in a propagation direction through an associated waveguide, wherein the in-coupling optical elements occupy an area having a width parallel to the propagation direction and a length along an axis crossing the propagation direction, wherein the length is greater than the width.

Example 43. A head-mounted display system comprising:
a head-mountable frame;
an emissive micro-display supported by the frame, wherein the emissive micro-display comprises an array of groups of micro-emitters, wherein each group of micro-emitters comprises:
a first micro-emitter configured to emit light of a first color;

a second micro-emitter configured to emit light of a second color; and a third micro-emitter configured to emit light of a third color;

a micro-lens array proximate the array of groups of micro-emitters, wherein each group of micro-emitters has an associated micro-lens encompassing the micro-emitters of the group of micro-emitters; and a projection lens structure configured to receive light from the micro-lens array.

Example 44. The head-mounted display system of Example 43, further comprising a waveguide assembly comprising first, second, and third light in-coupling regions positioned to receive light from the projection lens structure, wherein the projection lens structure is configured to converge light from the first micro-emitters onto the first in-coupling region, to converge light from the second micro-emitters onto the second in-coupling region, and to converge light from the third micro-emitters onto the third in-coupling region.

Example 45. The head-mounted display system of Example 44, wherein the waveguide assembly comprises first, second, and third waveguides comprising, respectively, the first, second, and third light in-coupling regions.

Example 46. The head-mounted display system of any one of Examples 44-45, wherein the first, second, and third light in-coupling regions are laterally-shifted, as viewed from the projection lens structure.

Example 47. The head-mounted display system of any one of Examples 44-45, wherein the first and second light in-coupling regions overlap, as viewed from the projection lens structure.

Example 48. The head-mounted display system of any one of Examples 44-47, further comprising a color filter between the first and second light in-coupling regions, wherein the color filter is configured to selectively absorb light of a wavelength corresponding to a wavelength of light configured to be in-coupled by the first in-coupling optical element.

Example 49. The head-mounted display system of any one of Examples 44-48, wherein the second and third light in-coupling regions overlap, as viewed from the projection lens structure, further comprising:

an other color filter configured to selectively absorb light of a wavelength corresponding to a wavelength of light configured to be in-coupled by the second in-coupling optical element.

Example 50. The head-mounted display system of any one of Examples 44-49, further comprising absorptive color filters on major surfaces of at least some of the waveguides, wherein the absorptive color filters on major surfaces of the waveguides are configured to absorb light of wavelengths in-coupled into a corresponding waveguide.

Example 51. The head-mounted display system of any one of Examples 44-50, wherein the waveguide assembly comprises a plurality of sets of waveguides, wherein each set of waveguides comprises a dedicated waveguide for one for the first, second, or third colors, wherein each set of waveguides comprises out-coupling optical elements configured to output light with wavefront divergence corresponding to a common depth plane, wherein different sets of waveguides output light with different amounts of wavefront divergence corresponding to different depth planes.

Example 52. The head-mounted display system of any one of Examples 44-50, further comprising variable focus lens elements, wherein the waveguide assembly is between first and second variable focus lens elements, wherein the first variable focus lens element is configured to modify a wavefront divergence of light outputted by the waveguide assembly to the eye of the user, wherein the second variable focus lens element is configured to modify a wavefront divergence of light from an external world to the eye of the user.

Example 53. The head-mounted display system of any one of Examples 44-52, wherein the in-coupling optical elements are configured to in-couple light with the in-coupled light propagating generally in a propagation direction through an associated waveguide, wherein the in-coupling optical elements occupy an area having a width parallel to the propagation direction and a length along an axis crossing the propagation direction, wherein the length is greater than the width.

Example 54. The head-mounted display system of any one of Examples 43-53, wherein the first color is green, wherein the second color is blue, wherein the third color is red.

Example 55. The head-mounted display system of any one of Examples 43-54, wherein the emissive micro-displays comprise arrays of micro-LED's.

Example 56. The head-mounted display system of any one of Examples 43-55, wherein the emissive micro-display is one of a plurality of similar micro-displays, further comprising an X-cube prism, wherein each of the emissive micro-displays face a different side of the X-cube prism.

Example 57. The head-mounted display system of Example 56, wherein an output side of the X-cube prism is configured to output light from the emissive micro-displays into the projection lens structure.

Example 58. An emissive micro-display system comprising:

an array of light emitters comprising lines of the light emitters, wherein light emitters of each line are elongated along an axis crossing the lines;

wherein light emitters of each line are configured to emit light of a same color;

wherein multiple lines of the light emitters constitute a group of lines, wherein each line of a group of lines is configured to emit light of a different color than at least one other line of a group of lines.

Example 59. The emissive micro-display system of Example 58, wherein each group of lines comprises:

a first line of light emitters configured to emit light of a first color;

a second line of light emitters configured to emit light of a second color; and a third line of light emitters configured to emit a third color.

Example 60. The emissive micro-display system of Example 59, wherein the first color is green, wherein the second color is blue, wherein the third color is red.

Example 61. The emissive micro-display system of any one of Examples 58-59, further comprising a lens array over the array of light emitters, the lens array configured to receive light from the light emitters and to reduce an angular emission profile of the received light.

Example 62. The emissive micro-display system of Example 61, wherein the lens array is a nano-lens array comprising a plurality of diffractive gratings.

Example 63. The emissive micro-display system of Example 62, wherein the diffractive gratings are elongated along an axis parallel an associated line of light emitters.

Example 64. The emissive micro-display system of Example 64, wherein individual ones of the diffractive gratings extend across an entirety of the associated line of light emitters.

Example 65. The emissive micro-display system of any one of Examples 62-64, wherein the diffractive gratings comprise lines of material within a substrate, wherein the material forming the lines has a different refractive index than material forming the substrate.

Example 66. The emissive micro-display system of any one of Examples 58-65, wherein a pitch of the lines is 30-300 nm.

Example 67. The emissive micro-display system of any one of Examples 58-66, wherein a depth of the lines is 10-1000 nm.

Example 68. The emissive micro-display system of any one of Examples 58-67, wherein a depth and a pitch of the lines varies between each line of a group of line.

Example 69. The emissive micro-display system of any one of Examples 58-68, wherein a refractive index of the material forming the lines is 1.5-2.5.

Example 70. The emissive micro-display system of any one of Examples 58-69, wherein a refractive index of the substrate is 1.5-2.5.

Example 71. The emissive micro-display system of any one of Examples 58-70, further comprising:
  projection optics configured to converge light from the lens array; and
  a waveguide assembly comprising one or more waveguides, each waveguide comprising:
    an in-coupling optical element configured to incouple light from the projection optics into the waveguide; and
    an out-coupling optical element configured to out-couple incoupled light out of the waveguide.

Example 72. The emissive micro-display system of Example 71, wherein the in-coupling optical element of each waveguide is laterally shifted relative to the in-coupling optical element of other waveguides, as seen from a perspective of the projection optics,
  wherein different in-coupling optical elements are configured to in-couple light of different colors,
  wherein the lens array is configured to direct light of different colors along optical paths towards different ones of the in-coupling optical elements.

Example 73. The head-mounted display system of any one of Examples 71-72, further comprising projection optics configured to converge light from the emissive micro-display onto the incoupling optical elements of the one or more waveguides.

Example 74. The head-mounted display system of any one of Examples 58-73, wherein individual ones of the light emitters are configured to emit light of one of a plurality of component colors,
  wherein the waveguide assembly comprises a plurality of sets of waveguides,
  wherein each set of waveguides comprises a dedicated waveguide for each component color, wherein each set of waveguides comprises out-coupling optical elements configured to output light with wavefront divergence corresponding to a common depth plane, wherein different sets of waveguides output light with different amounts of wavefront divergence corresponding to different depth planes.

Example 75. The head-mounted display system of any one of Examples 71-73, further comprising variable focus lens elements, wherein the waveguide assembly is between first and second variable focus lens elements, wherein the first variable focus lens element is configured to modify a wavefront divergence of light outputted by the waveguide assembly, wherein the second variable focus lens element is configured to modify a wavefront divergence of light from an external world to the second variable focus lens element.

Example 76. The head-mounted display system of any one of Examples 71-75, wherein the waveguide assembly comprises a stack of waveguides, further comprising:
  a color filter between two neighboring waveguides of the stack of waveguides,
  wherein a first of the neighboring waveguides precedes a second of the neighboring waveguides in a light path extending from the micro-display,
  wherein the color filter is configured to selectively absorb light of a wavelength corresponding to a wavelength of light configured to be in-coupled by the in-coupling optical element of the first of the neighboring waveguides.

Example 77. The head-mounted display system of Example 76, further comprising:
  a third waveguide following the second of the neighboring waveguides in the light path; and
  an other color filter configured to selectively absorb light of a wavelength corresponding to a wavelength of light configured to be in-coupled by the in-coupling optical element of the second of the neighboring waveguides.

Example 78. The head-mounted display system of any one of Examples 71-77, further comprising absorptive color filters on major surfaces of at least some of the waveguides, wherein the absorptive color filters on major surfaces of the waveguides are configured to absorb light of wavelengths in-coupled into a corresponding waveguide.

Example 79. The head-mounted display system of any one of Examples 71-78, wherein the in-coupling optical elements are configured to in-couple light with the in-coupled light propagating generally in a propagation direction through an associated waveguide, wherein the in-coupling optical elements occupy an area having a width parallel to the propagation direction and a length along an axis crossing the propagation direction, wherein the length is greater than the width.

DETAILED DESCRIPTION

Figure 1:
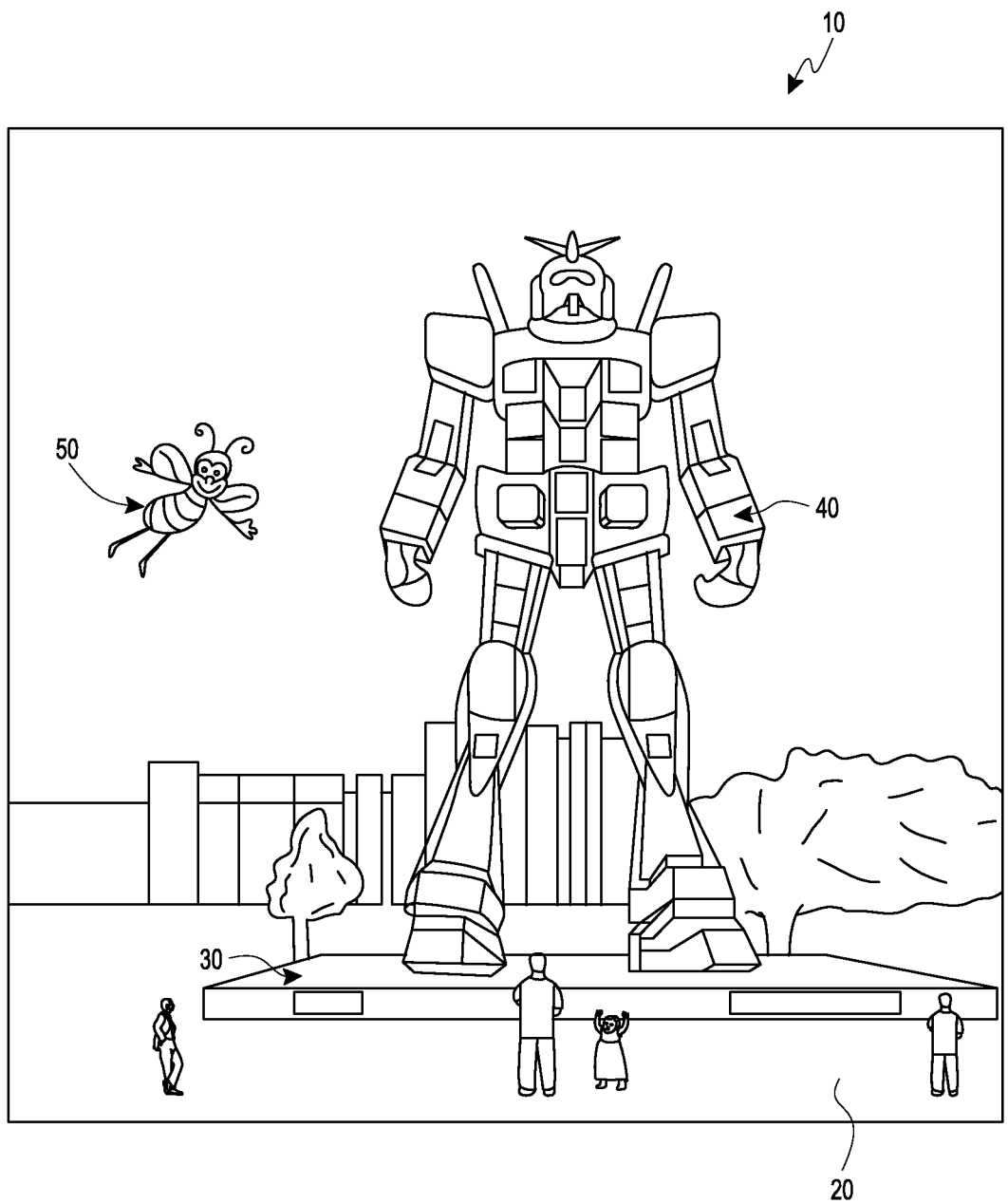
FIG. 1 illustrates a user's view of augmented reality (AR) through an AR device.

Augmented reality (AR) or virtual reality (VR) systems may display virtual content to a user, or viewer. This content may be displayed on a head-mounted display, for example, as part of eyewear, that projects image information to the user's eyes. In addition, where the system is an AR system, the display may also transmit light from a surrounding environment to the user's eyes, to allow a view of the surrounding environment. As used herein, it will be appreciated that a "head-mounted" or "head mountable" display is a display that may be mounted on the head of the user or viewer.

Many head-mounted display systems utilize transmissive or reflective spatial light modulators to form images that are presented to the user. A light source emits light, which is directed to the spatial light modulator, which then modulates the light, which is then directed to the user. Lens structures may be provided between the light source and the spatial light modulator to focus light from the light source onto the spatial light modulator. Undesirably, the light source and related optics may add bulkiness and weight to the display system. This bulkiness or weight may adversely impact the comfort of the display system and the ability to wear the system for long durations.

In addition, it has been found that the frame rate limitations of some display systems may cause viewing discomfort. Some display systems use spatial light modulators to form images. Many spatial light modulators utilize movement of optical elements to modulate the intensity of light outputted by the spatial light modulator, to thereby form the images. For example, MEMS-based spatial light modulators may utilize moving mirrors to modulate incident light, while LCoS-based displays may utilize the movement of liquid crystal molecules to modulate light. Other AR or VR systems may utilize scanning-fiber displays, in which the end of an optical fiber physically moves across an area while outputting light. The light outputted by the optical fiber is timed with the position of the end of the fiber, thereby effectively mimicking pixels at different locations, and thereby forming images. The requirement that the optical fibers, mirrors, and liquid crystal molecules physically move limits the speed at which individual pixels may change states and also constrains the frame rate of displays using these optical elements.

Such limitations may cause viewing discomfort due to, e.g., motion blur and/or mismatches between the orientation of the user's head and the displayed image. For example, there may be latency in the detection of the orientation of the user's head and the presentation of images consistent with that orientation. In the timespan between detecting the orientation and presenting an image to the user, the user's head may have moved. The presented image, however, may correspond to a view of an object from a different orientation. Such a mismatch between the orientation of the user's head and the presented image may cause discomfort in the user (e.g., nausea).

In addition, scanning-fiber displays may present other undesirable optical artifacts due to, e.g., the small cross-section of the fibers, which requires the use of a high-intensity light source to form images of desirable apparent brightness. Suitable high-intensity light sources include lasers, which output coherent light. Undesirably, the use of coherent light may cause optical artifacts.

Advantageously, display systems utilizing emissive micro-displays as described herein may allow for a low-weight and compact form factor which may also provide a high frame rate and low motion blur. Preferably, the micro-displays are emissive micro-displays, which provide advantages for high brightness and high pixel density. In some embodiments, the emissive micro-displays are micro-LED displays. In other embodiments, the emissive micro-displays are micro-OLED displays. In some embodiments, the emissive micro-displays comprise arrays of light emitters having a pitch of, e.g., less than 10 µm, less than 8 µm, less than 6 µm, less than 5 µm, or less than 2 µm, including 1-5 µm, and an emitter size of 2 µm or less, 1.7 µm or less, or 1.3 µm or less. In some embodiments, the emitter size is within a range having an upper limit of the above-noted sizes and a lower limit of 1 µm. In some embodiments, the ratio of emitter size to pitch is 1:1 to 1:5, 1:2 to 1:4, or 1:2 to 1:3, which may have advantages for individual control of emitters and efficient utilization of emitted light by eyepieces, as discussed further herein.

In some embodiments, a plurality of emissive micro-displays may be utilized to form images for a head-mounted display system. The light containing the image information for forming these images may be referred to as image light. It will be appreciated that image light may vary in, e.g., wavelength, intensity, polarization, etc. The emissive micro-displays output image light to an eyepiece, which then relays the light to an eye of the user.

In some embodiments, the plurality of emissive micro-displays may be positioned at different sides of an optical combiner, e.g., an X-cube prism or dichroic X-cube. The X-cube prism receives light rays from different micro-displays on different faces of the cube and outputs the light rays from the same face of the cube. The outputted light may be directed towards projection optics, which is configured to converge or focus the image light onto the eyepiece.

In some embodiments, the plurality of emissive micro-displays comprises monochrome micro-displays, which are configured to output light of a single component color. Combining various component colors forms a full color image. In some other embodiments, one or more of the emissive micro-displays may have sub-pixels configured to emit light of two or more, but not all, component colors utilized by the display system. For example, a single emissive micro-display may have sub-pixels which emit light of the colors blue and green, while a separate emissive micro-display on a different face of the X-cube may have pixels configured to emit red light. In some embodiments, the plurality of micro-displays are each full-color displays comprising, e.g., pixels formed of multiple sub-pixels configured to emit light of different component colors. Advantageously, combining the light of multiple full-color micro-displays may increase display brightness and dynamic range.

It will be appreciated that the emissive micro-displays may comprise arrays of light emitters. The light emitters may emit light with a Lambertian angular emission profile. Undesirably, such an angular remission profile may "waste" light, since only a small portion of the emitted light may ultimately be incident on the eyepiece. In some embodiments, light collimators may be utilized to narrow the angular emission profile of light emitted by the light emitters. As used herein, a light collimator is an optical structure which narrows the angular emission profile of incident light; that is, the light collimator receives light from an associated light emitter with a relatively wide initial angular emission profile and outputs that light with a narrower angular emission profile than the wide initial angular emission profile. In some embodiments, the rays of light exiting the light collimator are more parallel than the rays of light received by the light collimator, before being transmitted through and exiting the collimator. Examples of light collimators include micro-lenses, nano-lenses, reflective wells, metasurfaces, and liquid crystal gratings. In some embodiments, the light collimators may be configured to steer light to ultimately converge on different laterally-shifted light-coupling optical elements. In some embodiments, each light emitter has a dedicated light collimator. The light collimators are preferably positioned directly adjacent or contacting the light emitters, to capture a large proportion of the light emitted by the associated light emitters.

In some embodiments, a single emissive micro-display may be utilized to direct light to the eyepiece. For example, the single emissive micro-display may be a full-color display comprising light emitters that emit light of different component colors. In some embodiments, the light emitters may form groups, which are localized in a common area, with each group comprising light emitters which emit light of each component color. In such embodiments, each group of light emitters may share a common micro-lens. Advantageously, light of different colors from different light emitters take a different path through the micro-lens, which may be manifested in light of different component colors being incident on different in-coupling optical elements of an eyepiece, as discussed herein.

In some embodiments, the full-color micro-display may comprise repeating groups of light emitters of the same component color. For instance, the micro-display may include rows of light emitters, with the light emitters of each individual row configured to emit light of the same color.

Thus, different rows may emit light of different component colors. In addition, the micro-display may have an associated array of light collimators configured to direct light to a desired location on an eyepiece, e.g., to an associated in-coupling optical element. Advantageously, while the individual light emitters of such a full-color micro-display may not be positioned to form a high-quality full-color image, as viewed directly on the micro-display, the lens array appropriately steers the light from the light emitters to the eyepiece, which combines monochrome images formed by light emitters of different colors, thereby forming a high-quality full-color image.

In some embodiments, the eyepiece receiving image light from the micro-displays may comprise a waveguide assembly. The area of a waveguide of the waveguide assembly on which the image light is incident may include in-coupling optical elements which in-couple incident image light, such that the light propagates through the waveguide by total internal reflection (TIR). In some embodiments, the waveguide assembly may include a stack of waveguides, each of which has an associated in-coupling optical element. Different in-coupling optical elements may be configured to in-couple light of different colors, such that different waveguides may be configured to propagate light of different colors therein. The waveguides may include out-coupling optical elements, which out-couple light propagating therein, such that the out-coupled light propagates towards the eye of the user. In some other embodiments, the waveguide assembly may include a single waveguide having an associated in-coupling optical element configured to in-couple light of different component colors.

In some embodiments, the in-coupling optical elements are laterally shifted, as seen from the projection optics. Different in-coupling optical elements may be configured to in-couple light of different colors. Preferably, image light of different colors take different paths to the eyepiece and, thus, impinge upon different corresponding in-coupling optical elements.

In some other embodiments, other types of eyepieces or optics for relaying image light to the eyes of the user may be utilized. For example, as discussed herein, the eyepiece may include one or more waveguides which propagates image light therein by TIR. As another example, the eyepiece may include a birdbath combiner comprising a semitransparent mirror that both directs image light to a viewer and allows a view of the ambient environment.

In some embodiments, the eyepiece may be configured to selectively output light with different amounts of wavefront divergence, to provide virtual content at a plurality of virtual depth planes (also referred to simply as "depth planes" herein) perceived to be at different distances away from the user. For example, the eyepiece may comprise a plurality of waveguides each having out-coupling optical elements with different optical power to output light with different amounts of wavefront divergence. In some other embodiments, a variable focus element may be provided between the eyepiece and the user's eye. The variable focus element may be configured to dynamically change optical power to provide the desired wavefront divergence for particular virtual content. In some embodiments, as an alternative to, or in addition to waveguide optical structures for providing optical power, the display systems may also include a plurality of lenses that provide or additionally provide optical powers.

In addition to the compact form factor and high frame rates discussed above, emissive micro-displays according to some embodiments may provide one of more of the following advantages. For example, the micro-displays may provide exceptionally small pixel pitches and high pixel density. The micro-displays may also provide high luminance and efficiency. For example, the light emitters of the emissive micro-displays may only consume power to emit light when the light emitters are needed provide content with luminance. This is in contrast to other display technologies in which the light source may illuminate an entire panel of pixels, whether or not some of those pixels are dark. Further, it will be appreciated that the human visual system integrates received light over time and the light emitters of emissive micro-displays, such as micro-LEDs, have advantageously high duty cycles (e.g., including a short activation period for a light emitter in a micro-display to rise from an "off" to a full "on" state, and a correspondingly short time to fall from an "on" state to "off" state allow the light emitters to emit light at the on level for a large percentage of each cycle). As a result, the power used to generate an image with a given perceived brightness may be less as compared to conventional display technologies with lower duty cycles. In some embodiments, the duty cycle may be 70% or more, 80% or more, or 90% or more. In some embodiments, the duty cycle may be about 99%. In addition, as noted herein, micro-displays may facilitate exceptionally high frame rates, which may provide advantages including reducing mismatches between the position of a user's head and the displayed content.

Reference will now be made to the drawings, in which like reference numerals refer to like parts throughout. Unless indicated otherwise, the drawings are schematic and not necessarily drawn to scale.

Figure 2:
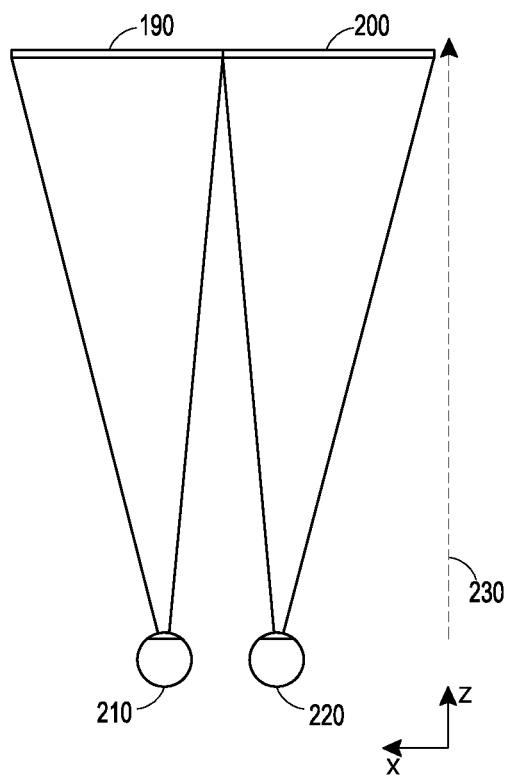
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
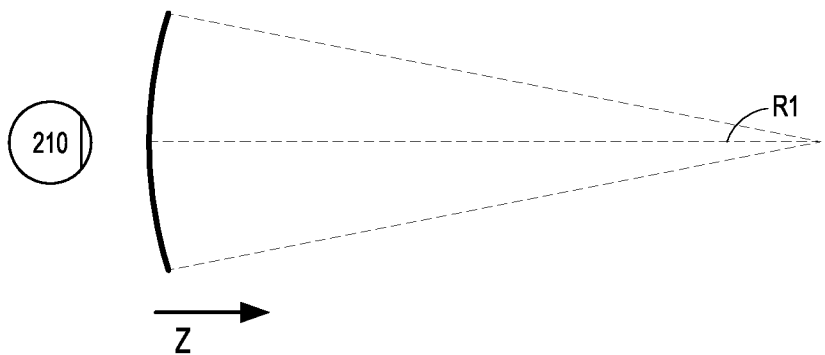
FIGS. 3A-3C illustrate relationships between radius of curvature and focal radius.
Figure 3B:
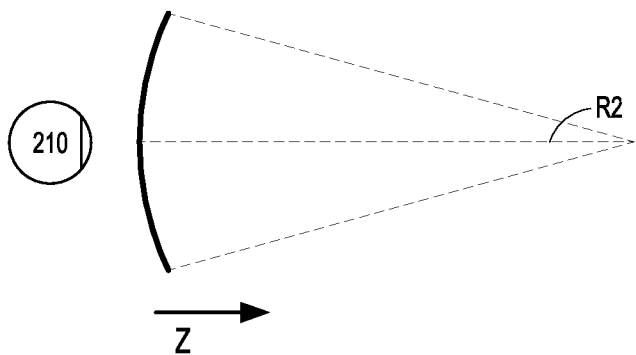
Figure 3C:
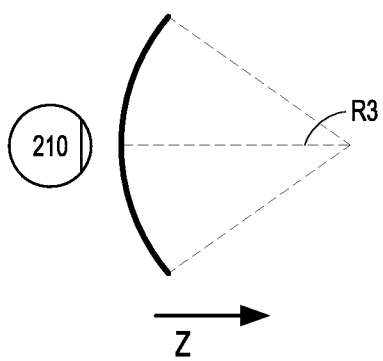

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
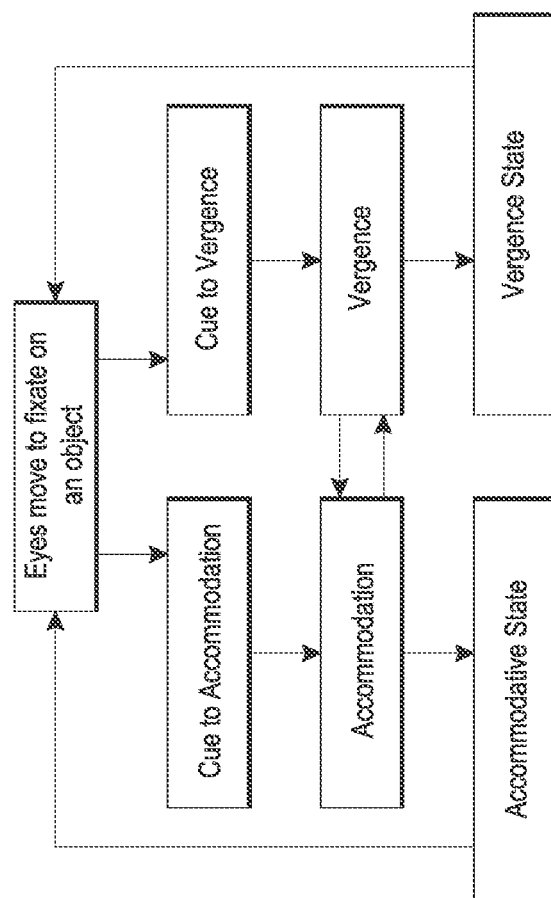
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
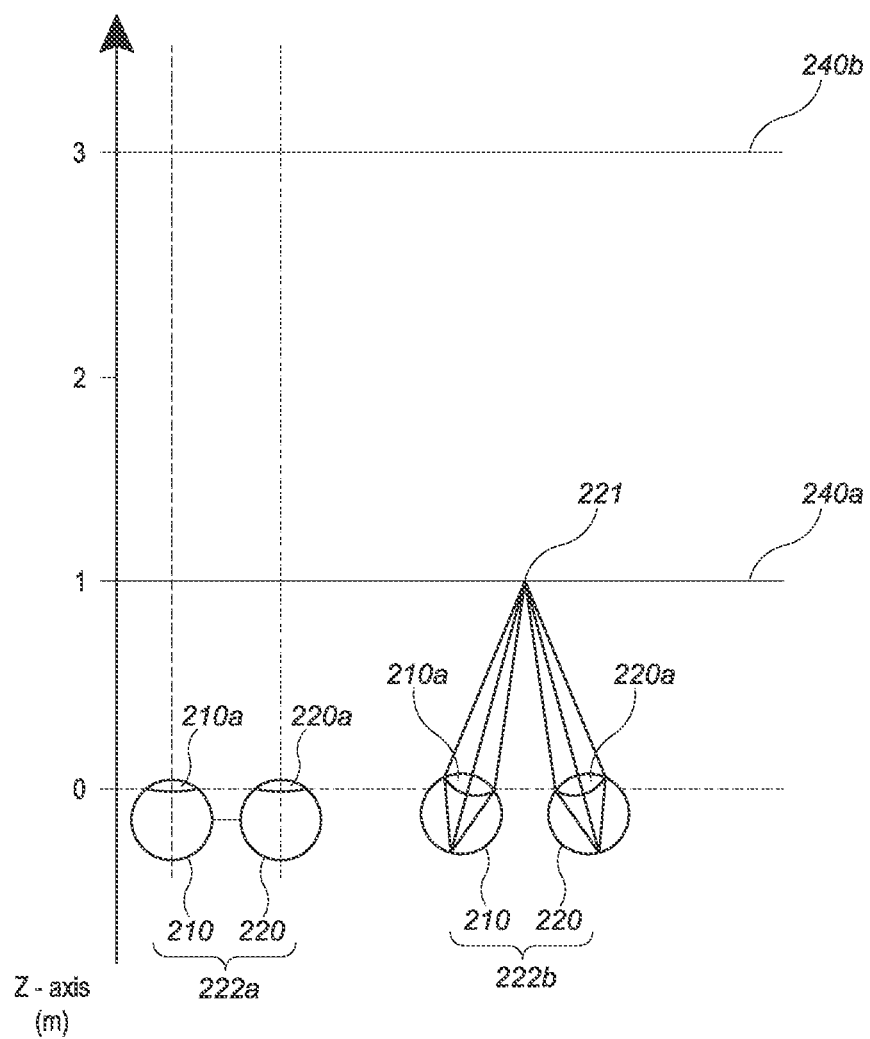
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
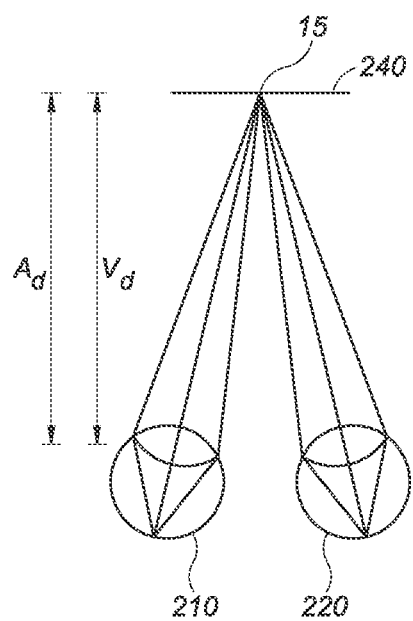
FIG. 4C illustrates an example of a representation of a top-down view of a user viewing content via a display system.
Figure 4D:
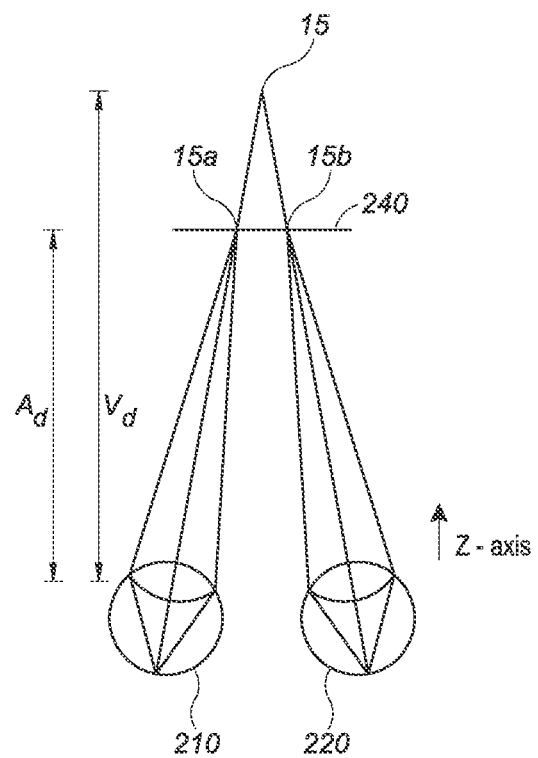
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
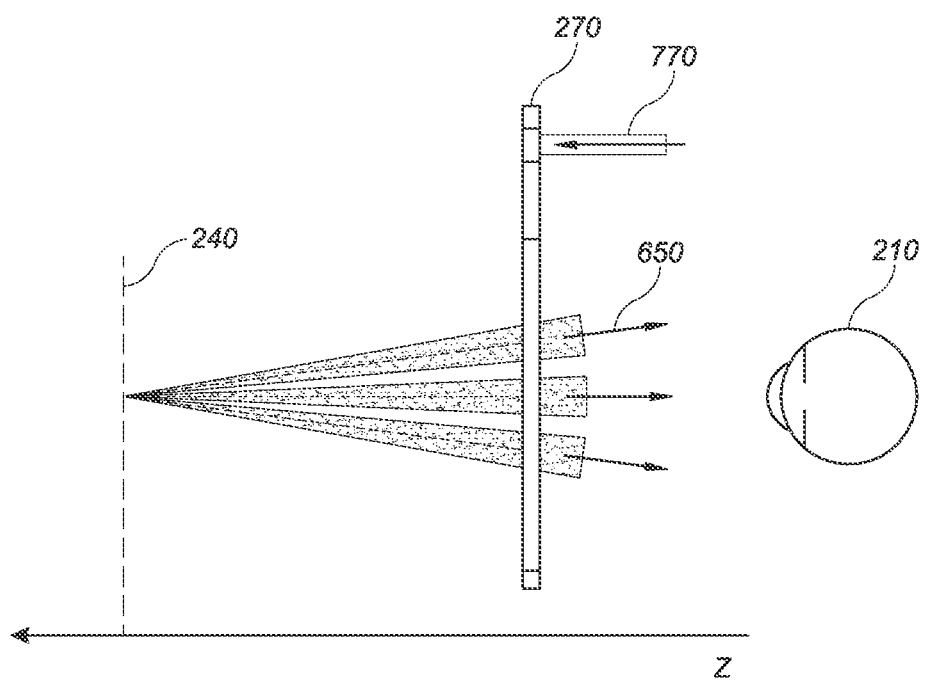
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
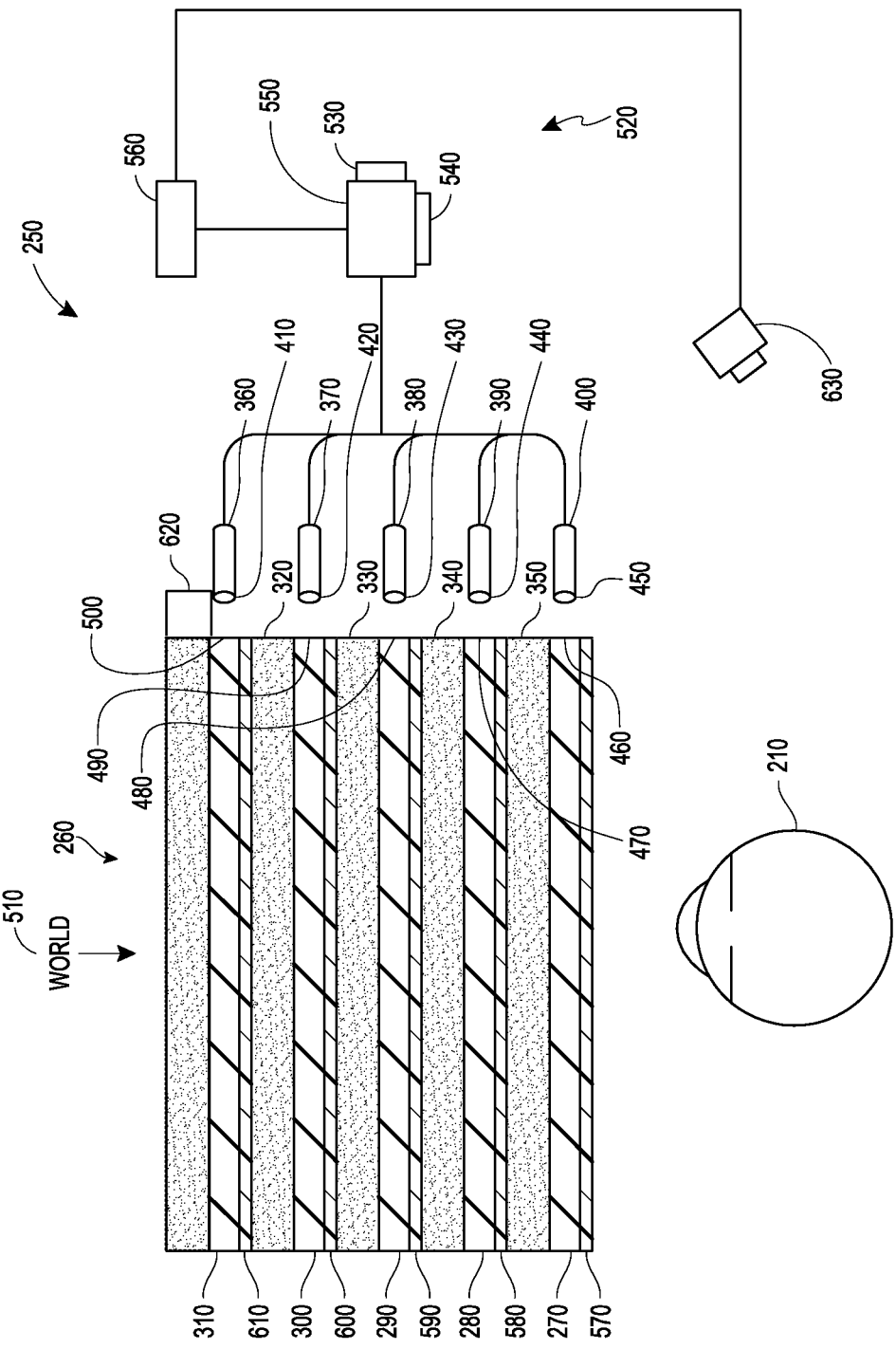
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projection system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In some other embodiments, the spatial light modulator may be a MEMS device, such as a digital light processing (DLP) device. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9E) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame or support structure 80 (FIG. 9E) and may be in electrical communication with the processing modules 140 and/or 150, which may process image information from the camera assembly 630. In some embodiments, one camera assembly 630 may be utilized for each eye, to separately monitor each eye.

The camera assembly 630 may, in some embodiments, observe movements of the user, such as the user's eye movements. As an example, the camera assembly 630 may capture images of the eye 210 to determine the size, position, and/or orientation of the pupil of the eye 210 (or some other structure of the eye 210). The camera assembly 630 may, if desired, obtain images (processed by processing circuitry of the type described herein) used to determine the direction the user is looking (e.g., eye pose or gaze direction). In some embodiments, camera assembly 630 may include multiple cameras, at least one of which may be utilized for each eye, to separately determine the eye pose or gaze direction of each eye independently. The camera assembly 630 may, in some embodiments and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
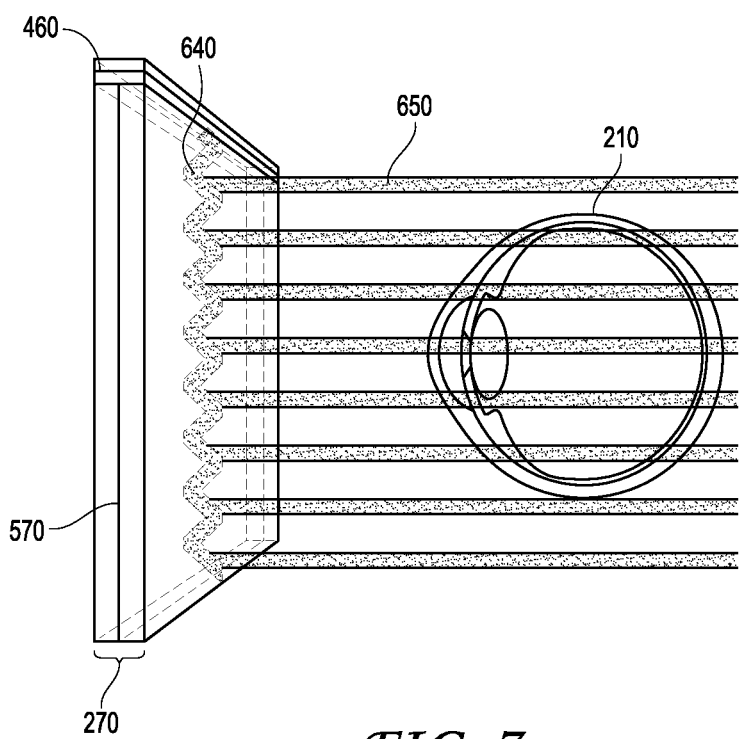
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
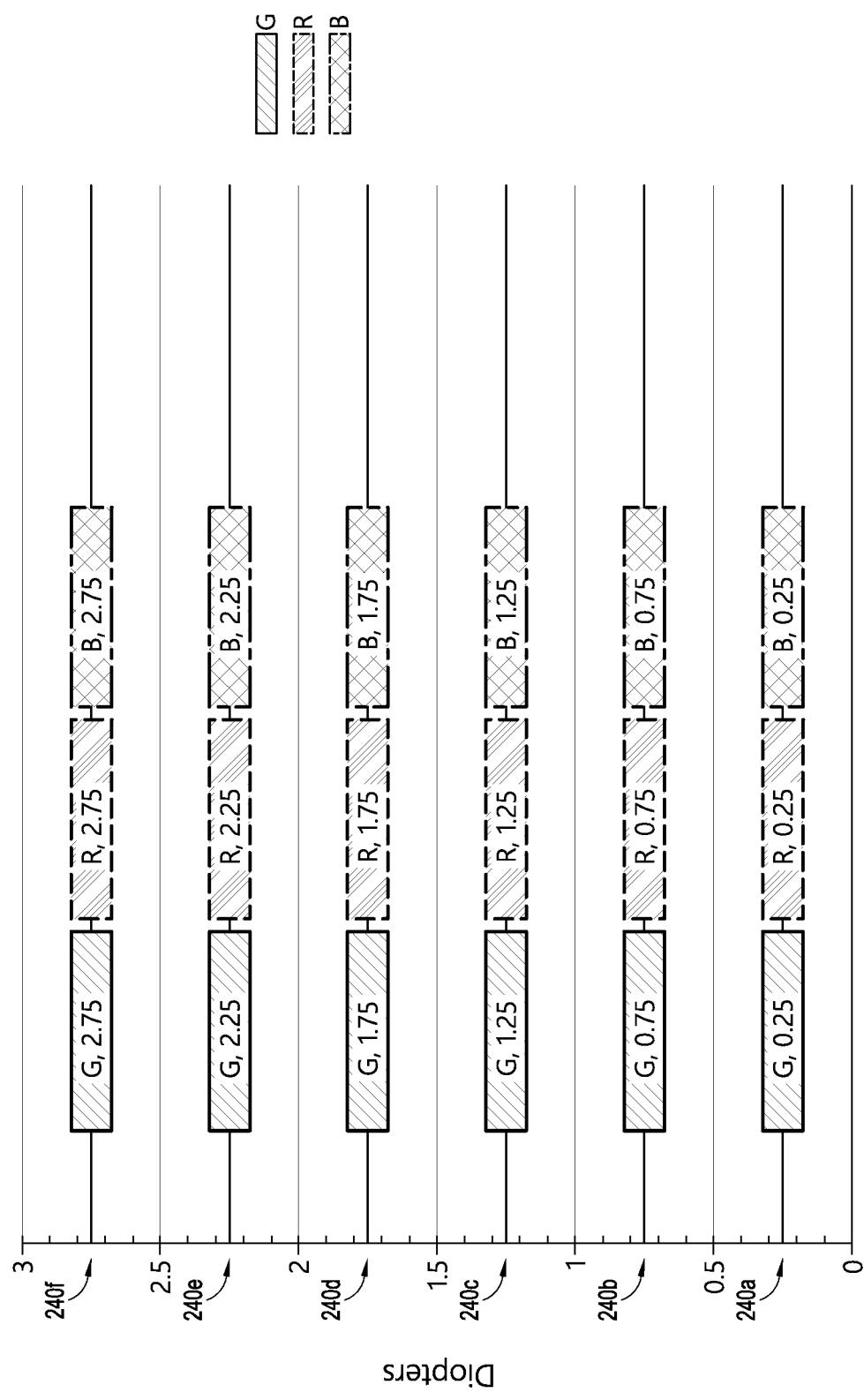
FIG. 8 illustrates an example of a stacked eyepiece in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
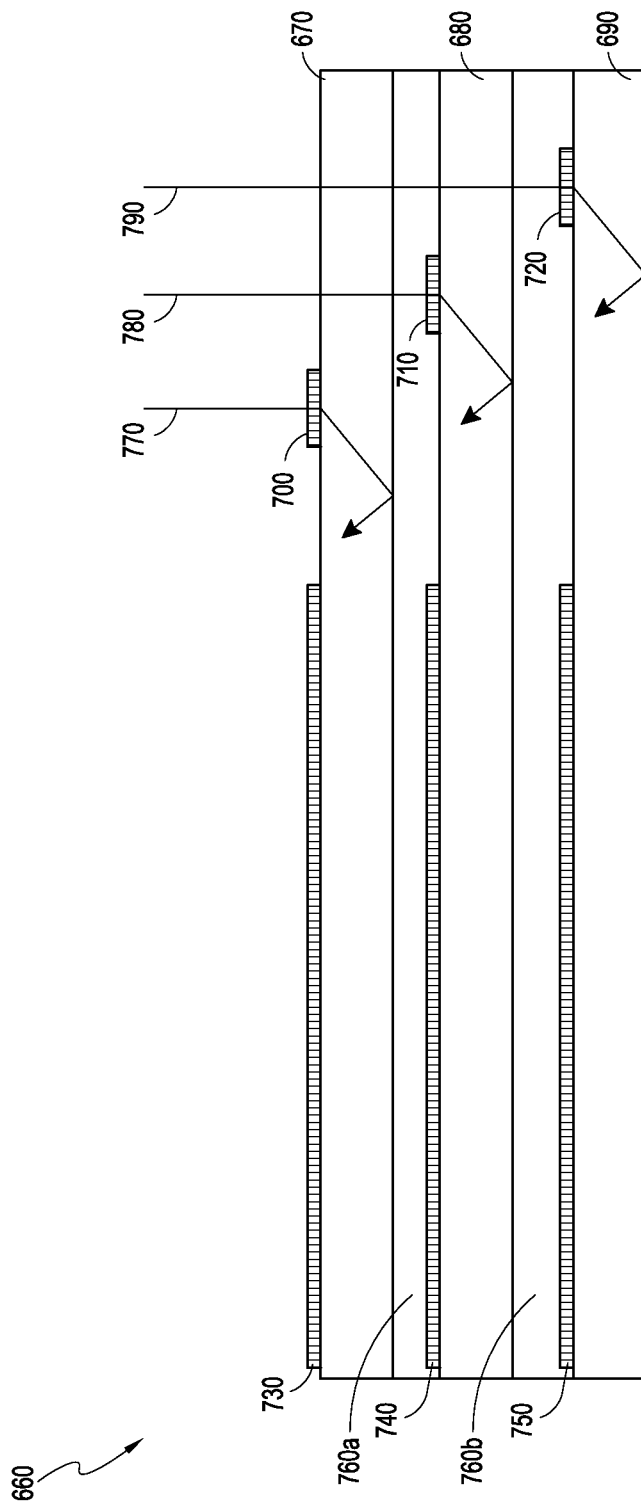
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another, as seen in the illustrated head-on view in a direction of light propagating to these in-coupling optical elements. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
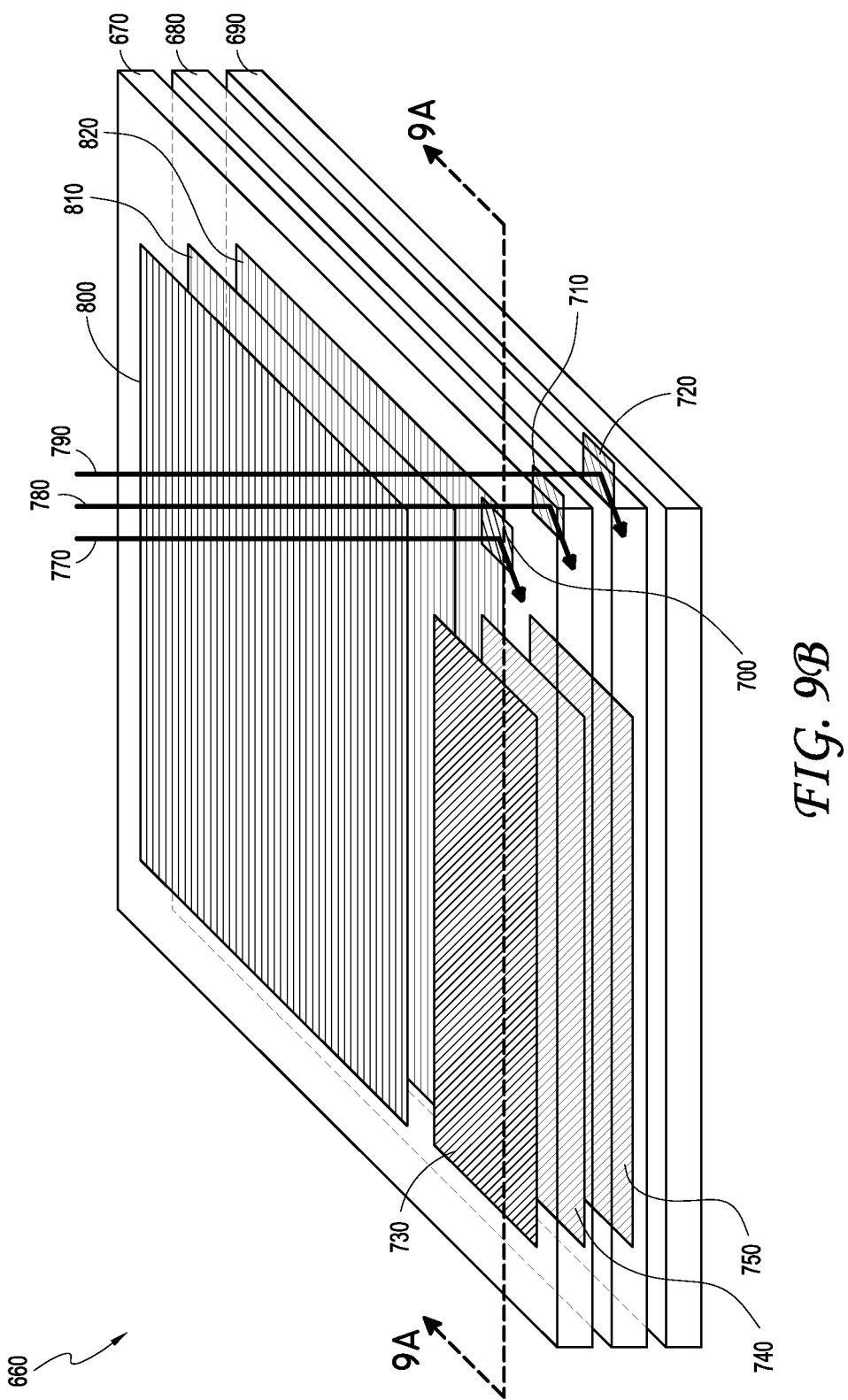
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
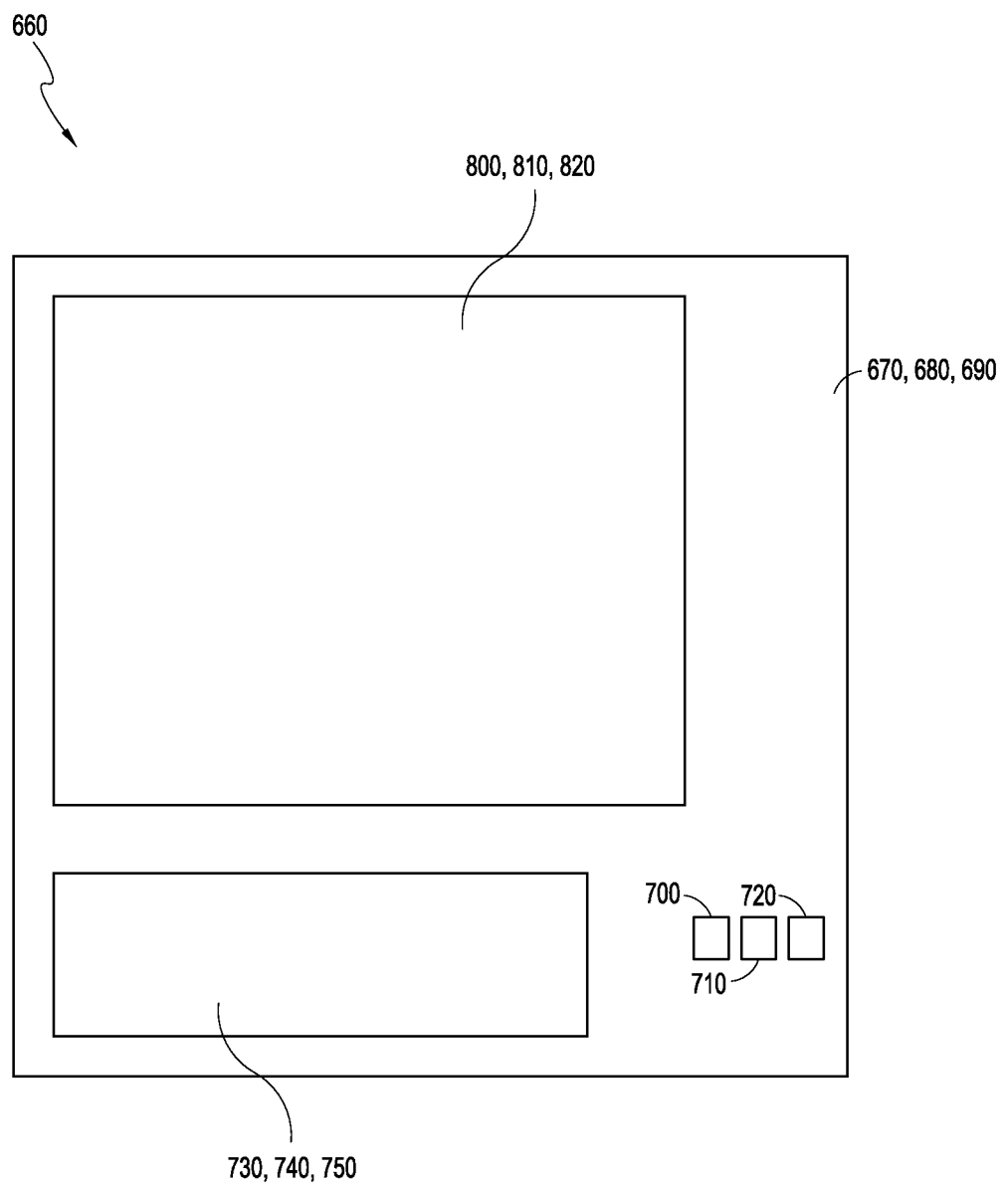
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub-pupils.

It will be appreciated that the spatially overlapping areas may have lateral overlap of 70% or more, 80% or more, or 90% or more of their areas, as seen in the top-down view. On the other hand, the laterally shifted areas of less than 30% overlap, less than 20% overlap, or less than 10% overlap of their areas, as seen in top-down view. In some embodiments, laterally shifted areas have no overlap.

Figure 9D:
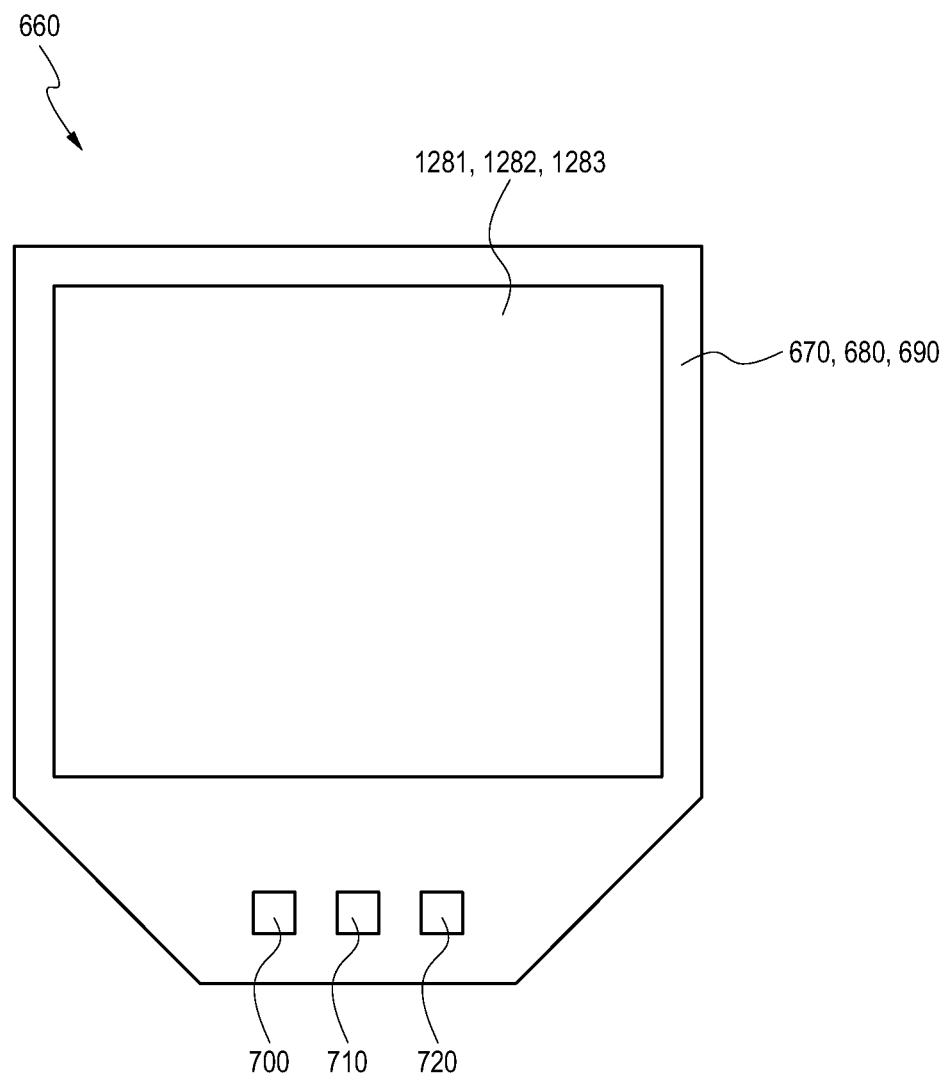
FIG. 9D illustrates a top-down plan view of another example of a plurality of stacked waveguides.

FIG. 9D illustrates a top-down plan view of another example of a plurality of stacked waveguides. As illustrated, the waveguides 670, 680, 690 may be vertically aligned. However, in comparison to the configuration of FIG. 9C, separate light distributing elements 730, 740, 750 and associated out-coupling optical elements 800, 810, 820 are omitted. Instead, light distributing elements and out-coupling optical elements are effectively superimposed and occupy the same area as seen in the top-down view. In some embodiments, light distributing elements (e.g., OPE's) may be disposed on one major surface of the waveguides 670, 680, 690 and out-coupling optical elements (e.g., EPE's) may be disposed on the other major surface of those waveguides. Thus, each waveguide 670, 680, 690 may have superimposed light distributing and out coupling optical elements, collectively referred to as combined OPE/EPE's 1281, 1282, 1283, respectively. Further details regarding such combined OPE/EPE's may be found in U.S. application Ser. No. 16/221,359, filed on Dec. 14, 2018, the entire disclosure of which is incorporated by reference herein. The in-coupling optical elements 700, 710, 720 in-couple and direct light to the combined OPE/EPE's 1281, 1282, 1283, respectively. In some embodiments, as illustrated, the in-coupling optical elements 700, 710, 720 may be laterally shifted (e.g., they are laterally spaced apart as seen in the illustrated top-down view) in have a shifted pupil spatial arrangement. As with the configuration of FIG. 9C, this laterally-shifted spatial arrangement facilitates the injection of light of different wavelengths (e.g., from different light sources) into different waveguides on a one-to-one basis.

Figure 9E:
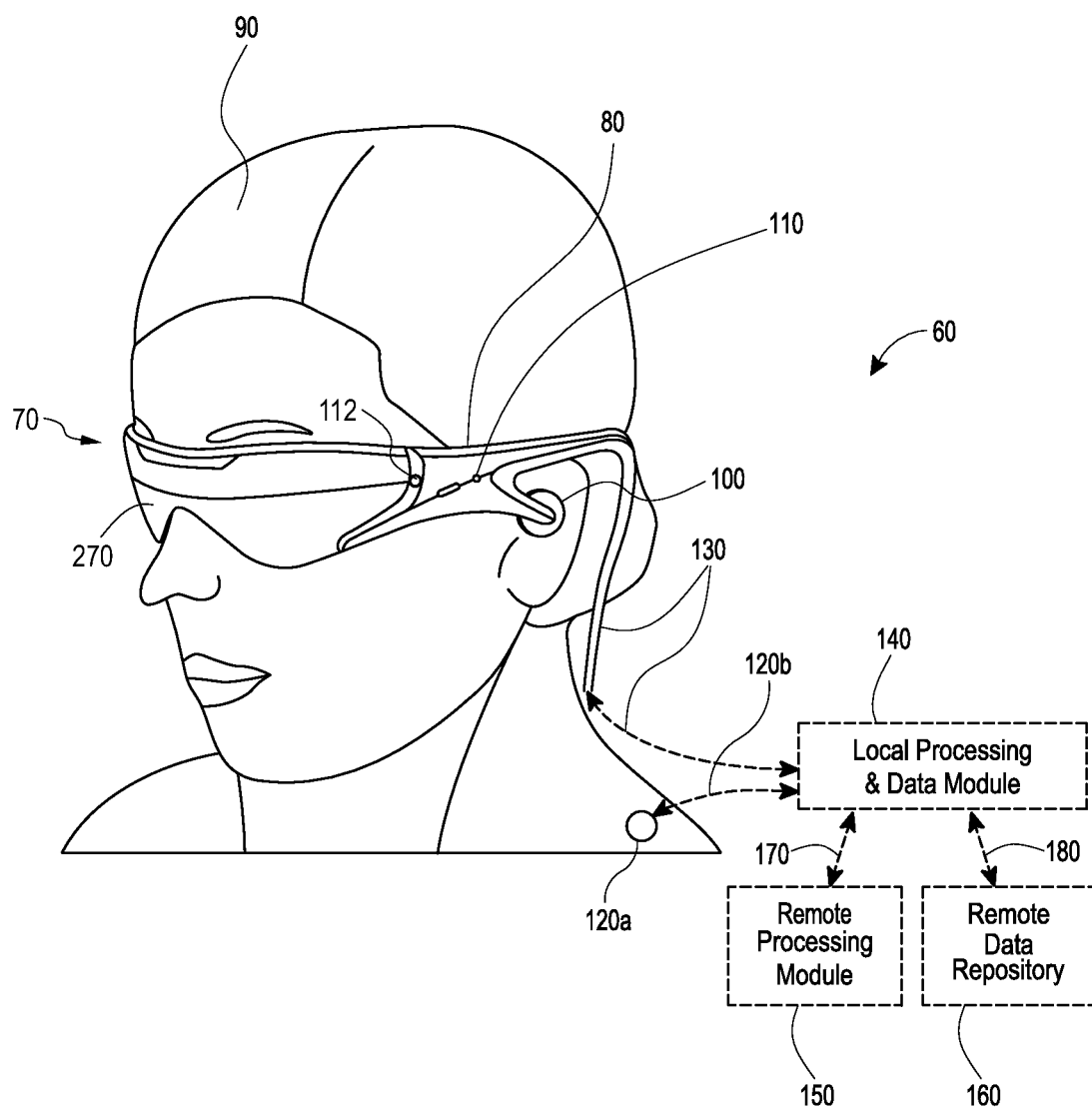
FIG. 9E illustrates an example of wearable display system.

FIG. 9E illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9E, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. The display 70 may include one or more waveguides, such as the waveguide 270, configured to relay in-coupled image light and to output that image light to an eye of the user 90. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9E, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9E, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating virtual content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Figure 10:
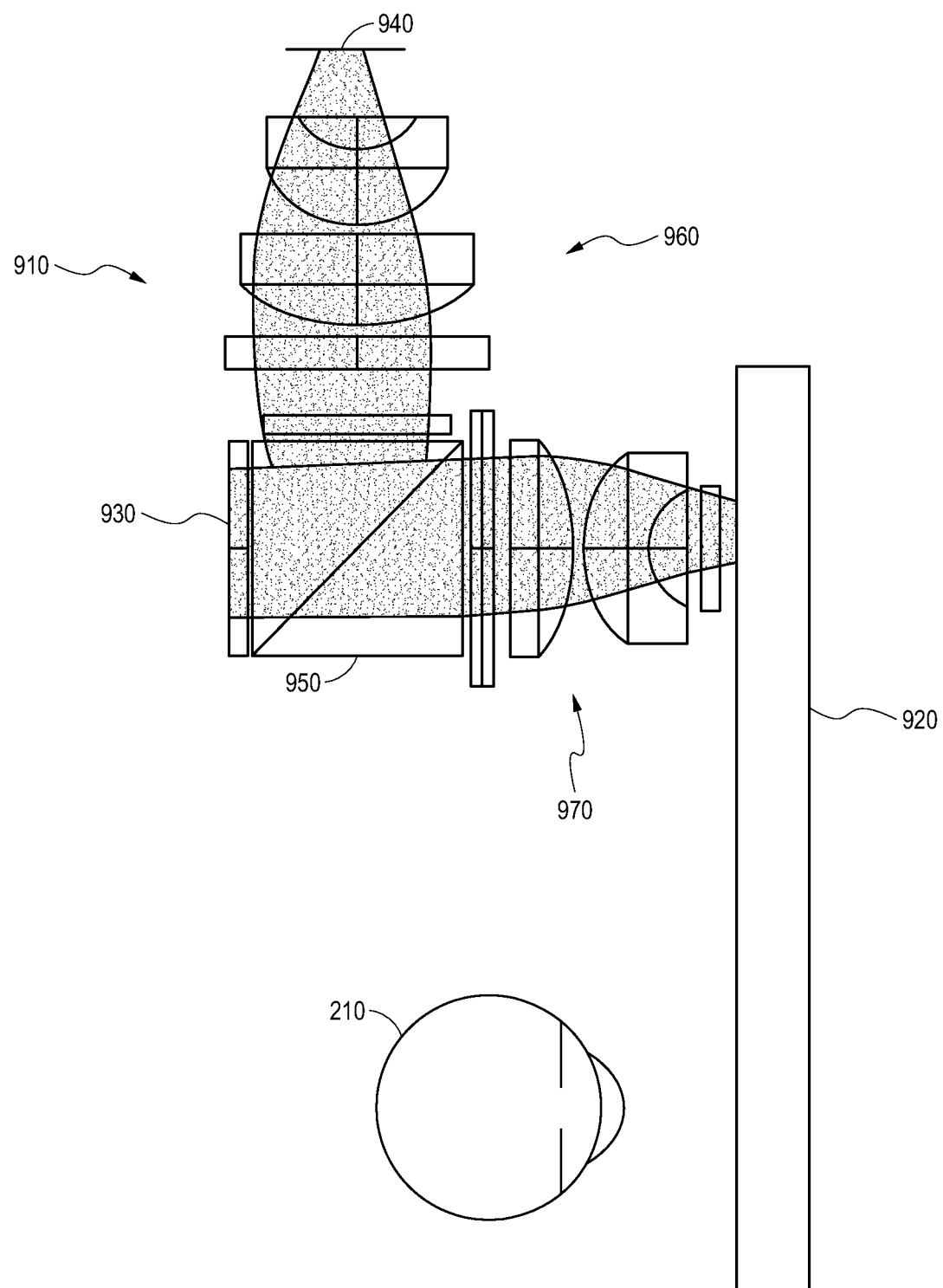
FIG. 10 illustrates an example of a wearable display system with a light projection system having a spatial light modulator and a separate light source.

FIG. 10 illustrates an example of a wearable display system with a light projection system 910 having a spatial light modulator 930 and a separate light source 940. The light source 940 may comprise one or more light emitters and illuminates the spatial light modulator (SLM) 930. A lens structure 960 may be used to focus the light from the light source 940 onto the SLM 930. A beam splitter (e.g., a polarizing beam splitter (PBS)) 950 reflects light from the light source 940 to the spatial light modulator 930, which reflects and modulates the light. The reflected modulated light, also referred to as image light, then propagates through the beam splitter 950 to the eyepiece 920. Another lens structure, projection optics 970, may be utilized to converge or focus the image light onto the eyepiece 920. The eyepiece 920 may include one or more waveguides or waveguides that relay the modulated to the eye 210.

As noted herein, the separate light source 940 and associated lens structure 960 may undesirably add weight and size to the wearable display system. This may decrease the comfort of the display system, particularly for a user wearing the display system for an extended duration.

In addition, the light source 940 in conjunction with the SLM 930 may consume energy inefficiently. For example, the light source 940 may illuminate the entirety of the SLM 930. The SLM 930 then selectively reflects light towards the eyepiece 920. thus, not all the light produced by the light source 940 may be utilized to form an image; some of this light, e.g., light corresponding to dark regions of an image, is not reflected to the eyepiece 920. As a result, the light source 940 utilizes energy to generate light to illuminate the entirety of the SLM 930, but only a fraction of this light may be needed to form some images.

Moreover, as noted herein, in some cases, the SLM 930 may modulate light using a micro-mirror to selectively reflect incident light, or using liquid crystal molecules that modify the amount of light reflected from an underlying mirror. As a result, such devices require physical movement of optical elements (e.g., micro-mirrors or liquid crystal molecules such as in LCoS or DLP panels, respectively) in order to modulate light from the light source 940. The physical movement required to modulate light to encode the light with image information, e.g., corresponding to a pixel, may occur at relatively slow speeds in comparison to, e.g., the ability to turn an LED or OLED "on" or "off". This relatively slow movement may limit the frame rate of the display system and may be visible as, e.g., motion blur, color-breakup, and/or presented images that are mismatched with the pose of the user's head or changes in said pose.

Advantageously, wearable displays utilizing emissive micro-displays, as disclosed herein, may facilitate wearable display systems that have a relatively low weight and bulkiness, high energy efficiency, and high frame rate, with low motion blur and low motion-to-photon latency. Low blur and low motion-to-photon latency are further discussed in U.S. Provisional Application Ser. No. 62/786,199, filed Dec. 28, 2018, the entire disclosure of which is incorporated by reference herein. In addition, in comparison to scanning fiber displays, the emissive micro-displays may avoid artifacts caused by the use of coherent light sources.

Figure 11A:
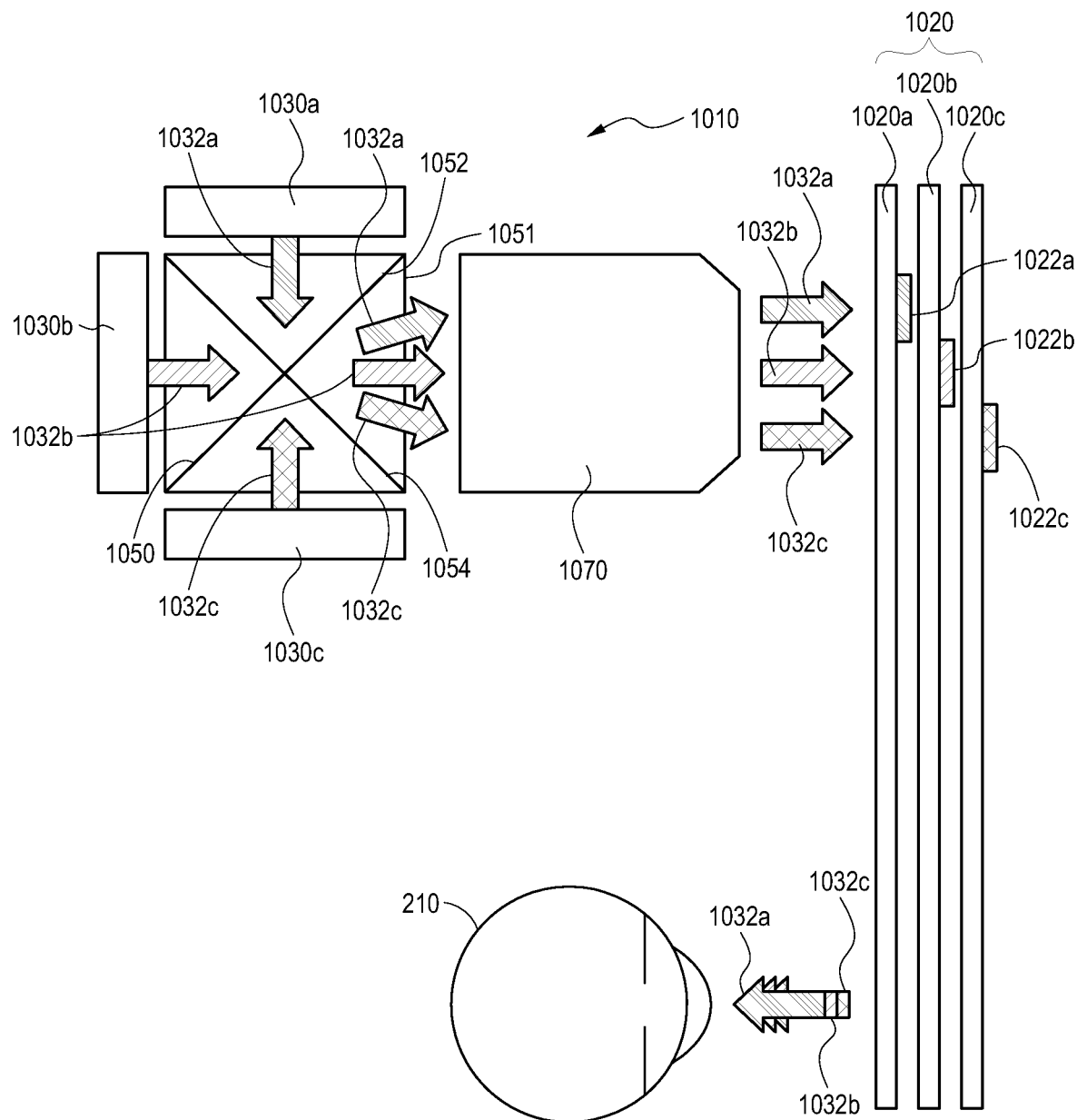
FIG. 11A illustrates an example of a wearable display system with a light projection system having multiple emissive micro-displays.

With reference now to FIG. 11A, an example is illustrated of a wearable display system with a light projection system 1010 having multiple emissive micro-displays 1030a, 1030b, 1030c. Light from the micro-displays 1030a, 1030b, 1030c is combined by an optical combiner 1050 and directed towards an eyepiece 1020, which relays the light to the eye 210 of a user. Projection optics 1070 may be provided between the optical combiner 1050 and the eyepiece 1020. In some embodiments, the eyepiece 1020 may be a waveguide assembly comprising one or more waveguides. In some embodiments, the light projection system 1010 and the eyepiece 1020 may be supported (e.g., attached to) the frame 80 (FIG. 9E).

In some embodiments, the micro-displays 1030a, 1030b, 1030c may be monochrome micro-displays, with each monochrome micro-display outputting light of a different component color to provide a monochrome image. As discussed herein, the monochrome images combine to form a full-color image.

In some other embodiments, the micro-displays 1030a, 1030b, 1030c may be may each be full-color displays configured to output light of all component colors. For example, the micro-displays 1030a, 1030b, 1030c each include red, green, and blue light emitters. The micro-displays 1030a, 1030b, 1030c may be identical and may display the same image. However, utilizing multiple micro-displays may provide advantages for increasing the brightness and brightness dynamic range of the brightness of the image, by combining the light from the multiple micro-displays to form a single image. In some embodiments, two or more (e.g., three) micro-displays may be utilized, with the optical combiner 1050 is configured to combine light from all of these micro-displays.

The micro-displays may comprise an array of light emitters. Examples of light emitters include organic light-emitting diodes (OLEDs) and micro-light-emitting diodes (micro-LEDs). It will be appreciated that OLEDs utilize organic material to emit light and micro-LEDs utilize inorganic material to emit light. Advantageously, some micro-LEDs provide higher luminance and higher efficiency (in terms of lux/W) than OLEDs. In some embodiments, the micro-displays are preferably micro-LED displays.

With continued reference to FIG. 11A, the micro-displays 1030a, 1030b, 1030c may each be configured to emit image light 1032a, 1032b, 1032c. Where the micro-displays are monochrome micro-displays, the image light 1032a, 1032b, 1032c may each be of a different component color. The optical combiner 1050 receives the image light 1032a, 1032b, 1032c and effectively combines this light such that the light propagates generally in the same direction, e.g., toward the projection optics 1070. In some embodiments, the optical combiner 1050 may be a dichroic X-cube prism having reflective internal surfaces that redirect the image light 1032a, 1032b, 1032c to the projection optics 1070. It will be appreciated that the projection optics 1070 may be a lens structure comprising one or more lenses which converge or focus image light onto the eyepiece 1020. The eyepiece 1020 then relays the image light 1032a, 1032b, 1032c to the eye 210.

In some embodiments, the eyepiece 1020 may comprise a plurality of stacked waveguides 1020a, 1020b, 1020c, each of which has a respective in-coupling optical element 1022a, 1022b, 1022c. In some embodiments, the number of waveguides is proportional to the number of component colors provided by the micro-displays 1030a, 1030b, 1030c. For example, where there are three component colors, the number of waveguides in the eyepiece 1020 may include a set of three waveguides or multiple sets of three waveguides each. In some embodiments, each set may output light with wavefront divergence corresponding to a particular depth plane, as discussed herein. It will be appreciated that the waveguides 1020a, 1020b, 1020c and the in-coupling optical element 1022a, 1022b, 1022c may correspond to the waveguides 670, 680, 690 and the in-coupling optical elements 700, 710, 720, respectively, of FIGS. 9A-9C. As viewed from the projection optics 1070, the in-coupling optical elements 1022a, 1022b, 1022c may be laterally shifted, such that they at least partly do not overlap as seen in such a view.

As illustrated, the various in-coupling optical elements disclosed herein (e.g., the in-coupling optical element 1022a, 1022b, 1022c) may be disposed on a major surface of an associated waveguide (e.g., waveguides 1020a, 1020b, 1020c, respectively). In addition, as also illustrated, the major surface on which a given in-coupling optical element is disposed may be the rear surface of the waveguide. In such a configuration, the in-coupling optical element may be a reflective light redirecting element, which in-couples light by reflecting the light at angles which support TIR through the associated waveguide. In some other configurations, the in-coupling optical element may be disposed on the forward surface of the waveguide (closer to the projection optics 1070 than the rearward surface). In such configurations, the in-coupling optical element may be a transmissive light redirecting element, which in-couples light by changing the direction of propagation of light as the light is transmitted through the in-coupling optical element. It will be appreciated that any of the in-coupling optical elements disclosed herein may be reflective or transmissive in-coupling optical elements.

With continued reference to FIG. 11A, image light 1032a, 1032b, 1032c from different ones of the micro-displays 1030a, 1030b, 1030c may take different paths to the eyepiece 1020, such that they impinge on different ones of the in-coupling optical element 1022a, 1022b, 1022c. Where the image light 1032a, 1032b, 1032c includes light of different component colors, the associated in-coupling optical element 1022a, 1022b, 1022c, respectively, may be configured to selectively in couple light of different wavelengths, as discussed above regarding, e.g., the in-coupling optical elements 700, 710, 720 of FIGS. 9A-9C.

With continued reference to FIG. 11A, the optical combiner 1050 may be configured to redirect the image light 1032a, 1032b, 1032c emitted by the micro-displays 1030a, 1030b, 1030c such that the image light propagates along different optical paths, in order to impinge on the appropriate associated one of the in-coupling optical element 1022a, 1022b, 1022c. Thus, the optical combiner 1050 combines the image light 1032a, 1032b, 1032c in the sense that the image light is outputted from a common face of the optical combiner 1050, although light may exit the optical combiner in slightly different directions. For example, the reflective internal surfaces 1052, 1054 of the X-cube prism may each be angled to direct the image light 1032a, 1032b, 1032c along different paths to the eyepiece 1020. As a result, the image light 1032a, 1032b, 1032c may be incident on different associated ones of in-coupling optical elements 1022a, 1022b, 1022c. In some embodiments, the micro-displays 1030a, 1030b, 1030c may be appropriately angled relative to the reflective internal surfaces 1052, 1054 of the X-cube prism to provide the desired light paths to the in-coupling optical elements 1022a, 1022b, 1022c. For example, faces of one or more of the micro-displays 1030a, 1030b, 1030c may be angled to matching faces of the optical combiner 1050, such that image light emitted by the micro-displays is incident on the reflective internal surfaces 1052, 1054 at an appropriate angle to propagate towards the associated in coupling optical element 1022a, 1022b, or 1022c. It will be appreciated that, in addition to a cube, the optical combiner 1050 may take the form of various other polyhedra. For example, the optical combiner 1050 may be in the shape of a rectangular prism having at least two faces that are not squares.

With continued reference to FIG. 11A, in some embodiments, the monochrome micro-display 1030b directly opposite the output face 1051 may advantageously output green light. It will be appreciated that the reflective surfaces 1052, 1054 may have optical losses when reflecting light from the micro-displays. In addition, the human eye is most sensitive to the color green. Consequently, the monochrome micro-display 1030b opposite the output face 1051 preferably outputs green light, so that the green light may proceed directly through the optical combiner 1050 without needing to be reflected to be outputted from the optical combiner 1050. It will be appreciated, however, that the green monochrome micro-display may face other surfaces of the optical combiner 1050 in some other embodiments.

As discussed herein, the perception of a full color image by a user may be achieved with time division multiplexing in some embodiments. For example, different ones of the emissive micro-displays 1030a, 1030b, 1030c may be activated at different times to generate different component color images. In such embodiments, the different component color images that form a single full color image may be sequentially displayed sufficiently quickly that the human visual system does not perceive the component color images as being displayed at different times; that is, the different component color images that form a single full color image may all be displayed within a duration that is sufficiently short that the user perceives the component color images as being simultaneously presented, rather than being temporally separated. For example, it will be appreciated that the human visual system may have a flicker fusion threshold. The flicker fusion threshold may be understood to a duration within which the human visual system is unable to differentiate images as being presented at different times. Images presented within that duration are fused or combined and, as a result, may be perceived by a user to be present simultaneously. Flickering images with temporal gaps between the images that are outside of that duration are not combined, and the flickering of the images is perceptible. In some embodiments, the duration is 1/60 seconds or less, which corresponds to a frame rate of 60 Hz or more. Preferably, image frames for any individual eye are provided to the user at a frame rate equal to or higher than the duration of the flicker fusion threshold of the user. For example, the frame rate for each of the left-eye or right-eye pieces may be 60 Hz or more, or 120 Hz or more; and, as a result, the frame rate provided by the light projection system 1010 may be 120 Hz or more, or 240 Hz or more in some embodiments.

It will be appreciated that time division multiplexing may advantageously reduce the computational load on processors (e.g., graphics processors) utilized to form displayed images. In some other embodiments, such as where sufficient computational resources are available, all component color images that form a full color image may be displayed simultaneously by the micro-displays 1030a, 1030b, 1030c.

Figure 11B:
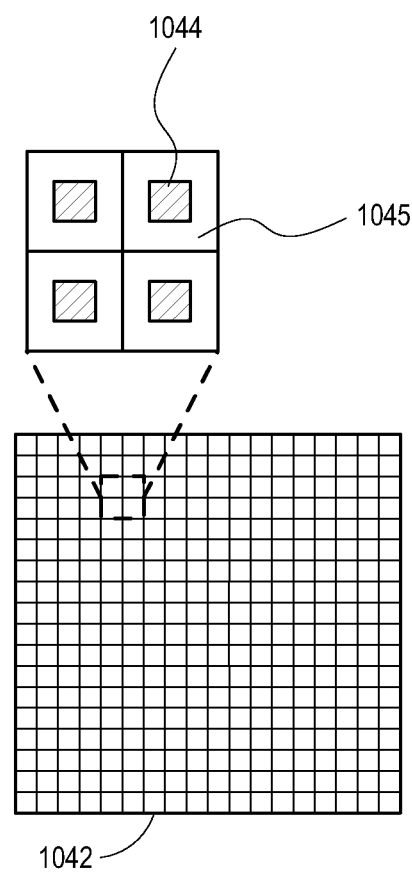
FIG. 11B illustrates an example of an emissive micro-display with an array of light emitters.

As discussed herein, the micro-displays 1030a, 1030b, 1030c may each include arrays of light emitters. FIG. 11B illustrates an example of an array 1042 of light emitters 1044. Where the associated micro-display is a monochrome micro-display, the light emitters 1044 may all be configured to emit light of the same color.

Where the associated micro-display is a full-color micro-display, different ones of the light emitters 1044 may be configured to emit light of different colors. In such embodiments, the light emitters 1044 may be considered subpixels and may be arranged in groups, with each group having at least one light emitter configured to emit light of each component color. For example, where the component colors are red, green, and blue, each group may have at least one red subpixel, at least one green subpixel, in at least one blue subpixel.

It will be appreciated, that while the light emitters 1044 are shown arranged in a grid pattern for ease of illustration, the light emitters 1044 may have other regularly repeating spatial arrangements. For example, the number of light emitters of different component colors may vary, the sizes of the light emitters may vary, the shapes of the light emitters and/or the shapes made out by groups of light emitters may vary, etc.

With continued reference to FIG. 11B, it will be appreciated that the micro-emitters 1044 emit light. In addition, manufacturing constraints, such as lithography or other patterning and processing limitations, and/or electrical considerations, may limit how closely neighboring light-emitters 1044 are spaced. As a result, there may be an area 1045 surrounding the light emitter 1044 within which it is not practical to form other light emitters 1044. This area 1045 forms the inter-emitter regions between light emitters 1044. In some embodiments, taking into account the area 1045, the light emitters have a pitch of, e.g., less than 10 µm, less than 8 µm, less than 6 µm, or less than 5 µm, and more than 1 µm, including 1-5 µm, and an emitter size of 2 µm or less, 1.7 µm or less, or 1.3 µm or less. In some embodiments, the emitter size is within a range having an upper limit of the above-noted sizes and a lower limit of 1 μm. In some embodiments, the ratio of emitter size to pitch is 1:1 to 1:5, 1:2 to 1:4, or 1:2 to 1:3.

It will be appreciated that, given some light emitter device architectures and materials, current crowding may decrease the emitter's efficiency and pixel droop may cause unintentional activation of pixels (e.g., due to energy directed to one light emitter bleeding into a neighboring light emitter). As a result, a relatively large area 1045 may beneficially reduce current crowding and pixel droop. In some embodiments, the ratio of emitter size to pitch is preferably 1:2 to 1:4, or 1:2 to 1:3.

It will also be appreciated, however, that large separations between light emitters (e.g., a small light emitter to pitch ratio) may undesirably cause visible gaps, or dark regions, between the light emitters. In some embodiments, lens structure such as light collimators may be utilized to effectively fill in these dark regions. For example, a light collimating lens may extend on and around a light emitter 1044, such that light from the emitter 1044 completely fills the lens. For example, the light collimating lens may have a larger width than the light emitters 1044 and, in some embodiments, the width of the collimating lens may be approximately equal to the pitch. As a result, the size of the emitter 1044 is effectively increased to extend across the area of the lens, thereby filling in some or all of the area 1045. Lens structures such as light collimators are further discussed herein (e.g., in FIG. 30A and the related discussion).

As discussed herein, the light emitters 1044 may be OLEDs or micro-LEDs. It will be appreciated that OLEDs may utilize layers of organic material, e.g., disposed between electrodes, to emit light. Micro-LEDs may utilize inorganic materials, e.g., Group III-V materials such as GaAs, GaN, and/or GaIn for light emission. Examples of GaN materials include InGaN, which may be used to form blue or green light emitters in some embodiments. Examples of GaIn materials include AlGaInP, which may be used to form red light emitters in some embodiments. In some embodiments, the light emitters 1044 may emit light of an initial color, which may be converted to other desired colors using phosphor materials or quantum dots. For example, the light emitter may emit blue light which excites a phosphor material or quantum dot that converts the blue wavelength light to green or red wavelengths.

Figure 12:
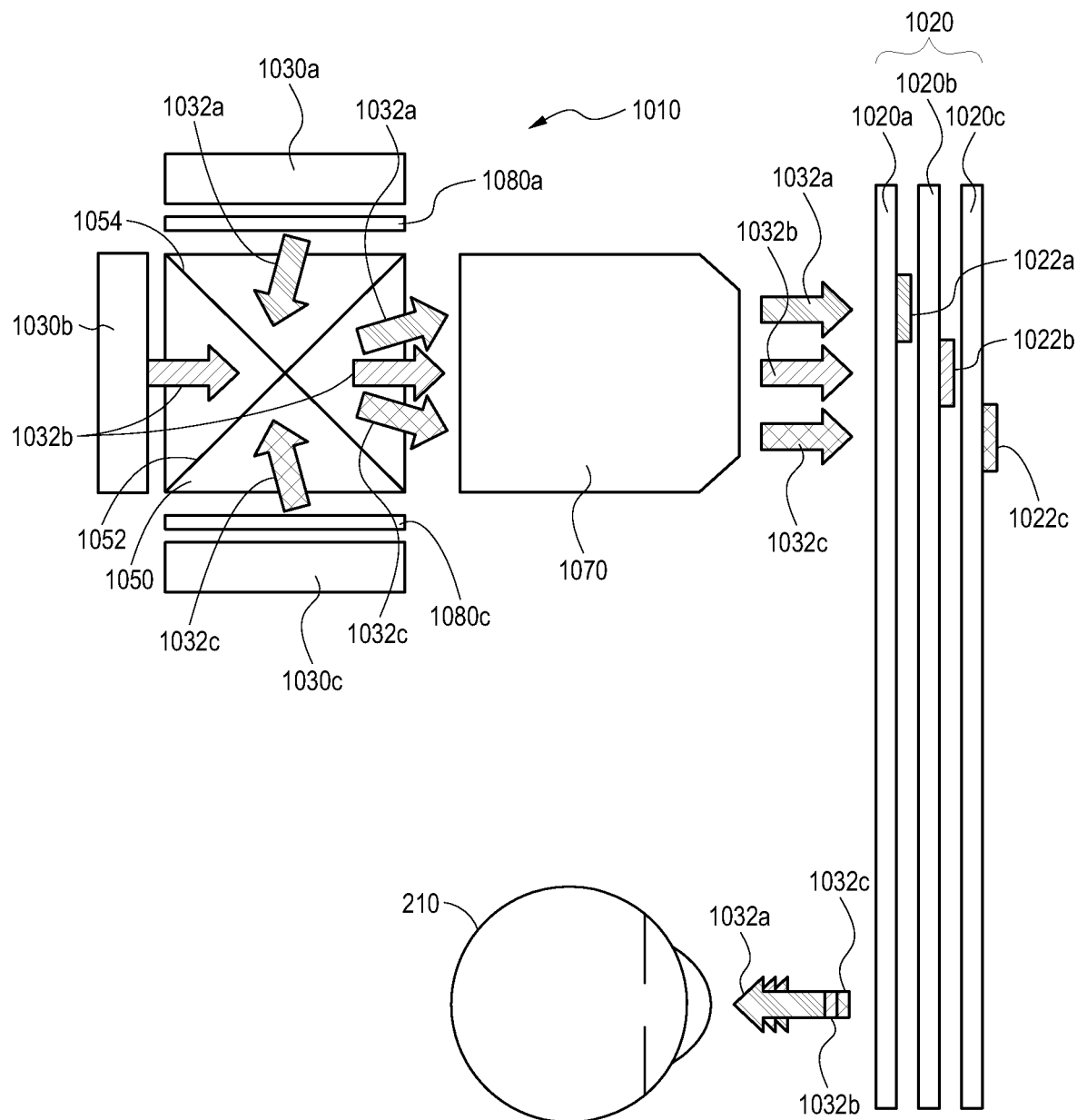
FIG. 12 illustrates another example of a wearable display system with a light projection system having multiple emissive micro-displays and associated light redirecting structures.

With reference now to FIG. 12, another example is illustrated of a wearable display system with a light projection system having multiple emissive micro-displays 1030a, 1030b, 1030c. The illustrated display system is similar to the display system of FIG. 11A except that the optical combiner 1050 has a standard X-cube prism configuration and includes light redirecting structures 1080a and 1080c for modifying the angle of incidence of light on the reflective surfaces 1052, 1054 of the X-cube prism. It will be appreciated that a standard X-cube prism configuration will receive light which is normal to a face of the X-cube and redirect this light 45° such that it is output at a normal angle from a transverse face of the X-cube. However, this would cause the image light 1032a, 1032b, 1032c to be incident on the same in-coupling optical element of the eyepiece 1020. In order to provide different paths for the image light 1032a, 1032b, 1032c, so that the image light is incident on associated ones of the in-coupling optical elements 1022a, 1022b, 1022c of the waveguide assembly, the light redirecting structures 1080a, 1080c may be utilized.

In some embodiments, the light redirecting structures 1080a, 1080c may be lens structures. It will be appreciated that the lens structures may be configured to receive incident light and to redirect the incident light at an angle such that the light reflects off a corresponding one of the reflective surfaces 1052, 1054 and propagates along a light path towards a corresponding one of the in-coupling optical elements 1022a, 1022c. As examples, the light redirecting structures 1080a, 1080c may comprise micro-lenses, nano-lenses, reflective wells, metasurfaces, and liquid crystal gratings. In some embodiments, the micro-lenses, nano-lenses, reflective wells, metasurfaces, and liquid crystal gratings may be organized in arrays. For example, each light emitter of the micro-displays 1030a, 1030c may be matched with one micro-lens. In some embodiments, in order to redirect light in a particular direction, the micro-lens or reflective wells may be asymmetrical and/or the light emitters may be disposed off-center relative to the micro-lens. In addition, in some embodiments, the light redirecting structures 1080a, 1080c may be collimators which narrow the angular emission profiles of associated light emitters, to increase the amount of light ultimately in-coupled into the eyepiece 1020. Further details regarding such light redirecting structures 1080a, 1080c are discussed below regarding FIGS. 24A-27C.

Figure 13A:
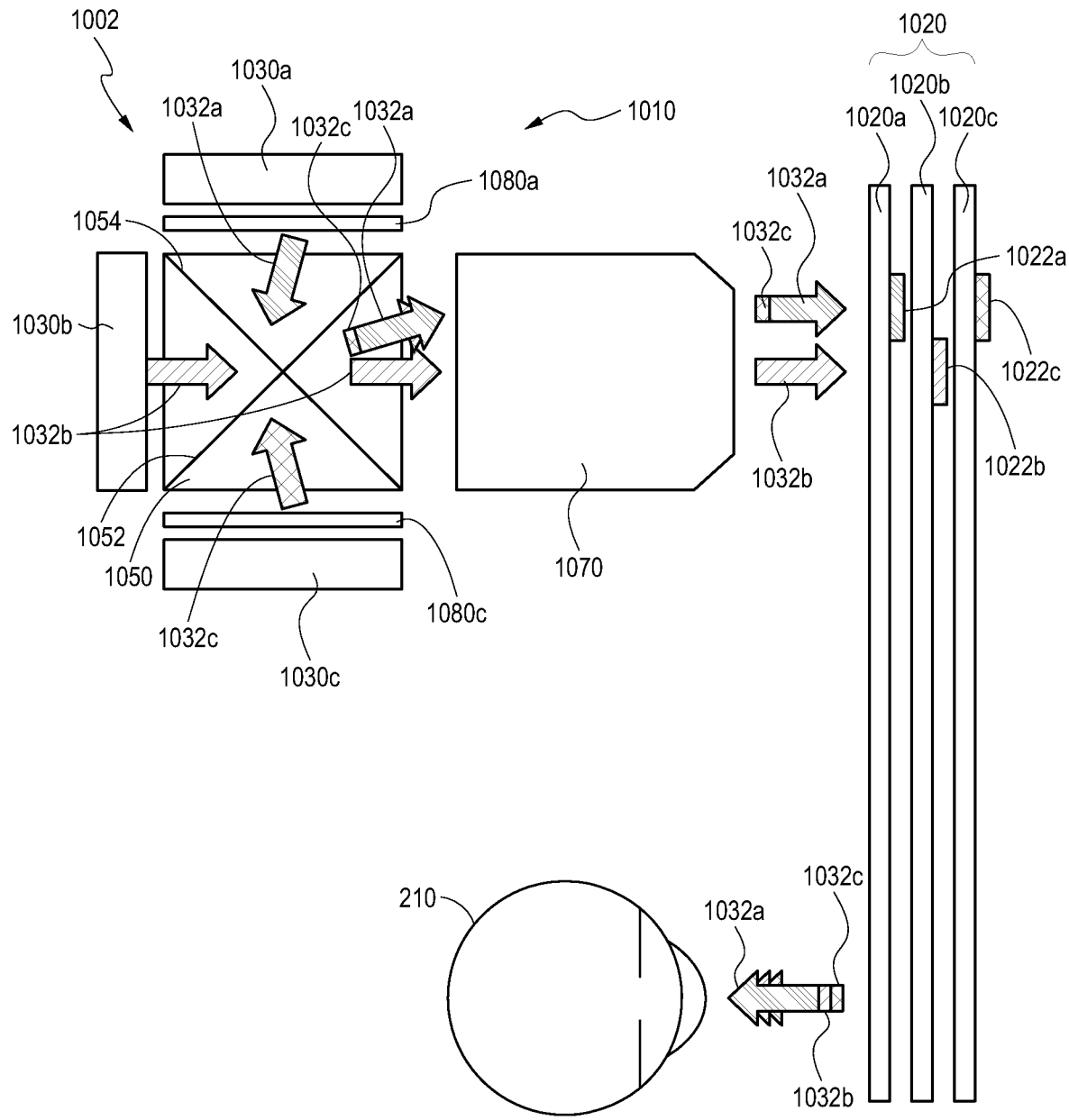
FIG. 13A illustrates an example of a side-view of a wearable display system with a light projection system having multiple emissive micro-displays and an eyepiece having waveguides with overlapping and laterally-shifted light in-coupling optical elements.

With reference now to FIG. 13A, in some embodiments, two or more of the in-coupling optical elements 1022a, 1022b, 1022c may overlap (e.g., as seen in a head-on view in the direction of light propagation into the in-coupling optical element 1022a, 1022b, 1022c). FIG. 13A illustrates an example of a side-view of a wearable display system with a light projection system 1010 having multiple emissive micro-displays 1032a, 1032b, 1032c and an eyepiece 1020 with overlapping light in-coupling optical elements 1022a, 1022c and non-overlapping light in-coupling optical element 1022b. As illustrated, the in-coupling optical elements 1022a, 1022c overlap, while the in-coupling optical elements 1022b are laterally shifted. Stated another way, the in-coupling optical elements 1022a, 1022c are aligned directly in the paths of the image light 1032a, 1032c, while the image light 1032b follows another path to the eyepiece 1020, such that it is incident on an area of the eyepiece 1020 that is laterally shifted relative to the area in which the image light 1032a, 1032c is incident.

As illustrated, differences between the paths for the image light 1032b and image light 1032a, 1032c may be established using light redirecting structures 1080a, 1080c. In some embodiments, the image light 1032b from the emissive micro-display 1030b proceeds directly through the optical combiner 1052. The image light 1032a from the emissive micro-display 1032a is redirected by the light redirecting structure 1080a such that it reflects off of the reflective surface 1054 and propagates out of the optical combiner 1050 in the same direction as the image light 1032c. It will be appreciated that the image light 1032c from the emissive micro-display 1032c is redirected by the light redirecting structure 1080c such that it reflects off of the reflective surface 1052 at an angle such that the image light 1032c propagates out of the optical combiner 1050 in the same direction as the image light 1032b. Thus, the redirection of light by the light redirecting structures 1080a, 1080c and the angles of the reflective surfaces 1052, 1054 are configured to provide a common path for the image light 1032a, 1032c out of the optical combiner 1050, with this common path being different from the path of the image light 1032b. In some other embodiments, one or both of the light redirecting structures 1080a, 1080c may be omitted and the reflective surfaces 1052, 1054 in the optical combiner 1050 may be configured to reflect the image light 1032a, 1032c in the appropriate respective directions such that they exit the optical combiner 1050 propagating in the same direction, which is different from the direction of the image light 1032b. As such, after propagating through the projection optics 1070, the image light 1032a, 1032c exit from one exit pupil while the image light 1032b exits from another exit pupil. In this configuration, the light projection system 1010 may be referred to as a two-pupil projection system.

Figure 13B:
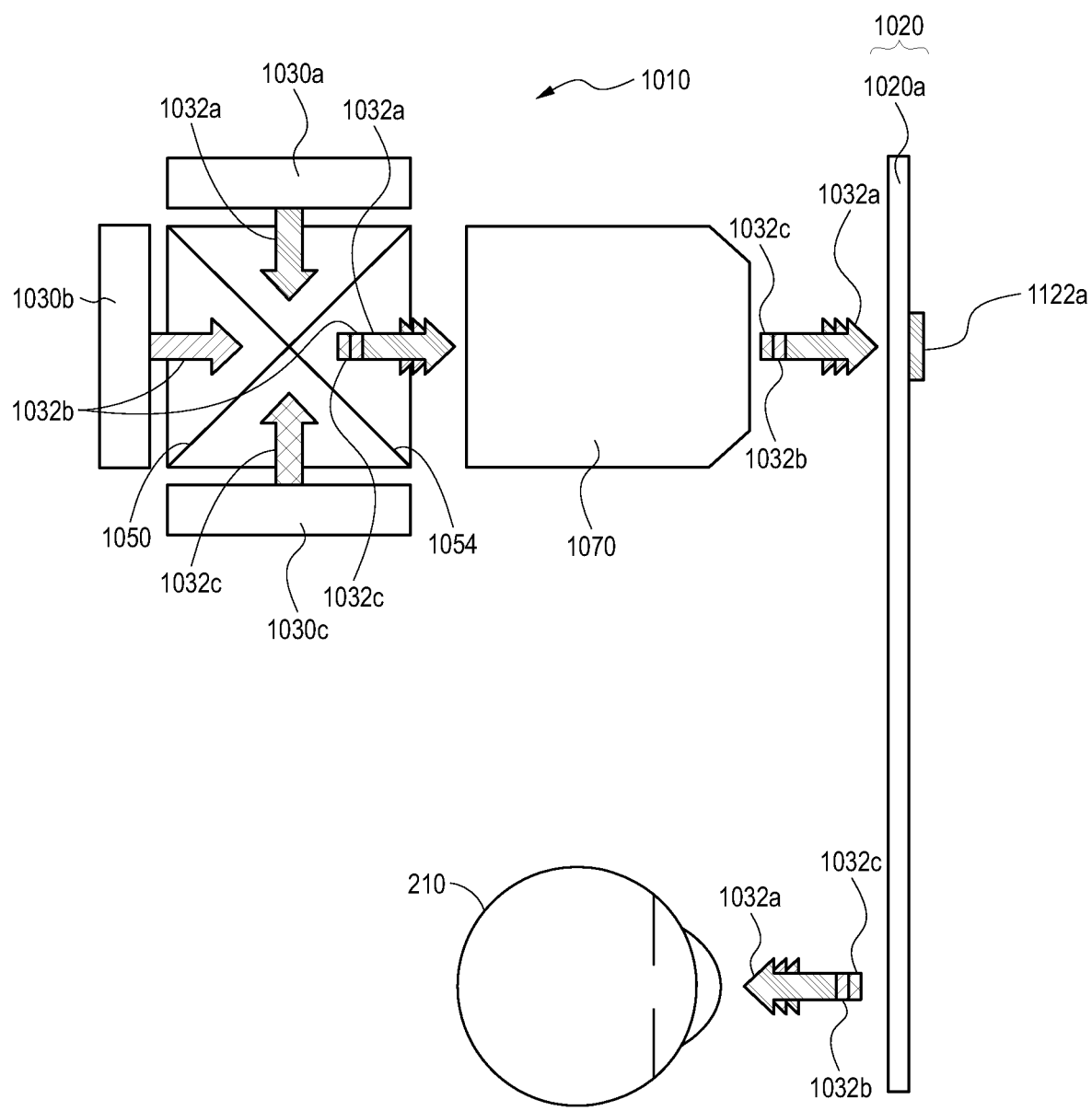
FIG. 13B illustrates another example of a wearable display system with a light projection system having multiple emissive micro-displays configured to direct light to a single light in-coupling area of an eyepiece.

In some embodiments, the light projection system 1010 may have a single output pupil and may be referred to as a single-pupil projection system. In such embodiments, the light projection system 1010 may be configured to direct the image light 1032a, 1032b, 1032c onto a single common area of the eyepiece 1020. Such a configuration is shown in FIG. 13B, which illustrates a wearable display system with a light projection system 1010 having multiple emissive micro-displays 1030a, 1030b, 1030c configured to direct light to a single light in-coupling area of the eyepiece 1020. In some embodiments, as discussed further herein, the eyepiece 1020 may include a stack of waveguides having overlapping light in-coupling optical elements. In some other embodiments, a single light in-coupling optical element may be configured to in-couple light of all component colors into a single waveguide. The display system of FIG. 13B is similar to the display system of FIG. 13A, except for the omission of the light redirecting structures 1080a, 1080c and the use of the in-coupling optical element 1122a and with the associated waveguide 1020a. As illustrated, the in-coupling optical element 1122a in-couples each of image light 1032a, 1032b, 1032c into the waveguide 1020a, which then relays the image light to the eye 210. In some embodiments, the in-coupling optical element 1122a may comprise a diffractive grating. In some embodiments, the in-coupling optical element 1122a is a metasurface and/or liquid crystal grating.

As discussed herein, in some embodiments, the emissive micro-displays 1030a, 1030b, 1030c may be monochrome micro-displays configured to emit light of different colors. In some embodiments, one or more of the emissive micro-displays 1030a, 1030b, 1030c may have groups of light emitters configured to emit light of two or more, but not all, component colors. For example, a single emissive micro-display may have groups of light emitters—with at least one light emitter per group configured to emit blue light and at least one light emitter per group configured to emit green light—and a separate emissive micro-display on a different face of the X-cube 1050 may have light emitters configured to emit red light. In some other embodiments, the emissive micro-displays 1030a, 1030b, 1030c may each be full-color displays, each having light emitters of all component colors. As noted herein, utilizing multiple similar micro-displays may provide advantages for dynamic range and increased display brightness.

Figure 14:
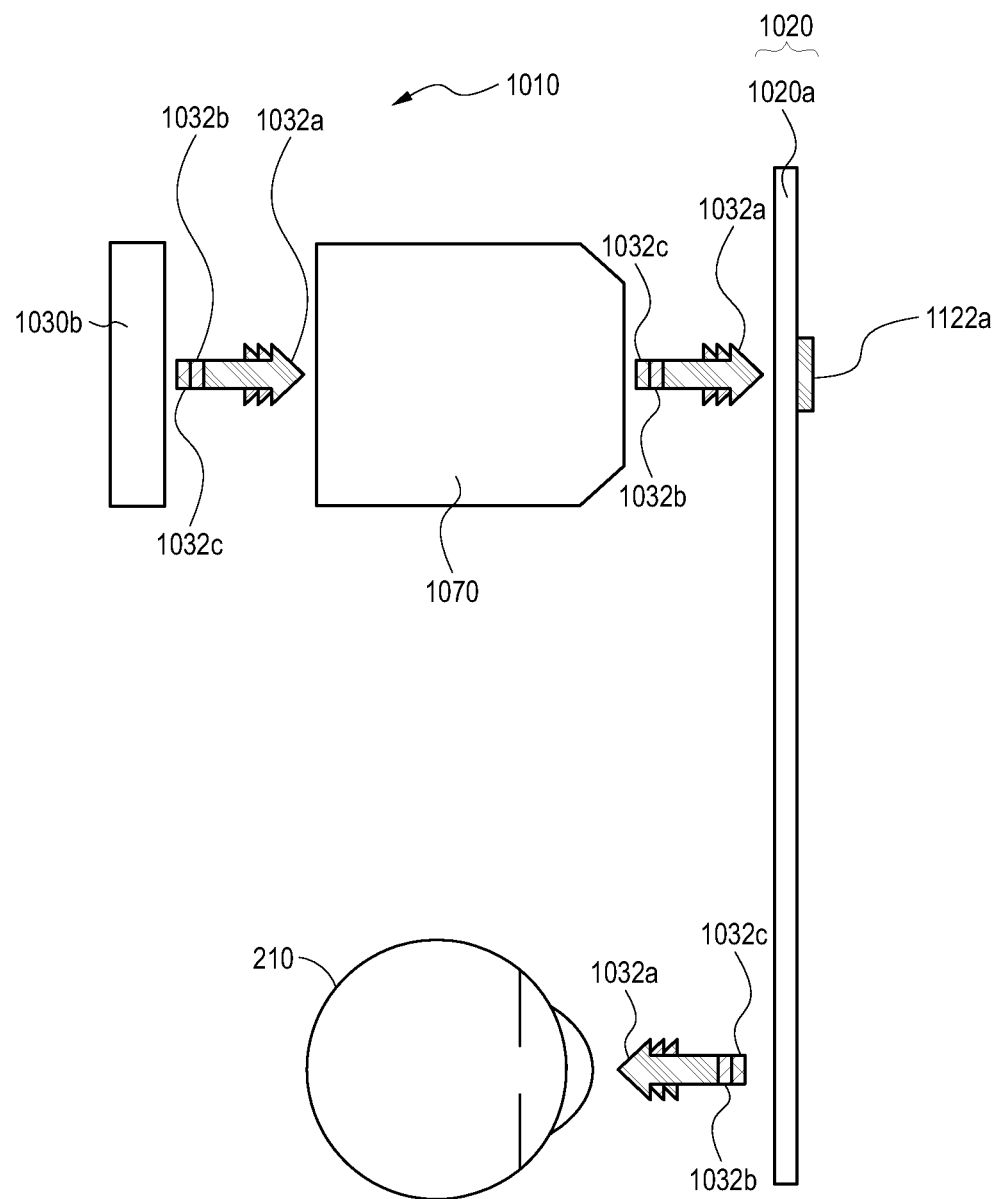
FIG. 14 illustrates an example of a wearable display system with a single emissive micro-display.

In some embodiments, a single full-color emissive micro-display may be utilized. FIG. 14 illustrates an example of a wearable display system with a single emissive micro-display 1030b. The wearable display system of FIG. 14 is similar to the wearable display system of FIG. 14, except that the single emissive micro-display 1030b is a full color micro-display configured to emit light of all component colors. As illustrated, the micro-display 1030b emits image light 1032a, 1032b, 1032c of each component color. In such embodiments, the optical combiner 1050 (FIG. 13B) may be omitted, which may advantageously reduce the weight and size of the wearable display system relative to a system with an optical combiner.

As discussed above, the in-coupling optical elements of the eyepiece 1020 may assume various configurations. Some examples of configurations for the eyepiece 1020 are discussed below in relation to FIGS. 15-23C.

Figure 15:
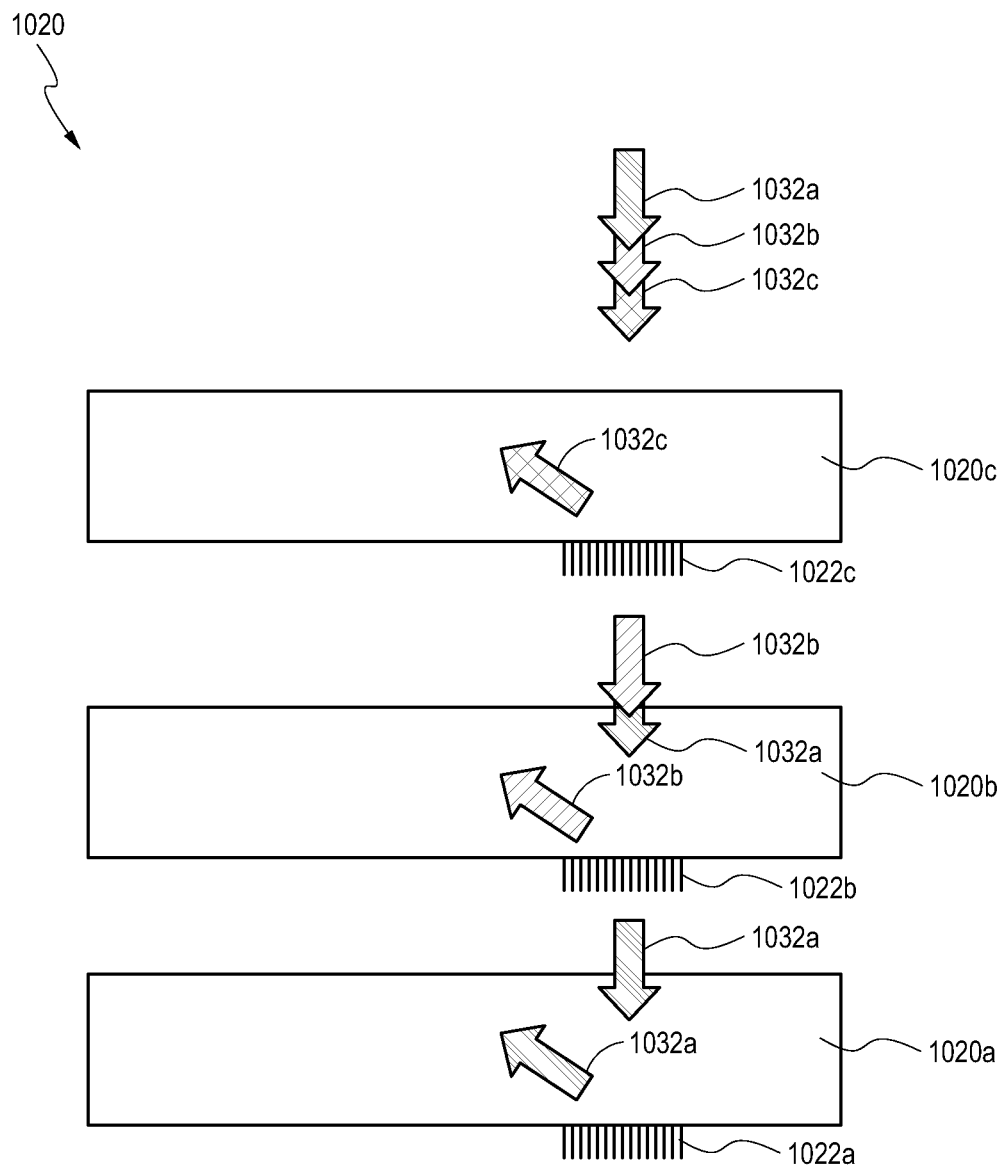
FIG. 15 illustrates a side view of an example of an eyepiece having a stack of waveguides with overlapping in-coupling optical elements.

FIG. 15 illustrates a side view of an example of an eyepiece 1020 having a stack of waveguides 1020a, 1020b, 1020c with overlapping in-coupling optical elements 1022a, 1022b, 1022c, respectively. It will be appreciated that the illustrated waveguide stack may be utilized in place of the single illustrated waveguide 1020a of FIGS. 13B and 14. As discussed herein, each of the in-coupling optical elements 1022a, 1022b, 1022c is configured to in-couple light having a specific color (e.g., light of a particular wavelength, or a range of wavelengths). In the illustrated orientation of the eyepiece 1020 in which the image light propagates vertically down the page towards the eyepiece 1020, the in-coupling optical elements 1022a, 1022b, 1022c are vertically aligned with each other (e.g., along an axis parallel to the direction of propagation of the image light 1032a, 1032b, 1032c) such that they spatially overlap with each other as seen in a top down view (a head-on view in a direction of the image light 1032a, 1032b, 1032c propagating to the in-coupling optical elements).

With continued reference to FIG. 15, as discussed herein, the projection system 1010 (FIGS. 13, 14) is configured to output a first monochrome color image, a second monochrome color image, and a third monochrome color image (e.g., red, green and blue color images) through the single-pupil of the projection system, the monochrome images being formed by the image light 1032a, 1032b, 1032c, respectively. The in-coupling optical element 1022c is configured to in-couple the image light 1032c for the first color image into the waveguide 1020c such that it propagates through the waveguide 1020c by multiple total internal reflections at the upper and bottom major surfaces of the waveguide 1020c, the in-coupling optical element 1022b is configured to in-couple the image light 1032b for the second color image into the waveguide 1020b such that it propagates through the waveguide 1020b by multiple total internal reflections at the upper and bottom major surfaces of the waveguide 1020b, and the in-coupling optical element 1022a is configured to in-couple the image light 1032a for the third color image into the waveguide 1020a such that it propagates through the waveguide 1020a by multiple total internal reflections at the upper and bottom major surfaces of the waveguide 1020a.

As discussed herein, the in-coupling optical element 1022c is preferably configured to in-couple substantially all the incident light 1032c corresponding to the first color image into the associated waveguide 1020c while allowing substantially all the incident light 1032b, 1032a corresponding to the second color image and the third color image, respectively, to be transmitted without being in-coupled. Similarly, the in-coupling optical element 1022b is preferably configured to in-couple substantially all the incident image light 1032b corresponding to the second color image into the associated waveguide 1020b while allowing substantially all the incident light corresponding to the third color image to be transmitted without being in-coupled.

It will be appreciated that, in practice, the various in-coupling optical elements may not have perfect selectivity. For example, some of the image light 1032b, 1032a may undesirably be in-coupled into the waveguide 1020c by the in-coupling optical element 1022c; and some of the incident image light 1032a may undesirably be in-coupled into the waveguide 1020b by the in-coupling optical element 1022b. Furthermore, some of the image light 1032c may be transmitted through the in-coupling optical element 1022*c* and in-coupled into waveguides 1020*b* and/or 1020*a* by the in-coupling optical elements 1020*b* and/or 1020*a*, respectively. Similarly, some of the image light 1032*b* may be transmitted through the in-coupling optical element 1022*b* and in-coupled into waveguide 1020*a* by the in-coupling optical element 1022*a*.

In-coupling image light for a color image into an unintended waveguide may cause undesirable optical effects, such as, for example cross-talk and/or ghosting. For example, in-coupling of the image light 1032*c* for the first color image into unintended waveguides 1020*b* and/or 1020*a* may result in undesirable cross-talk between the first color image, the second color image and/or the third color image; and/or may result in undesirable ghosting. As another example, in-coupling of the image light 1032*b*, 1032*a* for the second or third color image, respectively, into the unintended waveguide 1020*c* may result in undesirable cross-talk between the first color image, the second color image and/or the third color image; and/or may cause undesirable ghosting. In some embodiments, these undesirable optical effects may be mitigated by providing color filters (e.g., absorptive color filters) that may reduce the amount of incident light that is in-coupled into an unintended waveguide.

Figure 16:
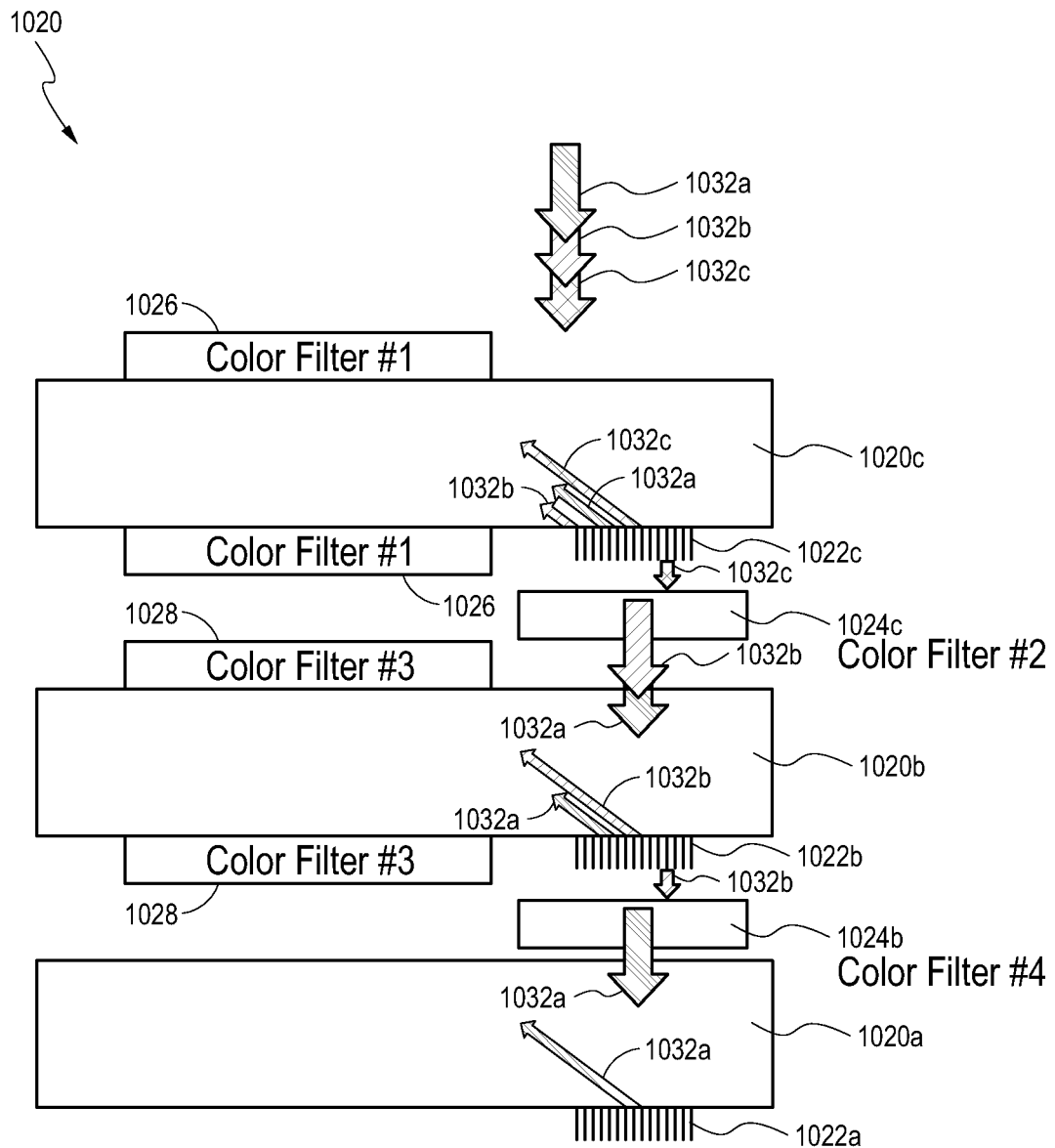
FIG. 16 illustrates a side view of an example of a stack of waveguides with color filters for mitigating ghosting or crosstalk between waveguides.

FIG. 16 illustrates a side view of an example of a stack of waveguides with color filters for mitigating ghosting or crosstalk between waveguides. The eyepiece 1020 of FIG. 16 is similar to that of FIG. 15, except for the presence of one or more of the color filters 1024*c*, 1024*b* and 1028, 1026. The color filters 1024*c*, 1024*b* are configured to reduce the amount of light unintentionally in-coupled into the waveguides 1020*b* and 1020*a*, respectively. The color filters 1028, 1026 are configured to reduce the amount of unintentionally in-coupled image light which propagates through the waveguides 1020*b*, 1020*c*, respectively.

With continued reference to FIG. 16, a pair of color filters 1026 disposed on the upper and lower major surfaces of the waveguide 1020*c* may be configured to absorb image light 1032*a*, 1032*b* that may have been unintentionally been in-coupled into waveguide 1020*c*. In some embodiments, the color filter 1024*c* disposed between the waveguides 1020*c* and 1020*b* is configured to absorb image light 1032*c* that is transmitted through the in-coupling optical element 1022*c* without being in-coupled. A pair of color filters 1028 disposed on the upper and lower major surfaces of the waveguide 1020*b* is configured to absorb image light 1032*a* that is in-coupled into waveguide 1020*b*. A color filter 1024*b* disposed between the waveguides 1020*b* and 1020*a* is configured to absorb image light 1032*b* that is transmitted through the in-coupling optical element 710.

In some embodiments, the color filters 1026 on each major surface of the waveguide 1020*c* are similar and are configured to absorb light of the wavelengths of both image light 1032*a*, 1032*b*. In some other embodiments, the color filter 1026 on one major surface of the waveguide 1020*c* may be configured to absorb light of the color of image light 1032*a*, and the color filter on the other major surface may be configured to absorb light of the color of image light 1032*b*. In either arrangement, the color filters 1026 may be configured to selectively absorb the image light 1032*a*, 1032*b* propagating through the waveguide 1020*c* by total internal reflection. For example, at TIR bounces of the image light 1032*a*, 1032*b* off the major surfaces of the waveguide 1020*c*, the image light 1032*a*, 1032*b* contacts a color filter 1026 on those major surfaces and a portion of that image light is absorbed. Preferably, due to the selective absorption of image light 1032*a*, 1032*b* by the colors filters 1026, the propagation of the in-coupled the image light 1032*c* via TIR through the waveguide 1020*c* is not appreciably affected.

Similarly, the plurality of color filters 1028 may be configured as absorption filters that absorb in-coupled image light 1032*a* that propagates through the waveguide 1020*b* by total internal reflection. At TIR bounces of the image light 1032*a* off the major surfaces of the waveguide 1020*b*, the image light 1032*a* contacts a color filter 1028 on those major surfaces and a portion of that image light is absorbed. Preferably, the absorption of the image light 1032*a* is selective and does not affect the propagation of the in-coupled image light 1032*b* that is also propagating via TIR through the waveguide 1020*b*.

With continued reference to FIG. 16, the color filters 1024*c* and 1024*b* may also be configured as absorption filters. The color filter 1024*c* may be substantially transparent to light of the colors of the image light 1032*a*, 1032*b* such that the image light 1032*a*, 1032*b* is transmitted through the color filter 1024*c* with little to no attenuation, while light of the color of the image light 1032*c* is selectively absorbed. Similarly, the color filter 1024*b* may be substantially transparent to light of the color of the image light 1032*a* such that incident image light 1032*a* is transmitted through the color filter 1024*b* with little to no attenuation, while light of the color of the image light 1032*b* is selectively absorbed. The color filter 1024*c* may be disposed on a major surface (e.g., the upper major surface) of the waveguide 1020*b* as shown in FIG. 16. Alternately, the color filter 1024*c* may be disposed on a separate substrate positioned between the waveguides 1020*c* and 1020*b*. Likewise, the color filter 1024*b* may be disposed on a major surface (e.g., an upper major surface) of the waveguide 1020*a*. Alternately, the color filter 1024*b* may be disposed on a separate substrate positioned between the waveguides 1020*b* and 1020*a*. It will be appreciated that the color filters 1024*c* and 1024*b* may be vertically aligned with the single-pupil of the projector that outputs the image light 1032*a*, 1032*b*, 1032*c* (in orientations where the image light 1032*a*, 1032*b*, 1032*c* propagates vertically to the waveguide stack 1020, as illustrated).

In some embodiments, the color filters 1026 and 1028 may have single-pass attenuation factors of less than about 10%, (e.g., less than or equal to about 5%, less than or equal to about 2%, and greater than about 1%) to avoid significant undesired absorption of light propagating through the thickness the waveguides 1020*c*, 1020*b* (e.g., light of the colors of the image light 1032*a*, 1032*b* propagating through the waveguides 1020*c*, 1020*b* from the ambient environment and/or other waveguides). Various embodiments of the color filters 1024*c* and 1024*b* may be configured to have low attenuation factors for the wavelengths that are to be transmitted and high attenuation factor for the wavelengths that are to be absorbed. For example, in some embodiments, the color filter 1024*c* may be configured to transmit greater than 80%, greater than 90%, or greater than 95%, of incident light having the colors of the image light 1032*a*, 1032*b* and absorb greater than 80%, greater than 90%, or greater than 95%, of incident light having the color of the image light 1032*a*. Similarly, the color filter 1024*b* may be configured to transmit greater than 80%, greater than 90%, or greater than 95%, of incident light having the color of the image light 1032*a* and absorb greater than 80%, greater than 90%, or greater than 95%, of incident light having the color of the image light 1032*b*.

In some embodiments, the color filters 1026, 1028, 1024*c*, 1024*b* may comprise a layer of color selective absorbing material deposited on one or both surfaces of the waveguide 1020c, 1020b and/or 1020a. The color selective absorbing material may comprise a dye, an ink, or other light absorbing material such as metals, semiconductors, and dielectrics. In some embodiments, the absorption of material such as metals, semiconductors, and dielectrics may be made color selective by utilizing these materials to form subwavelength gratings (e.g., a grating that does not diffract the light). The gratings may be made of plasmonics (e.g. gold, silver, and aluminum) or semiconductors (e.g. silicon, amorphous silicon, and germanium).

The color selective material may be deposited on the substrate using various deposition methods. For example, the color selective absorbing material may be deposited on the substrate using jet deposition technology (e.g., ink-jet deposition). Ink-jet deposition may facilitate depositing thin layers of the color selective absorbing material. Because ink-jet deposition allows for the deposition to be localized on selected areas of the substrate, ink-jet deposition provides a high degree of control over the thicknesses and compositions of the layers of the color selective absorbing material, including providing for nonuniform thicknesses and/or compositions across the substrate. In some embodiments, the color selective absorbing material deposited using ink-jet deposition may have a thickness between about 10 nm and about 1 micron (e.g., between about 10 nm and about 50 nm, between about 25 nm and about 75 nm, between about 40 nm and about 100 nm, between about 80 nm and about 300 nm, between about 200 nm and about 500 nm, between about 400 nm and about 800 nm, between about 500 nm and about 1 micron, or any value in a range/sub-range defined by any of these values). Controlling the thickness of the deposited layer of the color selective absorbing material may be advantageous in achieving a color filter having a desired attenuation factor. Furthermore, layers having different thickness may be deposited in different portions of the substrate. Additionally, different compositions of the color selective absorbing material may be deposited in different portions of the substrate using ink-jet deposition. Such variations in composition and/or thickness may advantageously allowing for location-specific variations in absorption. For example, in areas of a waveguide in which transmission of light from the ambient (to allow the viewer to see the ambient environment) is not necessary, the composition and/or thickness may be selected to provide high absorption or attenuation of selected wavelengths of light. Other deposition methods such as coating, spin-coating, spraying, etc. may be employed to deposit the color selective absorbing material on the substrate.

Figure 17:
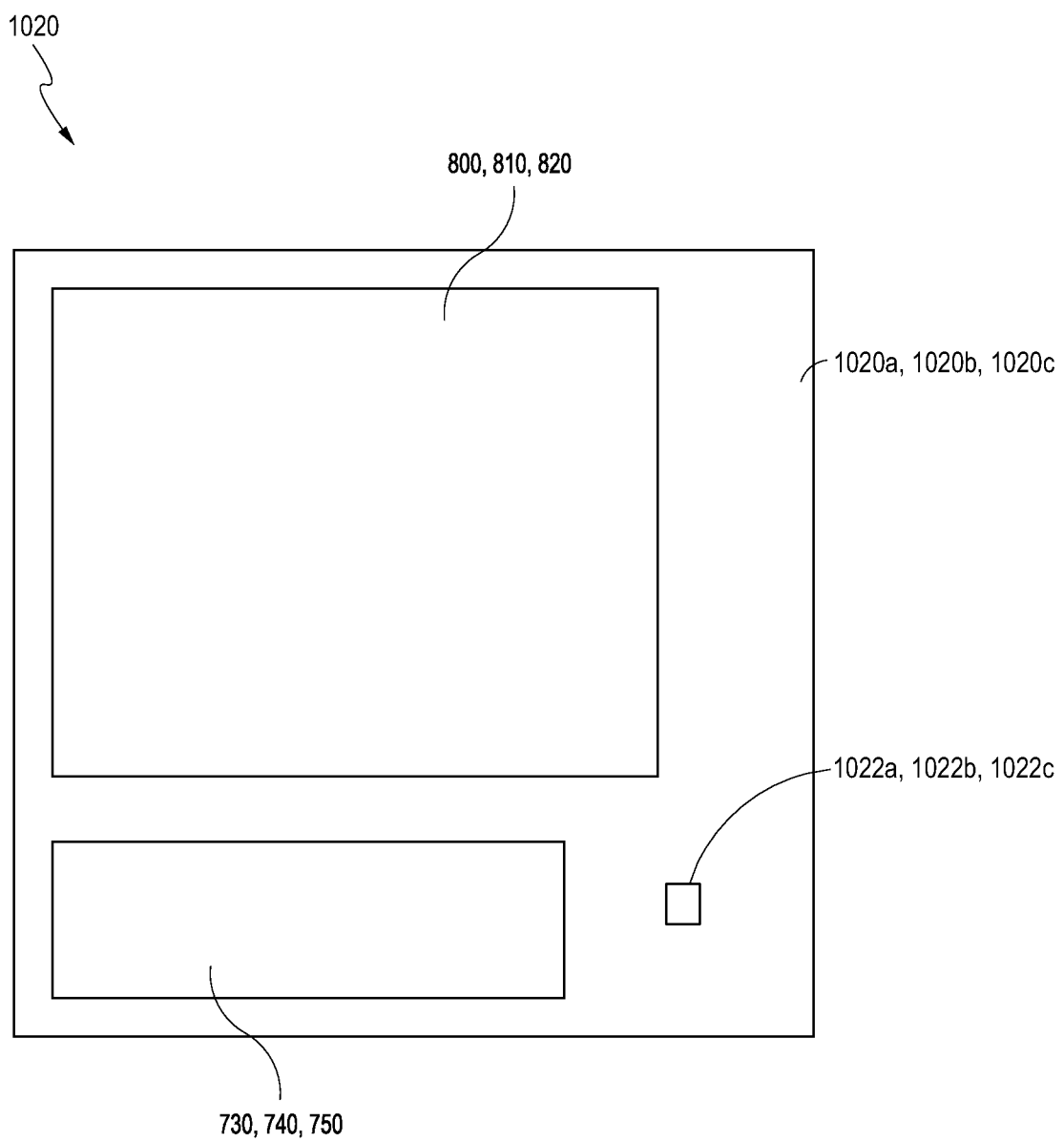
FIG. 17 illustrates an example of a top-down view of the eyepieces of FIGS. 15 and 16.

FIG. 17 illustrates an example of a top-down view of the waveguide assemblies of FIGS. 15 and 16. As illustrated, in-coupling optical elements 1022a, 1022b, 1022c spatially overlap. In addition, the waveguides 1020a, 1020b, 1020c, along with each waveguide's associated light distributing element 730, 740, 750 and associated out-coupling optical element 800, 810, 820, may be vertically aligned. The in-coupling optical elements 1022a, 1022b, 1022c are configured to in-couple incident image light 1032a, 1032b, 1032c (FIGS. 15 and 16), respectively, in waveguides 1020a, 1020b, 1020c, respectively, such that the image light propagates towards the associated light distributing element 730, 740, 750 by TIR.

Figure 18:
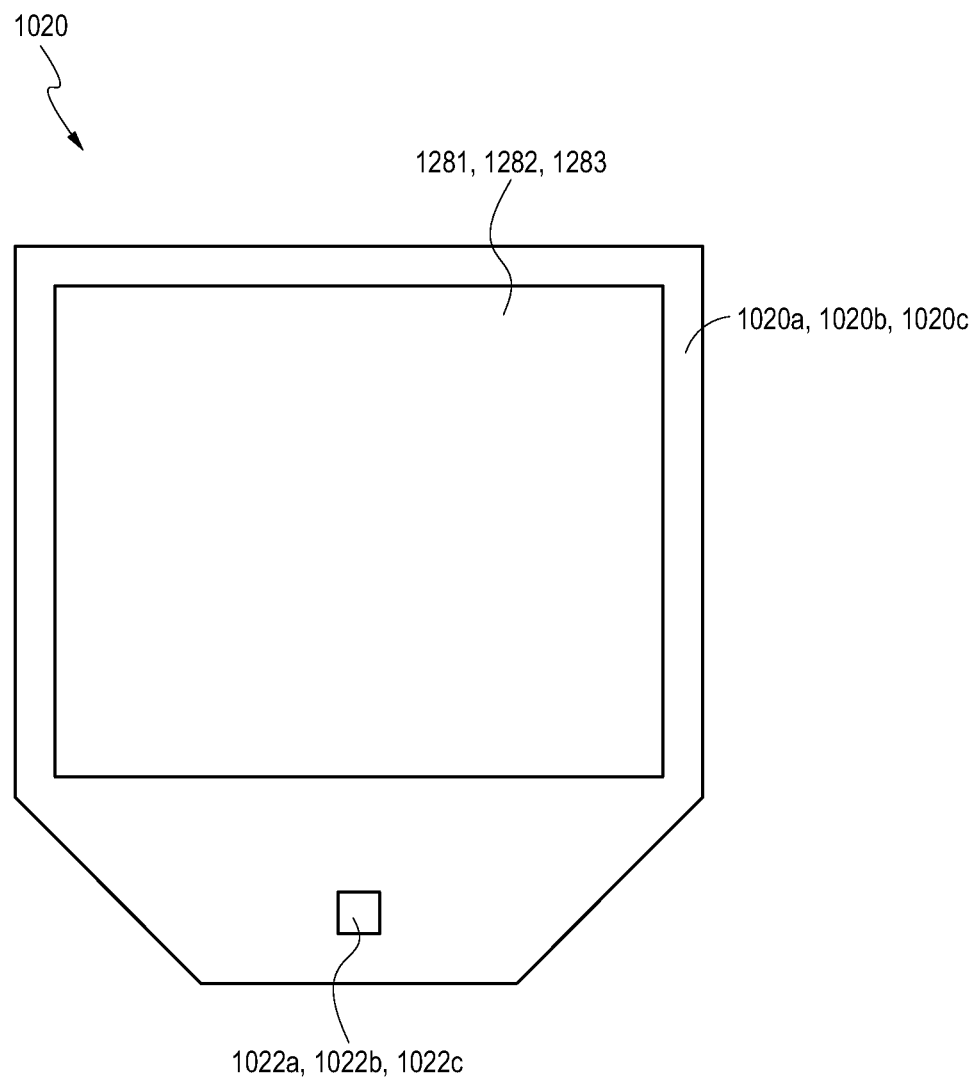
FIG. 18 illustrates another example of a top-down view of the eyepieces of FIGS. 15 and 16.

FIG. 18 illustrates another example of a top-down view of the waveguide assemblies of FIGS. 15 and 16. As in FIG. 17, in-coupling optical elements 1022a, 1022b, 1022c spatially overlap and the waveguides 1020a, 1020b, 1020c are vertically aligned. In place of each waveguide's associated light distributing element 730, 740, 750 and associated out-coupling optical element 800, 810, 820, however, are combined OPE/EPE's 1281, 1282, 1283, respectively. The in-coupling optical elements 1022a, 1022b, 1022c are configured to in-couple incident image light 1032a, 1032b, 1032c (FIGS. 15 and 16), respectively, in waveguides 1020a, 1020b, 1020c, respectively, such that the image light propagates towards the associated combined OPE/EPE's 1281, 1282, 1283 by TIR.

While FIGS. 15-18 show overlapping in-coupling optical elements for a single-pupil configuration of the display system, it will be appreciated that the display system may have a two-pupil configuration in some embodiments. In such a configuration, where three component colors are utilized, image light for two colors may have overlapping in-coupling optical elements, while image light for a third color may have a laterally-shifted in-coupling optical element. For example, the optical combiner 1050 (FIGS. 11A, 12, 13A-13B) and/or light redirecting structures 1080a, 1080c may be configured to direct image light through the projection optics 1070 such that image light of two colors are incident on directly overlapping areas of the eyepiece 1020 while another color of the image light is incident on an area that is laterally-shifted. For example, the reflective surfaces 1052, 1054 (FIG. 11A) may be angled such that image light of one color follows a common light path with image light from the emissive micro-display 1030b, while image light of another color follows a different light path. In some embodiments, rather than having both light redirecting structures 1080a, 1080c (FIG. 12), one of these light redirecting structures may be omitted, so that only light from one of the micro-displays 1030a, 1030c is angled to provide a different light path from the light emitted by the other two micro-displays.

Figure 19A:
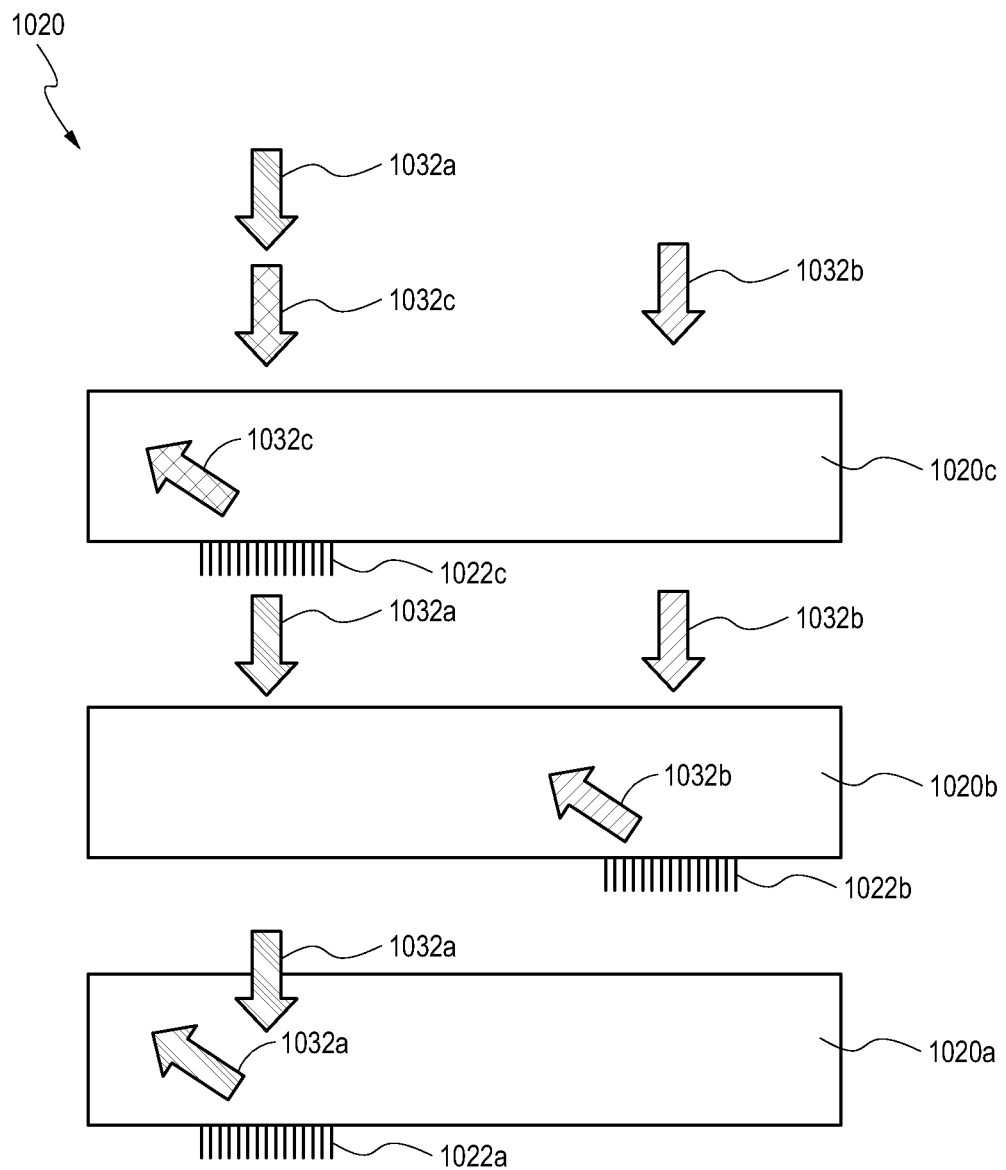
FIG. 19A illustrates a side view of an example of an eyepiece having a stack of waveguides with overlapping and laterally-shifted in-coupling optical elements.

FIG. 19A illustrates a side view of an example of an eyepiece having a stack of waveguides with some overlapping and some laterally-shifted in-coupling optical elements. The eyepiece of FIG. 19A is similar to the eyepiece of FIG. 15, except that one of the in-coupling optical elements is laterally shifted relative to the other in-coping optical elements. In the illustrated orientation of the eyepiece 1020 in which the image light propagates vertically down the page towards the eyepiece 1020, the in-coupling optical elements 1022a, 1022c are vertically aligned with each other (e.g., along an axis parallel to the direction of propagation of the image light 1032a, 1032c) such that they spatially overlap with each other as seen in a head-on view in a direction of the image light 1032a, 1032c propagating to the in-coupling optical elements 1022a, 1022b, 1022c. As seen in the same head-on view (e.g., as seen in a top-down view in the illustrated orientation), the in-coupling optical element 1022b is shifted laterally relative to the other in-coupling optical elements 1022a, 1022c. Light for the in-coupling optical element 1022b is output to the eyepiece 1020 through a different exit pupil than light for the in-coupling optical elements 1022a, 1022c. It will be appreciated that the illustrated waveguide stack comprising the waveguides 1020a, 1020b, 1020c may be utilized in place of the single illustrated waveguide 1020a of FIGS. 13 and 14.

With continued reference to FIG. 19, the in-coupling optical element 1022c is configured to in-couple the image light 1032c into the waveguide 1020c such that it propagates through the waveguide 1020c by multiple total internal reflections between the upper and bottom major surfaces of the waveguide 1020c, the in-coupling optical element 1022b is configured to in-couple the image light 1032b into the waveguide 1020b such that it propagates through the waveguide 1020b by multiple total internal reflections between the upper and bottom major surfaces of the waveguide 1020b, and the in-coupling optical element 1022a is configured to in-couple the image light 1032a into the waveguide 1020a such that it propagates through the waveguide 1020a by multiple total internal reflections between the upper and bottom major surfaces of the waveguide 1020a.

The in-coupling optical element 1022c is preferably configured to in-couple all the incident light 1032c into the associated waveguide 1020c while being transmissive to all the incident light 1032a. On the other hand, the image light 1032b may propagate to the in-coupling optical element 1022b without needing to propagate through any other in-coupling optical elements. This may be advantageous in some embodiments by allowing light, to which the eye is more sensitive, to be incident on a desired in-coupling optical element without any loss or distortion associated with propagation through other in-coupling optical elements. Without being limited by theory, in some embodiments, the image light 1032b is green light, to which the human eye is more sensitive. It will be appreciated that, while the waveguides 1020a, 1020b, 1020c are illustrated arranged a particular order, in some embodiments, the order of the waveguides 1020a, 1020b, 1020c may differ.

It will be appreciated that, as discussed herein, the in-coupling optical element 1022c overlying the in-coupling optical elements 1022a may not have perfect selectivity. Some of the image light 1032a may undesirably be in-coupled into the waveguide 1020c by the in-coupling optical element 1022c; and some of the image light 1032c may be transmitted through the in-coupling optical element 1022c, after which the image light 1032c may strike the in-coupling optical element 1020a and be in-coupled into the waveguide 1020a. As discussed herein, such undesired in-coupling may be visible as ghosting or crosstalk.

Figure 19B:
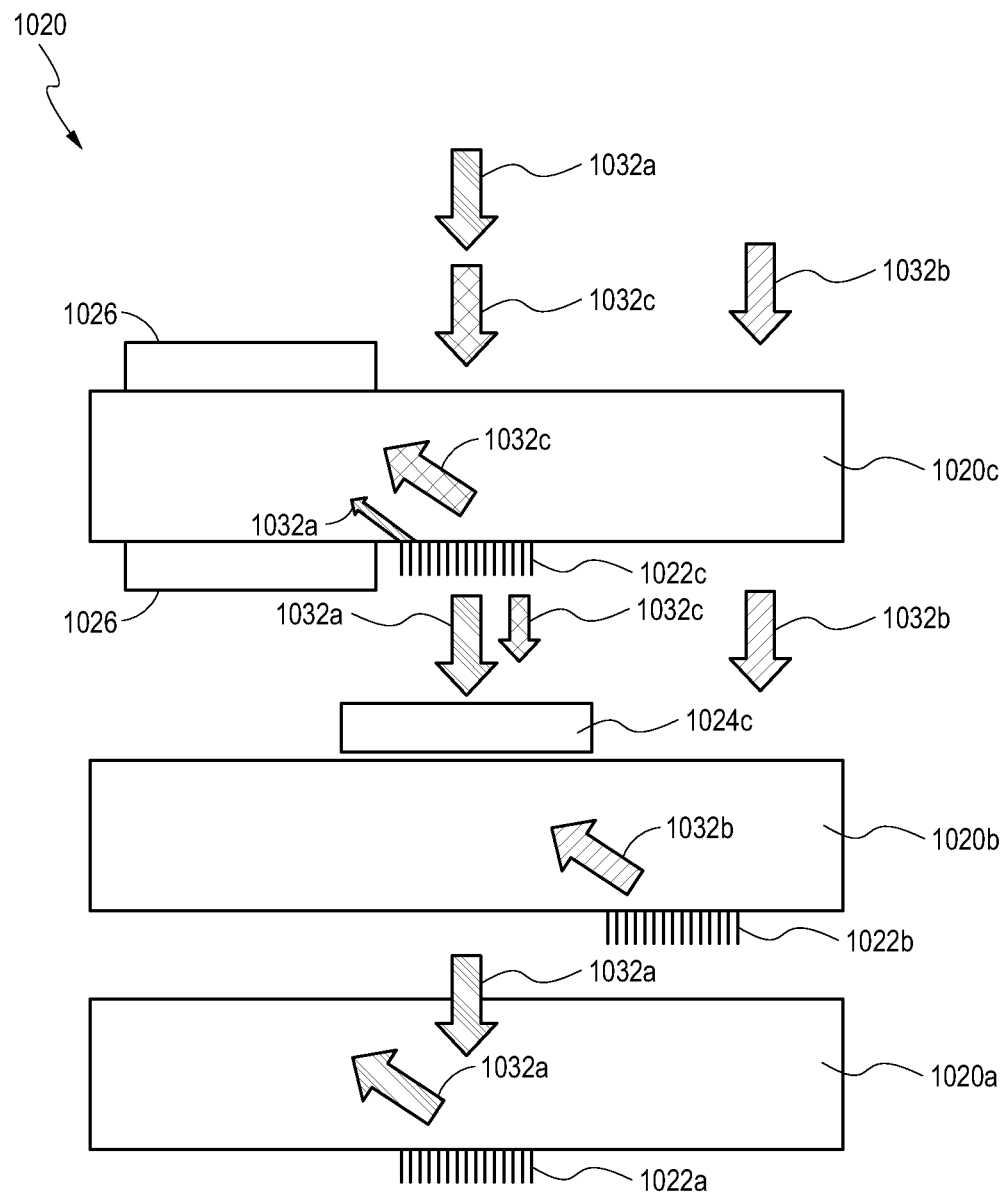
FIG. 19B illustrates a side view of an example of the eyepiece of FIG. 19A with color filters for mitigating ghosting or crosstalk between waveguides.

FIG. 19B illustrates a side view of an example of the eyepiece of FIG. 19A with color filters for mitigating ghosting or crosstalk between waveguides. In particular, color filters 1024c and/or 1026 are added to the structures shown in FIG. 19A. As illustrated, the in-coupling optical element 1022c may unintentionally in-couple a portion of the image light 1032a into the waveguide 1020c. In addition, or alternatively, a portion of the image light 1032c undesirably be transmitted through the in-coupling optical element 1022c after which it may unintentionally be in-coupled by the in-coupling optical element 1022a.

To mitigate unintentionally in-couple image light 1032a propagating through the waveguide 1022c, absorptive color filters 1026 may be provided on one or both major surfaces of the waveguide 1022c. The absorptive color filters 1026 may be configured to absorb light of the color of the unintentionally in-coupled image light 1032a. As illustrated, the absorptive color filters 1026 are disposed in the general direction of propagation of the image light through the waveguide 1020c. Thus, the absorptive color filters 1026 are configured to absorb image light 1032a as that light propagates through the waveguide 1020c by TIR and contacts the absorptive color filters 1026 while reflecting off one or both of the major surfaces of the waveguide 1020c.

With continued reference to FIG. 19B, to mitigate image light 1032c which propagates through the in-coupling optical element 1022c without being in-coupled, the absorptive color filter 1024c may be provided forward of the in-coupling optical element 1022a. The absorptive color filter 1024c is configured to absorb light of the color of the image light 1032c, to prevent that light from propagating to the in-coupling optical element 1022a. While illustrated between the waveguides 1020c and 1020b, in some other embodiments, the absorptive color filter 1024c may be disposed between the waveguides 1020b and 1020a. It will be appreciated that further details regarding the composition, formation, and properties of the absorptive color filters 1024c and 1026 are provided in the discussion of FIG. 16.

It will also be appreciated that in the embodiments illustrated in FIGS. 16 and 19B, one or more of the color filters 1026, 1028, 1024c, and 1024b may be omitted if one or more in-coupling optical elements 1022a, 1022b, 1022c have sufficiently high selectivity for the color of the light that is intended to be in-coupled into the associated waveguide 1020a, 1020b, 1022c, respectively.

Figure 20A:
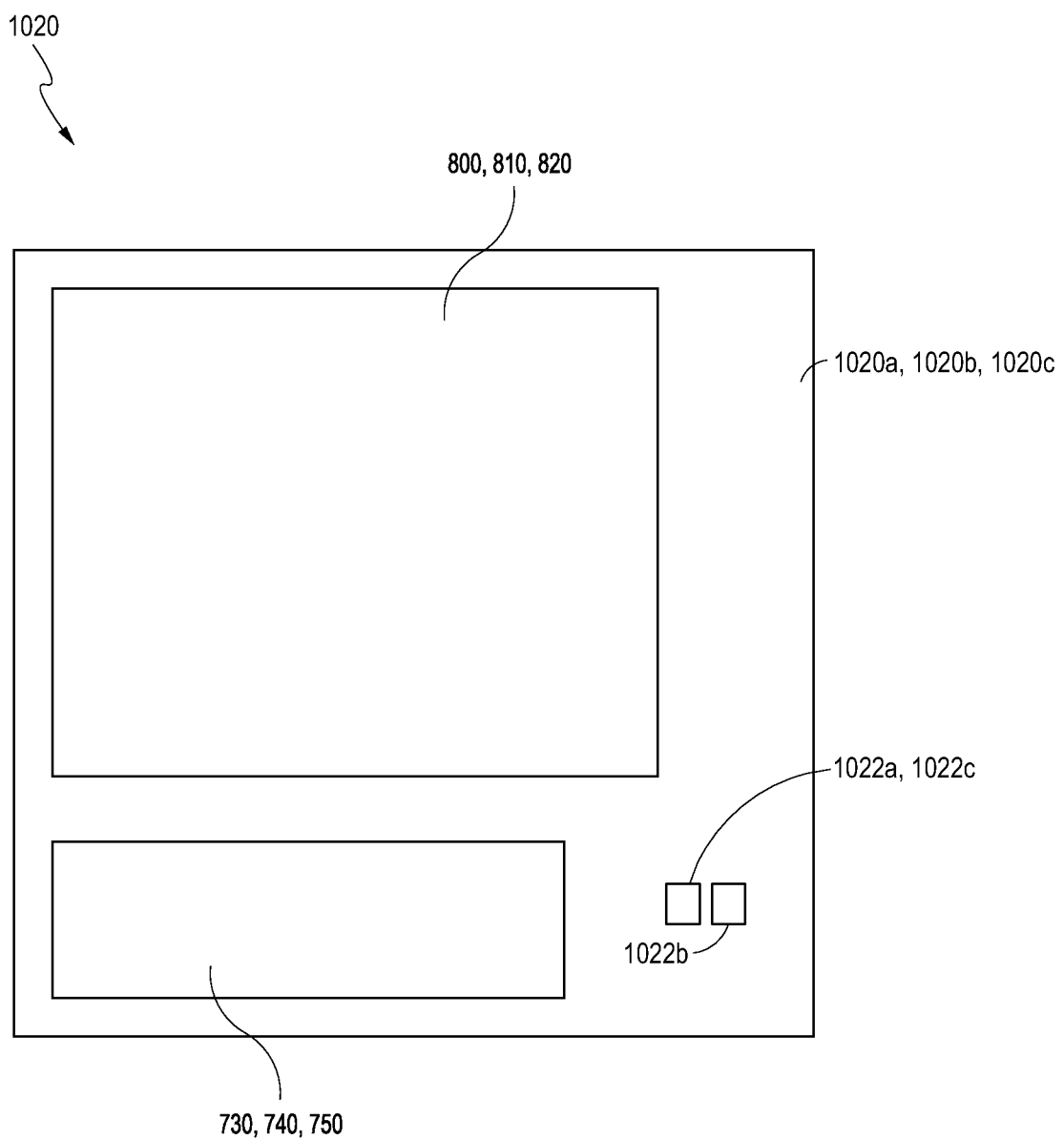
FIG. 20A illustrates an example of a top-down view of the eyepieces of FIGS. 19A and 19B.

FIG. 20A illustrates an example of a top-down view of the eyepieces of FIGS. 19A and 19B. As illustrated, in-coupling optical elements 1022a, 1022c spatially overlap, while in-coupling optical element 1022b is laterally-shifted. In addition, the waveguides 1020a, 1020b, 1020c, along with each waveguide's associated light distributing element 730, 740, 750 and associated out-coupling optical element 800, 810, 820, may be vertically aligned. The in-coupling optical elements 1022a, 1022b, 1022c are configured to in-couple incident image light 1032a, 1032b, 1032c (FIGS. 15 and 16), respectively, in waveguides 1020a, 1020b, 1020c, respectively, such that the image light propagates towards the associated light distributing element 730, 740, 750 by TIR.

Figure 20B:
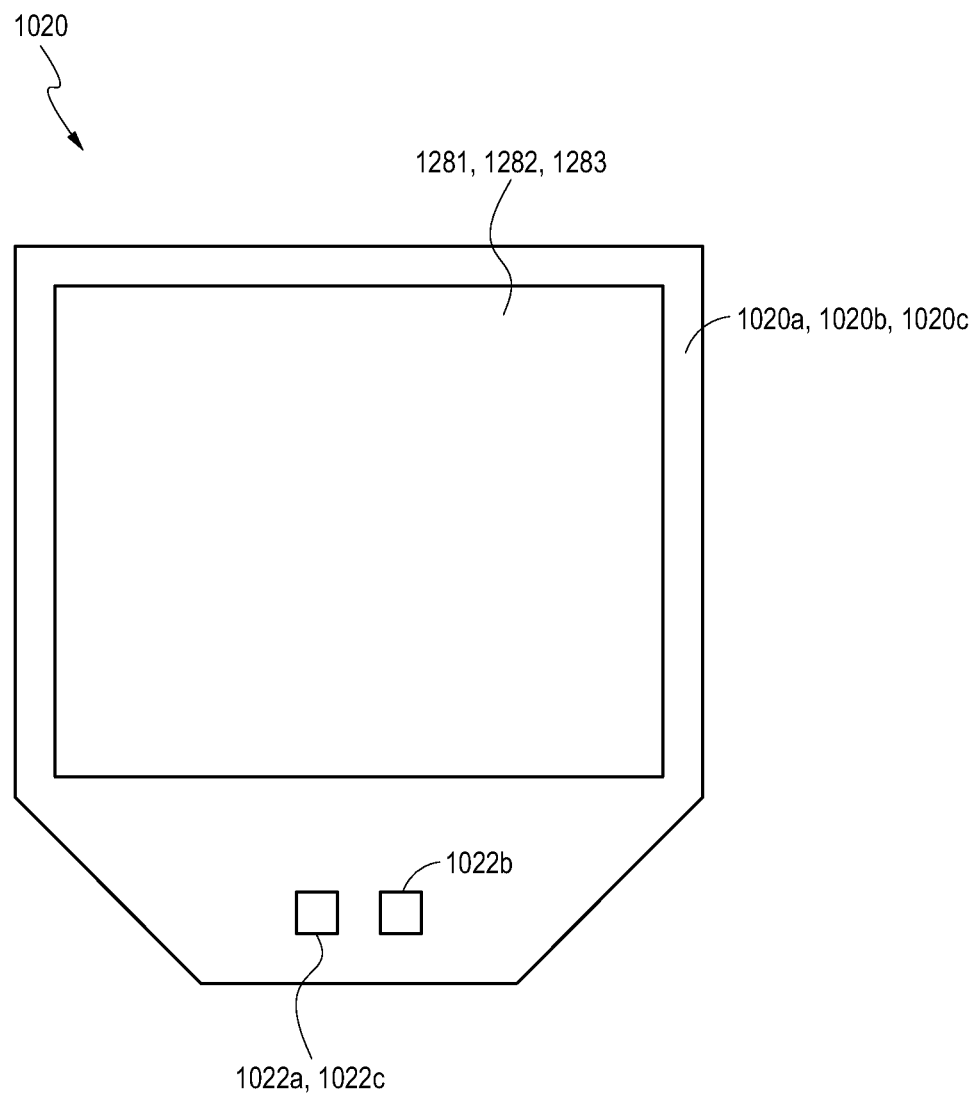
FIG. 20B illustrates another example of a top-down view of the eyepieces of FIGS. 19A and 19B.

FIG. 20B illustrates another example of a top-down view of the waveguide assembly of FIGS. 19A and 19B. As in FIG. 20A, in-coupling optical elements 1022a, 1022c spatially overlap, the in-coupling optical element is laterally-shifted, and the waveguides 1020a, 1020b, 1020c are vertically aligned. In place of each waveguide's associated light distributing element 730, 740, 750 and associated out-coupling optical element 800, 810, 820, however, are combined OPE/EPE's 1281, 1282, 1283, respectively. The in-coupling optical elements 1022a, 1022b, 1022c are configured to in-couple incident image light 1032a, 1032b, 1032c (FIGS. 15 and 16), respectively, in waveguides 1020a, 1020b, 1020c, respectively, such that the image light propagates towards the associated combined OPE/EPE's 1281, 1282, 1283 by TIR.

Figure 21:
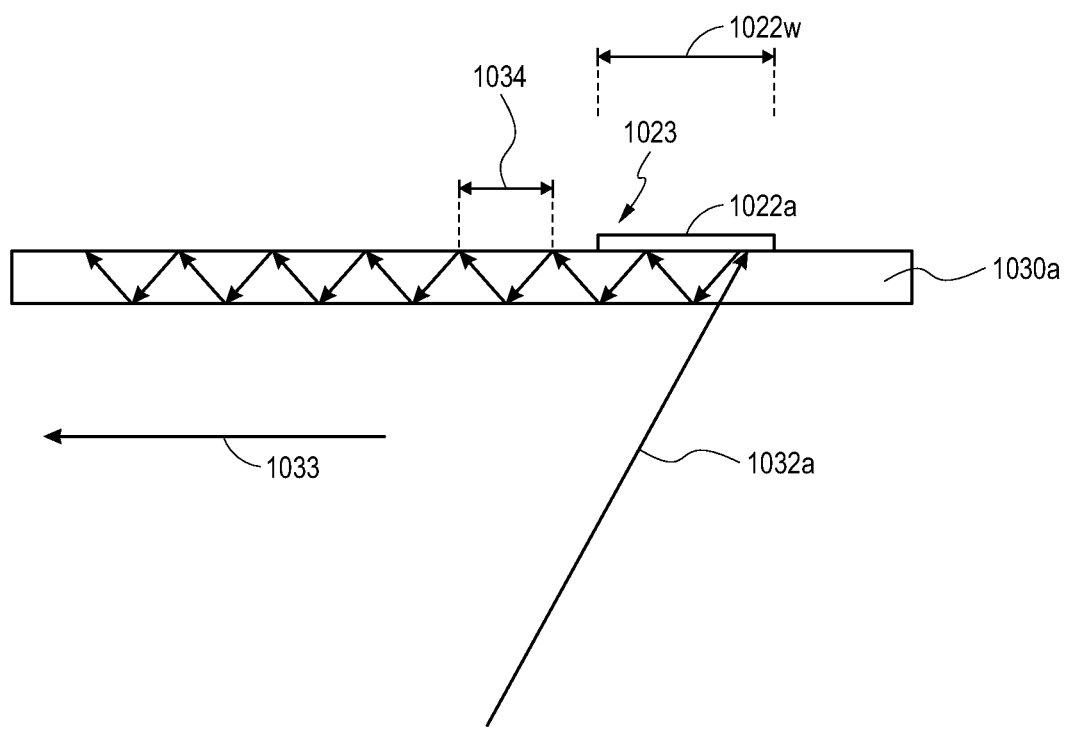
FIG. 21 illustrates a side view of an example of re-bounce in a waveguide.

With reference now to FIG. 21, it will be appreciated that re-bounce of in-coupled light may undesirably occur in waveguides. Re-bounce occurs when in-coupled light propagating along a waveguide strikes the in-coupling optical element a second or subsequent time after the initial in-coupling incidence. Re-bounce may result in a portion of the in-coupled light being undesirably out-coupled and/or absorbed by a material of the in-coupling optical element. The out-coupling and/or light absorption undesirably may cause a reduction in overall in-coupling efficiency and/or uniformity of the in-coupled light.

FIG. 21 illustrates a side view of an example of re-bounce in a waveguide 1030a. As illustrated, image light 1032a is in-coupled into the waveguide 1030a by in-coupling optical element 1022a. In-coupling optical element 1022a redirects the image light 1032a such that it generally propagates through the waveguide in the direction 1033. Re-bounce may occur when in-coupled image light internally reflects or bounces off a major surface of the waveguide 1030a opposite the in-coupling optical element 1022a and is incident on or experiences a second bounce (a re-bounce) at the in-coupling optical element 1022a. The distance between two neighboring bounces on the same surface of the waveguide 1030a is indicated by spacing 1034.

Without being limited by theory, it will be appreciated that the in-coupling optical element 1022a may behave symmetrically; that is, it may redirect incident light such that the incident light propagates through the waveguide at TIR angles. However, light that is incident on the diffractive optical elements at TIR angles (such as upon re-bounce) may also be out-coupled. In addition or alternatively, in embodiments where the in-coupling optical element 1022a is coated with a reflective material, it will be understood that the reflection of light off of a layer of material such as metal may also involve partial absorption of the incident light, since reflection may involve the absorption and emission of light from a material. As a result, light out-coupling and/or absorption may undesirably cause loss of in-coupled light. Accordingly, re-bounced light may incur significant losses, as compared with light that interacts only once with the in-coupling optical element 1022a.

In some embodiments, the in-coupling elements are configured to mitigate in-coupled image light loss due to re-bounce. Generally, re-bounce of in-coupled light occurs towards the end 1023 of the in-coupling optical element 1022a in the propagation direction 1033 of the in-coupled light. For example, light in-coupled at the end of the in-coupling optical element 1022a opposite the end 1023 may re-bounce if the spacing 1034 for that light is sufficiently short. To avoid such re-bounce, in some embodiments, the in-coupling optical element 1022a is truncated at the propagation direction end 1023, to reduce the width 1022w of the in-coupling optical element 1022a along which re-bounce is likely to occur. In some embodiments, the truncation may be a complete truncation of all structures of the in-coupling optical element 1022a (e.g., the metallization and diffractive gratings). In some other embodiments, for example, where the in-coupling optical element 1022a comprises a metalized diffraction grating, a portion of the in-coupling optical element 1022a at the propagation direction end 1023 may not be metalized, such that the propagation direction end 1023 of the in-coupling optical element 1022a absorbs less re-bouncing light and/or outcouples re-bouncing light with a lower efficiency. In some embodiments, a diffractive region of an in-coupling optical element 1022a may have a width along a propagation direction 1033 shorter than its length perpendicular to the propagation direction 1033, and/or may be sized and shaped such that a first portion of image light 1032a is incident on the in-coupling optical element 1022a and a second portion of the beam of light impinges on the waveguide 1030a without being incident on the in-coupling optical element 1022a. While waveguide 1032a and light in-coupling optical element 1022a are illustrated alone for clarity, it will be appreciated that re-bounce and the strategies discussed for reducing re-bounce may apply to any of the in-coupling optical elements disclosed herein. It will also be appreciated that the spacing 1034 is related to the thickness of the waveguide 1030a (a larger thickness results in a larger spacing 1034). In some embodiments, the thickness of individual waveguides may be selected to set the spacing 1034 such that re-bounce does not occur. Further details regarding re-bounce mitigation may be found in U.S. Provisional Application No. 62/702,707, filed on Jul. 24, 2018, the entire disclosure of which is incorporated by reference herein.

Figure 22A:
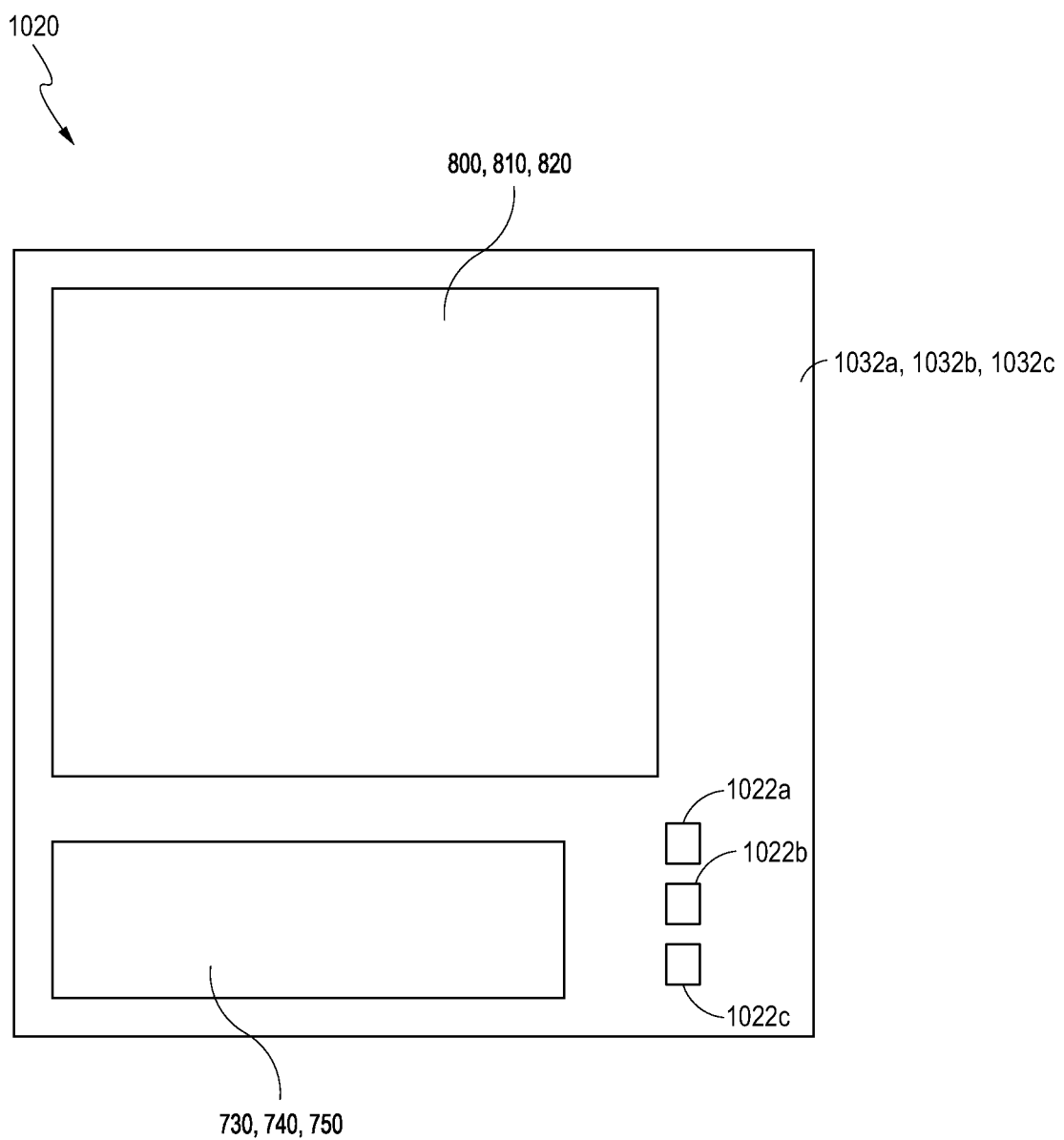
FIGS. 22A-22C illustrate examples of top-down views of an eyepiece having in-coupling optical elements configured to reduce re-bounce.
Figure 22B:
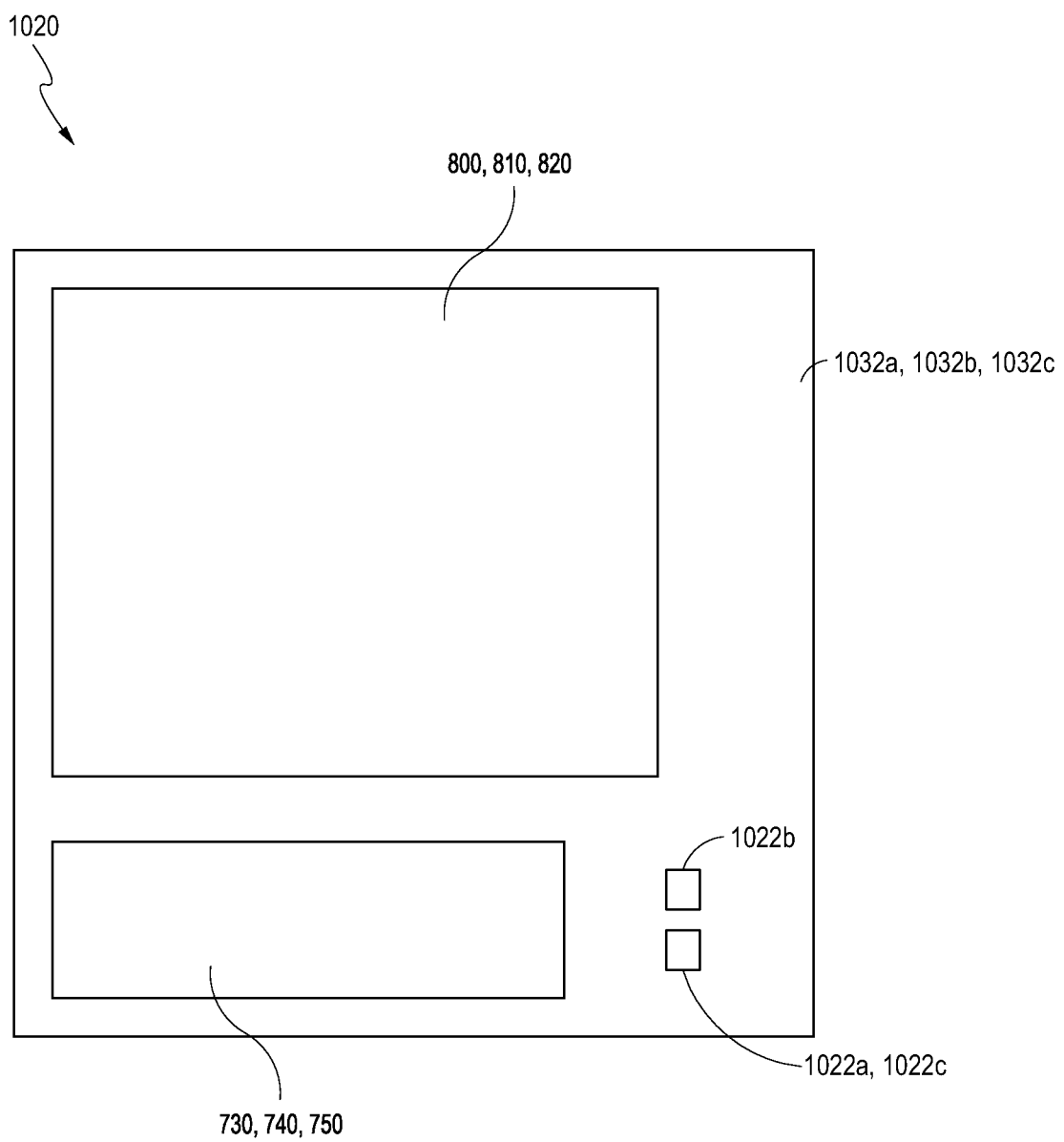
Figure 22C:
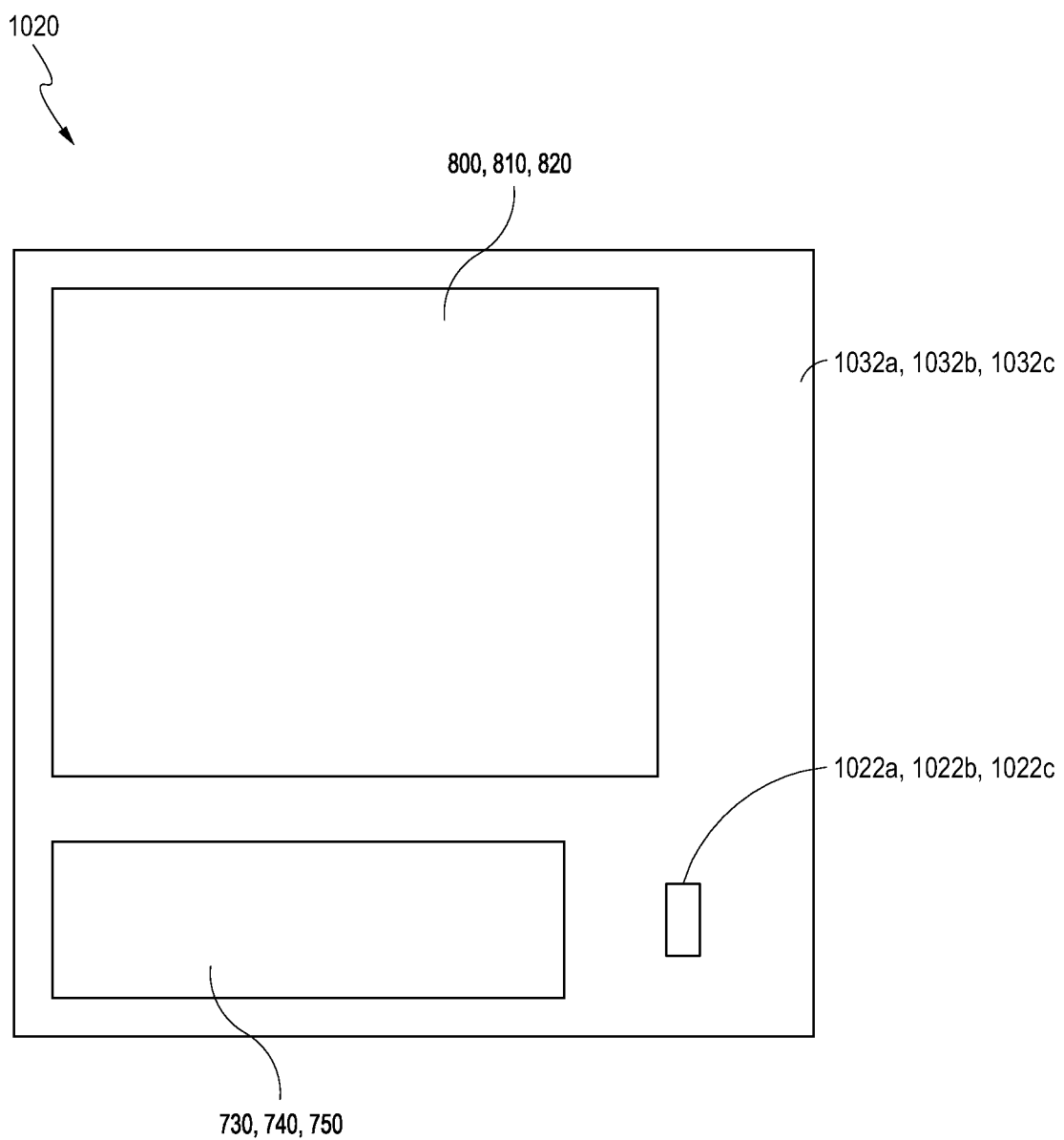
Figure 23A:
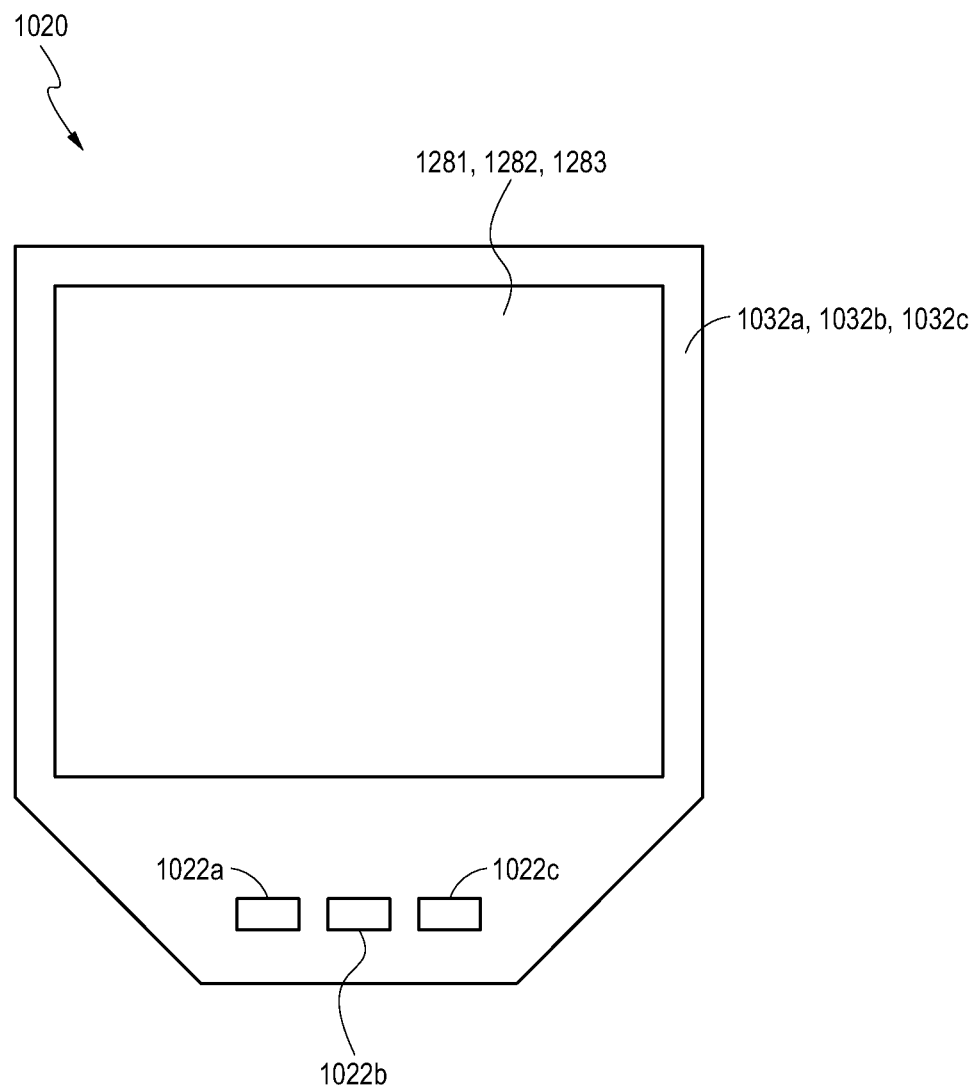
FIGS. 23A-23C illustrate additional examples of top-down views of an eyepiece having in-coupling optical elements configured to reduce re-bounce.
Figure 23B:
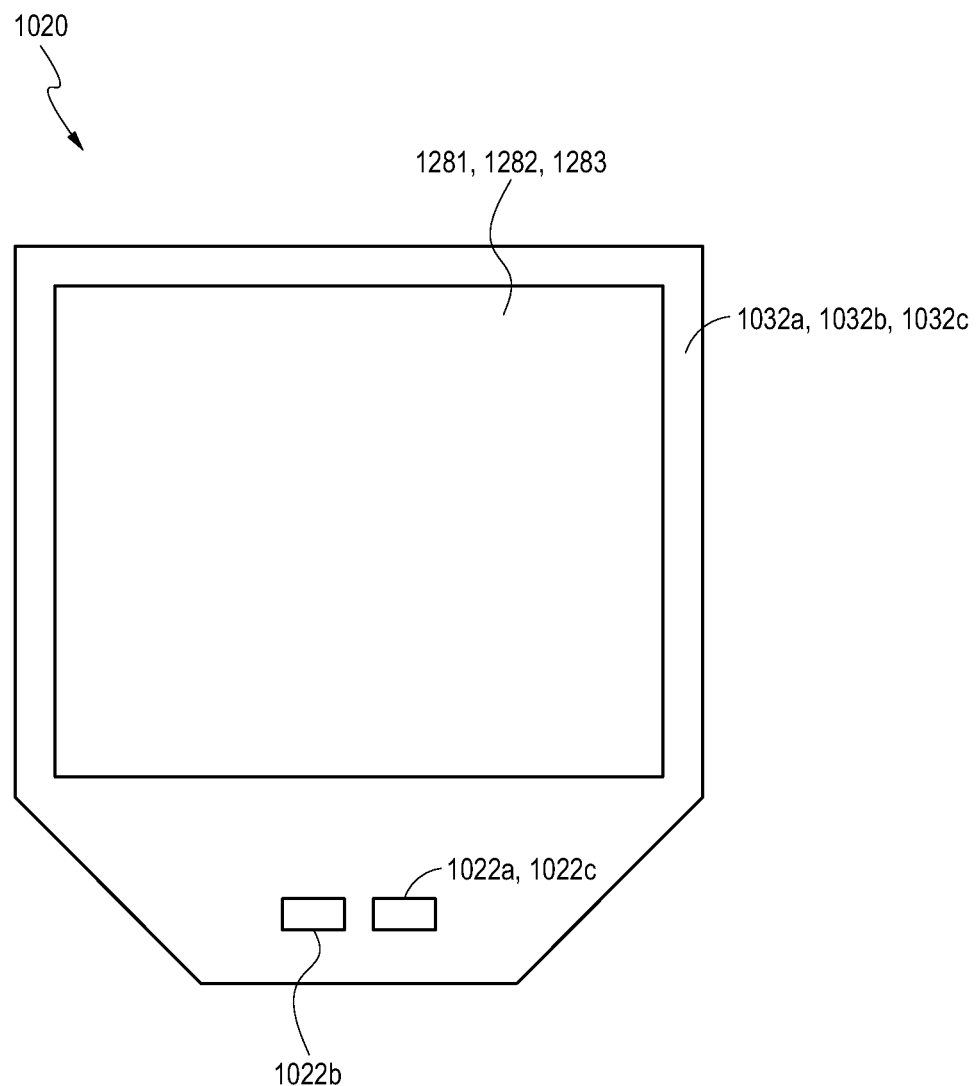
Figure 23C:
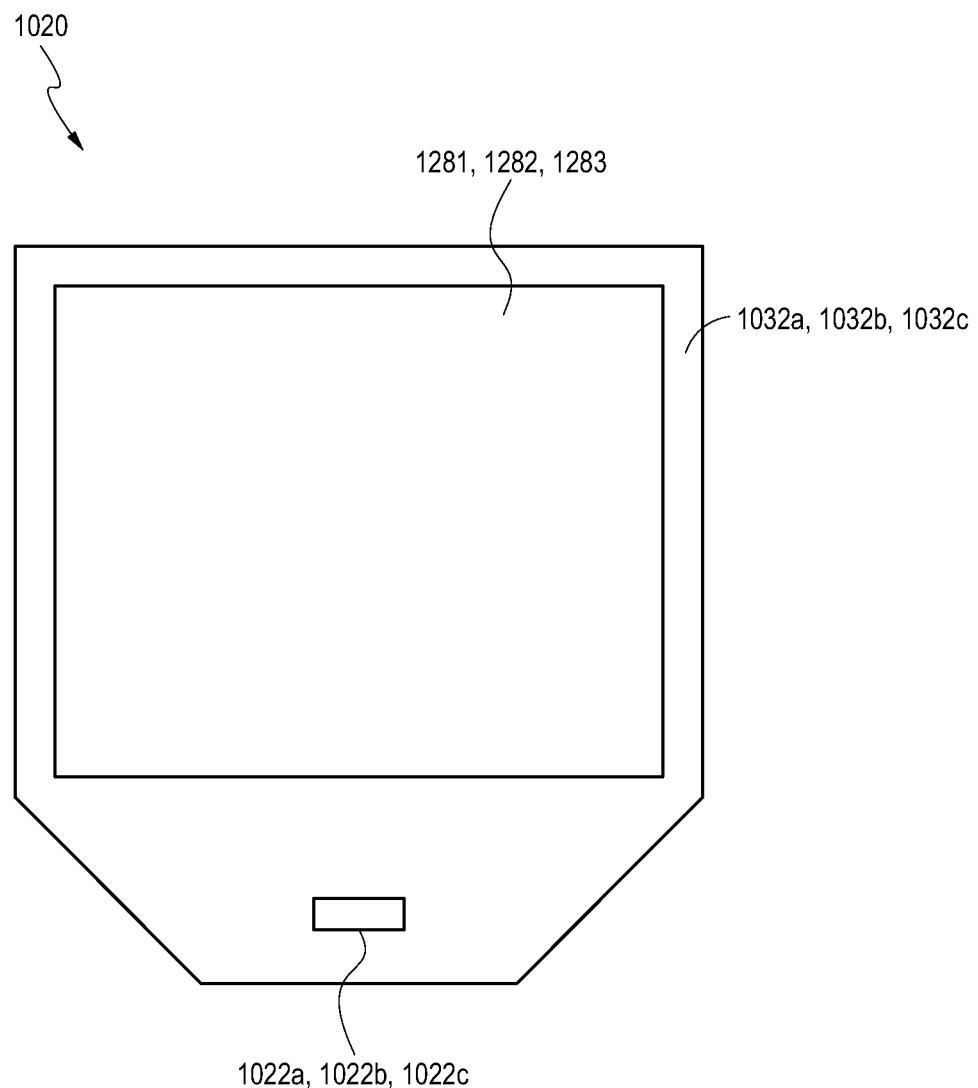

FIGS. 22A-23C illustrate examples of top-down views of an eyepiece having in-coupling optical elements configured to reduce re-bounce. In-coupling optical element 1022a, 1022b, 1022c are configured to in-couple light such that it propagates in a propagation direction towards the associated light distributing elements 730, 740, 750 (FIGS. 22A-22C) or combined OPE/EPE's 1281, 1282, 1283 (FIGS. 23A-23C). As illustrated, the in-coupling optical element 1022a, 1022b, 1022c may have a shorter dimension along the propagation direction and a longer dimension along the transverse axis. For example, the in-coupling optical element 1022a, 1022b, 1022c may each be in the shape of a rectangle with a shorter side along the axis of the propagation direction and a longer side along an orthogonal axis. It will be appreciated that the in-coupling optical elements 1022a, 1022b, 1022c may have other shapes (e.g., orthogonal, hexagonal, etc.). In addition, different ones of the in-coupling optical elements 1022a, 1022b, 1022c may have different shapes in some embodiments. Also, preferably, as illustrated, non-overlapping in-coupling optical elements may be positioned such that they are not in the propagation direction of other in-coupling optical elements. For example, as shown in FIGS. 22A, 22B, 23A, and 23B, the non-overlapping in-coupling optical elements may be arranged in a line along an axis crossing (e.g., orthogonal to) the axis of the propagation direction.

It will be appreciated that in the waveguide assemblies of FIGS. 22A-22C are similar, except for the overlap of the in-coupling optical elements 1022a, 1022b, 1022c. For example, FIG. 22A illustrates in-coupling optical elements 1022a, 1022b, 1022c with no overlap. FIG. 22B illustrates overlapping in-coupling optical elements 1022a, 1022c, and non-overlapping in-coupling optical elements 1022b. FIG. 22C illustrates overlap between all the in-coupling optical elements 1022a, 1022b, 1022c.

The waveguide assemblies of FIGS. 23A-23C are also similar, except for the overlap of the in-coupling optical elements 1022a, 1022b, 1022c. FIG. 23A illustrates in-coupling optical elements 1022a, 1022b, 1022c with no overlap. FIG. 23B illustrates overlapping in-coupling optical elements 1022a, 1022c, and non-overlapping in-coupling optical elements 1022b. FIG. 22C illustrates overlap between all the in-coupling optical elements 1022a, 1022b, 1022c.

Figure 24A:
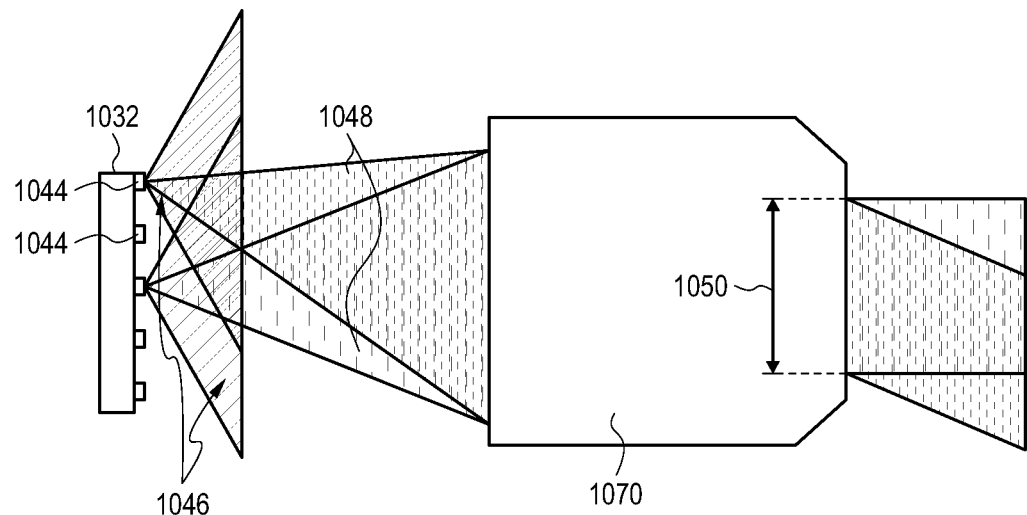
FIG. 24A illustrates an example of angular emission profiles of light emitted by individual light emitters of an emissive micro-display, and light captured by projection optics.

With reference now to FIG. 24A, it will be appreciated that the emissive micro-displays have high etendue, which presents a challenge for efficient light utilization. As discussed herein, the emissive micro-displays may include a plurality of individual light emitters. Each of these light emitters may have a large angular emission profile, e.g., a Lambertian or near-Lambertian emission profile. Undesirably, not all of this light may be captured and directed to the eyepiece of the display system.

FIG. 24A illustrates an example of angular emission profiles of light emitted by individual light emitters 1044 of an emissive micro-display 1032, and light captured by projection optics 1070. The illustrated emissive micro-display 1032 may correspond to any of the emissive-micro-displays disclosed herein, including the emissive micro-displays 1032a, 1032b, 1032c. As illustrated, the projection optics 1070 may be sized such that it will capture light having an angular emission profile 1046. However, the angular emission profiles 1046 in the light emitters 1044 is significantly larger; not all of the light emitted by the light emitters 1044 will be incident on the projection optics 1070, nor necessarily incident at angles at which the light will propagate into and through the projection optics 1070. As a result, some of the light emitted by the light emitter 1044 may undesirably be "wasted" since it is not captured and ultimately relayed to the user's eye to form images. This may result in images that appear darker than would be expected if more of the light outputted by the light emitters 1040 ultimately reached the user's eye.

In some embodiments, one strategy for capturing more of the light emitted by the light emitters 1040 is to increase the size of the projection optics 1070, to increase the size of the numerical aperture of the projection optics 1070 capturing light. In addition or alternatively, the projection optics 1070 may also be formed with high refractive index materials (e.g., having refractive indices above 1.5) which may also facilitate light collection. In some embodiments, the projection optics 1070 may utilize a lens sized to capture a desired, high proportion of the light emitted by the light emitters 1044. In some embodiments, the projection optics 1070 may be configured to have an elongated exit pupil, e.g., to emit light beams having a cross-sectional profile similar to the shapes of the in-coupling optical elements 1022a, 1022b, 1022c of FIGS. 22A-23C. For example, the projection optics 1070 may be elongated in a dimension corresponding to the elongated dimension of the in-coupling optical elements 1022a, 1022b, 1022c of FIGS. 22A-23C. Without being limited by theory, such elongated in-coupling optical elements 1022a, 1022b, 1022c may improve the etendue mismatch between the emissive micro-display and the eyepiece 1020 (FIGS. 22A-23C). In some embodiments, the thickness of the waveguides of the eyepiece 1020 (e.g., FIGS. 11A, and 12-23C) may be selected to increase the percentage of light effectively captured, e.g., by reducing re-bounce by increasing the re-bounce spacing, as discussed herein.

In some embodiments, one or more light collimators may be utilized to reduce or narrow the angular emission profile of light from the light emitters 1044. As a result, more of the light emitted by the light emitters 1044 may be captured by the projection optics 1070 and relayed to the eyes of a user, advantageously increasing the brightness of images and the efficiency of the display system. In some embodiments, the light collimators may allow the light collection efficiency of the projection optics (the percentage of light emitted by the light emitters 1044 that is captured by the projection optics) to reach values of 80% or more, 85% or more, or 90% or more, including about 85-95% or 85-90%. In addition, the angular emission profile of the light from the light emitters 1044 may be reduced to 60° or less, 50° or less, or 40° or less (from, e.g.,) 180°. In some embodiments, the reduced angular emission profiles may be in the range of about 30-60°, 30-50°, or 30-40°. It will be appreciated that light from the light emitters 1044 may make out the shape of a cone, with the light emitter 1044 at the vertex of the cone. The angular mission profile refers to the angle made out by the sides of the cone, with the associated light emitter 1044 at the vertex of the angle (as seen in a cross-section taken along a plane extending through the middle of the cone and including the cone apex).

Figure 24B:
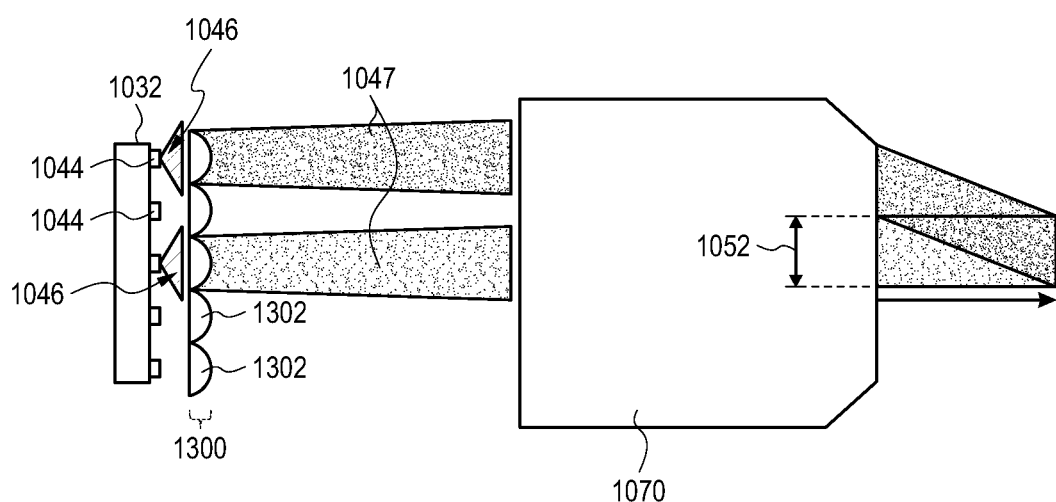
FIG. 24B illustrates an example of the narrowing of angular emission profiles using an array of light collimators.

FIG. 24B illustrates an example of the narrowing of angular emission profiles using an array of light collimators. As illustrated, the emissive micro-display 1032 includes an array of light emitters 1044, which emit light with an angular emission profile 1046. An array 1300 of light collimators 1302 is disposed forward of the light emitters 1044. In some embodiments, each light emitter 1044 is matched 1-to-1 with an associated light collimator 1302 (one light collimator 1302 per light emitter 1044). Each light collimator 1302 redirects incident light from the associated light emitter 1044 to provide a narrowed angular emission profiles 1047. Thus, the relatively large angular emission profiles 1046 are narrowed to the smaller angular emission profiles 1047.

In some embodiments, the light collimators 1302 and array 1300 may be part of the light redirecting structures 1080a, 180c of FIGS. 12 and 13A. Thus, light collimators 1302 may narrow the angular emission profile of the light emitters 1044 and also redirect the light such that it propagates into the optical combiner 1050 at the appropriate angles to define multiple light paths and the related multiple exit pupils. It will be appreciated that light may be redirected in particular directions by appropriately shaping the light collimators 1302.

Preferably, the light collimators 1302 are positioned in tight proximity to the light emitters 1044 to capture a large proportion of the light outputted by the light emitters 1044. In some embodiments, there may be a gap between the light collimators 1302 and the light emitters 1044. In some other embodiments, the light collimator 1302 may be in contact with the light emitters 1044. It will be appreciated that the angular emission profile 1046 may make out a wide cone of light. Preferably, the entirety or majority of a cone of light from a light emitter 1044 is incident on a single associated light collimator 1302. Thus, in some embodiments, each light emitter 1044 is smaller (occupies a smaller area) than the light receiving face of an associated light collimator 1302. In some embodiments, each light emitter 1044 has a smaller width than the spacing between neighboring far light emitters 1044.

Advantageously, the light collimators 1302 may increase the efficiency of the utilization of light and may also reduce the occurrence of crosstalk between neighboring light emitters 1044. It will be appreciated that crosstalk between light emitters 1044 may occur when light from a neighboring light emitter is captured by a light collimator 1302 not associated with that neighboring light emitter. That captured light may be propagated to the user's eye, thereby providing erroneous image information for a given pixel.

With reference to FIGS. 24A and 24B, the size of the beam of light captured by the projection optics 1070 may influence the size of the beam of light which exits the projection optics 1070. As shown in FIG. 24A, without the use light collimators, the exit beam may have a relatively large width 1050. As shown in FIG. 24B, with light collimators 1302, the exit beam may have a smaller width 1052. Thus, in some embodiments, the light collimators 1302 may be used to provide a desired beam size for in-coupling into an eyepiece. For example, the amount that the light collimators 1302 narrow the angular emission profile 1046 may be selected based at least partly upon the size of the intra-coupling optical elements in the eyepiece to which the light outputted by the projection optics 1070 is directed.

It will be appreciated that the light collimators 1302 may take various forms. For example, the light collimators 1302 may be micro-lenses or lenslets, in some embodiments. As discussed herein, each micro-lens preferably has a width greater than the width of an associated light emitter 1044. The micro-lenses may be formed of curved transparent material, such as glass or polymers, including photoresist and resins such as epoxy. In some embodiments, light collimators 1302 may be nano-lenses, e.g., diffractive optical gratings. In some embodiments, light collimators 1302 may be metasurfaces and/or liquid crystal gratings. In some embodiments, light collimator's 1302 may take the form of reflective wells.

It will be appreciated that different light collimators 1302 may have different dimensions and/or shapes depending upon the wavelengths or colors of light emitted by the associated light emitter 1044. Thus, for full-color emissive micro-displays, the array 1300 may include a plurality of light collimators 1302 with different dimensions and/or shapes depending upon the color of light emitted by the associate light emitter 1044. In embodiments where the emissive micro-display is a monochrome micro-display, the array 1300 may be simplified, with each of the light collimators 1302 in the array being configured to redirect light of the same color. With such monochrome micro-displays, the light collimator 1302 may be similar across the array 1300 in some embodiments.

With continued reference to FIG. 24B, as discussed herein, the light collimators 1302 may have a 1-to-1 association with the light emitters 1044. For example, each light emitter 1044 may have a discrete associated light collimator 1302. In some other embodiments, light collimators 1302 may be elongated such that they extend across multiple light emitters 1044. For example, in some embodiments, the light collimator 1302 may be elongated into the page and extend in front of a row of multiple light emitters 1044. In some other embodiments, a single light collimator 1302 may extend across a column of light emitters 1044. In yet other embodiments, the light collimator 1302 may comprise stacked columns and/or rows of lens structures (e.g., nano-lens structures, micro-lens structures, etc.).

Figure 25A:
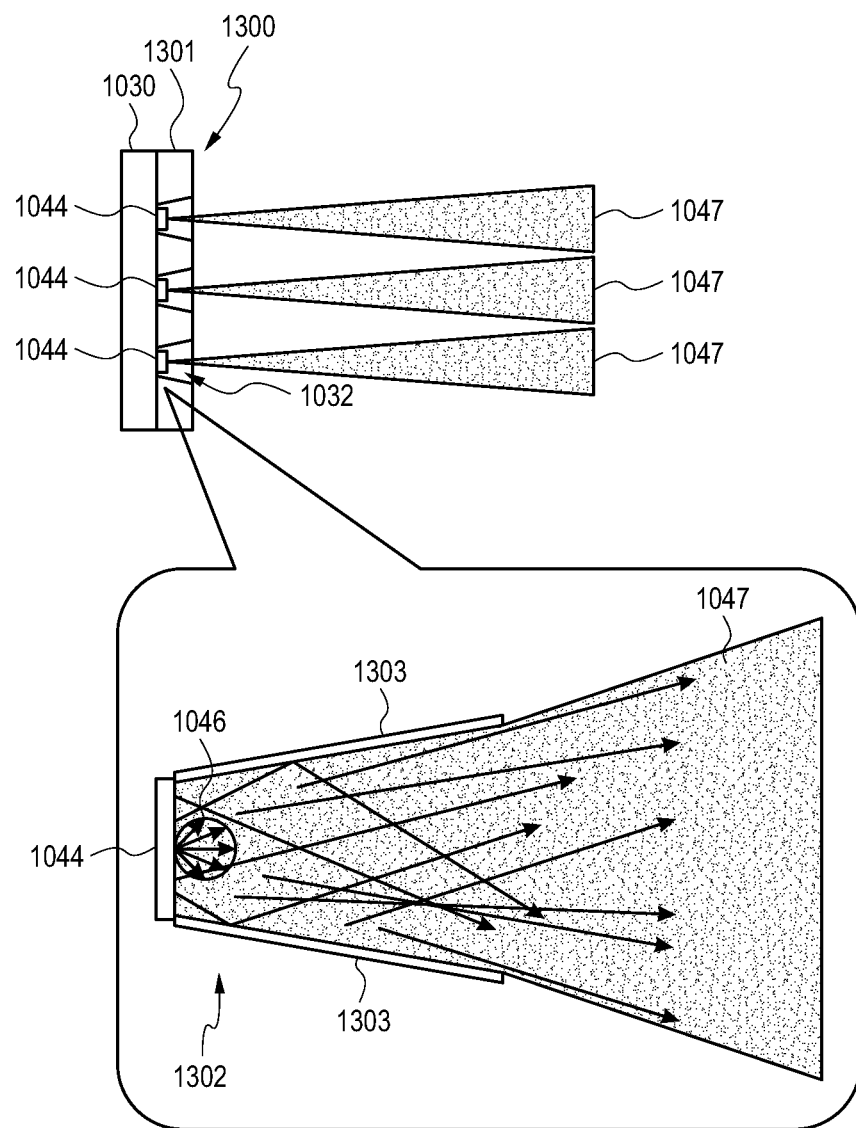
FIG. 25A illustrates an example of a side view of an array of tapered reflective wells for directing light to projection optics.

As noted above, the light collimators 1302 may take the form of reflective wells. FIG. 25A illustrates an example of a side view of an array of tapered reflective wells for re-directing light to projection optics. As illustrated, the light collimator array 1300 may include a substrate 1301 in which a plurality of light collimators 1302, in the form of reflective wells, may be formed. Each well may include at least one light emitter 1044, which may emit light with a Lambertian angular emission profile 1046. The reflective walls 1303 of the wells of the light collimators 1302 are tapered and reflect the emitted light such that it is outputted from the well with a narrower angular emission profile 1047. As illustrated, reflective walls 1303 may be tapered such that the cross-sectional size increases with distance from the light emitter 1044. In some embodiments, the reflective walls 1303 may be curved. For example, the sides 1303 may have the shape of a compound parabolic concentrator (CPC).

Figure 25B:
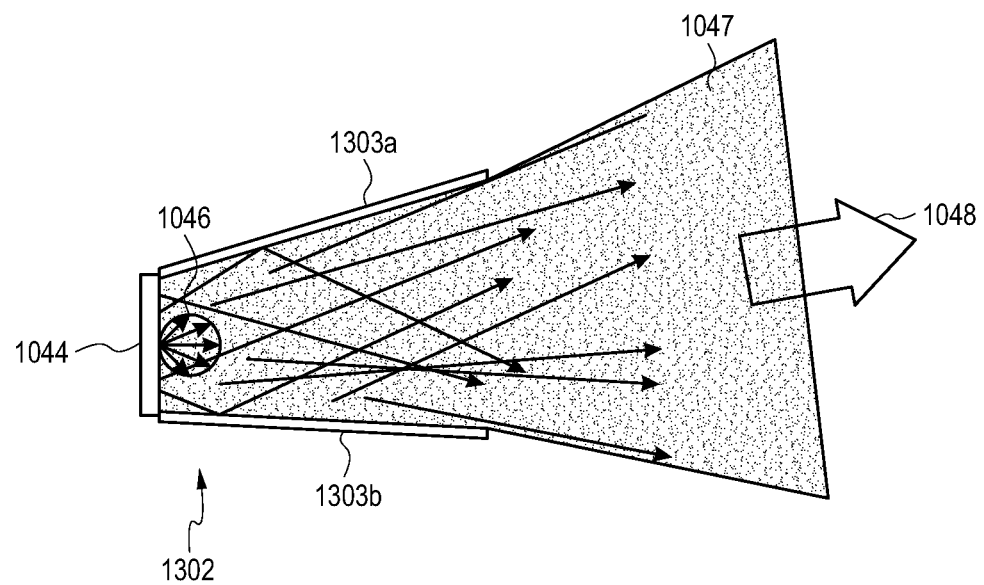
FIG. 25B illustrates an example of a side view of an asymmetric tapered reflective well.

With reference now to FIG. 25B, an example of a side view of an asymmetric tapered reflective well is illustrated. As discussed herein, e.g., as illustrated in FIGS. 12A-13A, it may be desirable to utilize the light collimators 1302 to steer light in a particular direction not normal to the surface of the light emitter 1044. In some embodiments, as viewed in a side view such as illustrated in FIG. 25B, the light collimator 1302 may be asymmetric, with the upper side 1303a forming a different angle (e.g., a larger angle) with the surface of the light emitter 1044 than the lower side 1303b; for example, the angles of the reflective walls 1303a, 1303b relative to the light emitter 1044 may differ on different sides of the light collimators 1302 in order to direct the light in the particular non-normal direction. Thus, as illustrated, light exiting the light collimator 1302 may propagate generally in a direction 1048 which is not normal to the surface of the light emitter 1044. In some other embodiments, in order to direct light in the direction 1048, the taper of the upper side 1303a may be different than the taper of the lower side; for example, the upper side 1303a may flare out to a greater extent than the lower side 1303b.

With continued reference to FIG. 25, the substrate 1301 may be formed of various materials having sufficient mechanical integrity to maintain the desired shape of the reflective walls 1303. Examples of suitable materials include metals, plastics, and glasses. In some embodiments, the substrate 1301 may be a plate of material. In some embodiments, substrate 1301 is a continuous, unitary piece of material. In some other embodiments, the substrate 1301 may be formed by joining together two or more pieces of material.

The reflective walls 1303 may be formed in the substrate 1301 by various methods. For example, the walls 1303 may be formed in a desired shape by machining the substrate 1301, or otherwise removing material to define the walls 1303. In some other embodiments, the walls 1303 may be formed as the substrate 1301 is formed. For example, the walls 1303 may be molded into the substrate 1301 as the substrate 1301 is molded into its desired shape. In some other embodiments, the walls 1303 may be defined by rearrangement of material after formation of the body 2200. For example, the walls 1303 may be defined by imprinting.

Once the contours of the walls 1303 are formed, they may undergo further processing to form surfaces having the desired degree of reflection. In some embodiments, the surface of the substrate 1301 may itself be reflective, e.g., where the body is formed of a reflective metal. In such cases, the further processing may include smoothing or polishing the interior surfaces of the walls 1303 to increase their reflectivity. In some other embodiments, the interior surfaces of the reflectors 2110 may be lined with a reflective coating, e.g., by a vapor deposition process. For example, the reflective layer may be formed by physical vapor deposition (PVD) or chemical vapor deposition (CVD).

Figure 26A:
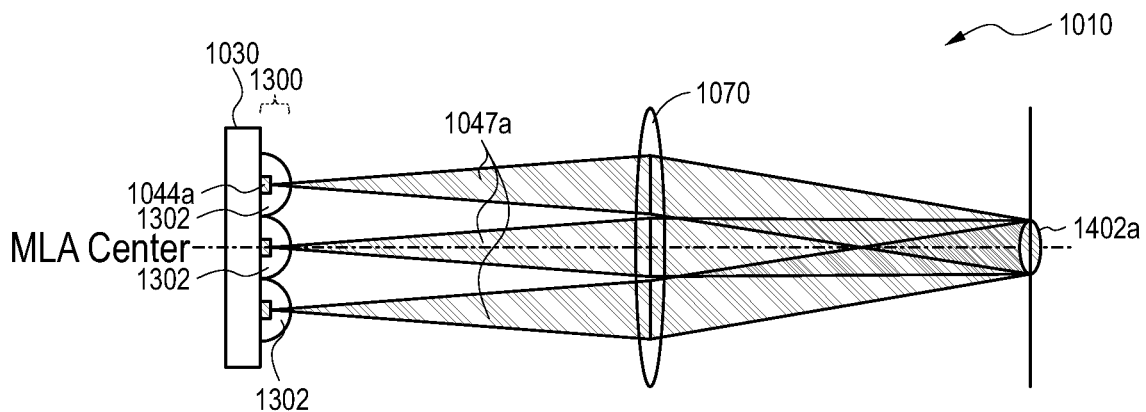
FIGS. 26A-26C illustrate examples of differences in light paths for light emitters at different positions relative to center lines of overlying lens.

It will be appreciated that the location of a light emitter relative to an associated light collimator may influence the direction of emitted light out of the light collimator. This is illustrated, for example, in FIGS. 26A-26C, which illustrate examples of differences in light paths for light emitters at different positions relative to center lines of overlying, associated light collimators. As shown in FIG. 26A, the emissive micro-display another 30 has a plurality of light emitters 1044a, each having an associated light collimator 1302 which facilitates the output of light having narrowed angular emission profiles 1047. The light passes through the projection optics 1070 (represented as a simple lens for ease of illustration), which converges the light from the various light emitters 1044a onto an area 1402a.

With continued reference to FIG. 26A, in some embodiments, each of the light collimators 1302 may be symmetric and may have a center line which extends along the axis of symmetry of the light collimator. In the illustrated configuration, the light emitters 1044a are disposed on the center line of each of the light collimators 1302.

Figure 26B:
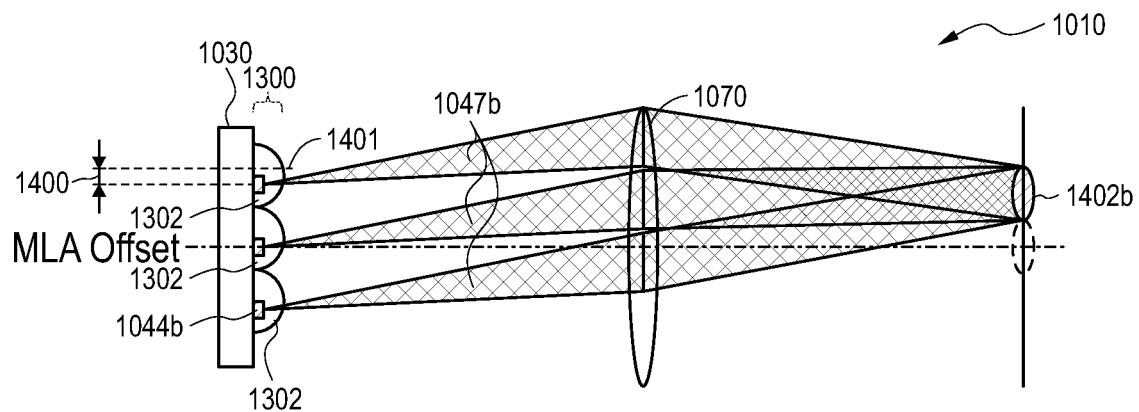

With reference now to FIG. 26B, light emitters 1044b are offset by a distance 1400 from the center lines of their respective light collimators 1302. This offset causes light from the light emitters 1044b to take a different path through the light collimators 1302, which output light from the light emitters 1044b with narrowed angular emission profiles 1047b. The projection optics 1070 then converges the light from the light emitters 1044b onto the area 1402b, which is offset relative to the area 1402a on which light from the light emitters 1044a converge.

Figure 26C:
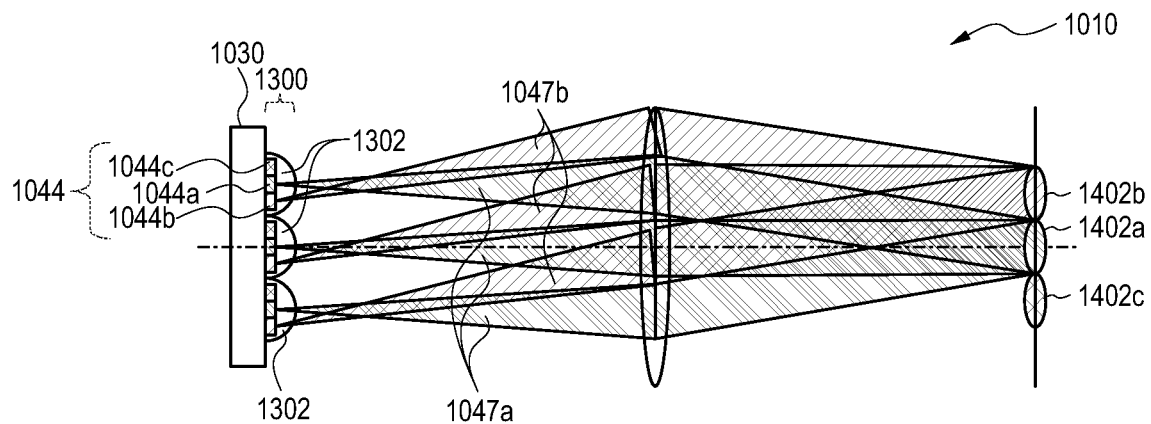

With reference now to FIG. 26C, light emitters 1044c offset from both the light emitters 1044a and 1044b are illustrated. This offset causes light from the light emitters 1044c to take a different path through the light collimators 1302 than light from the light emitters 1044a and 1044b. This causes the light collimators 1302 to output light from the light emitters 1044c with narrowed angular emission profiles that take a different path to the projection optics 1070 than the light from the light emitters 1044a and 1044b. Ultimately, the projection optics 1070 converges the light from the light emitters 1044c onto the area 1402c, which is offset relative to the areas 1402a and 1402b.

With reference to FIGS. 26A-26C, each triad of light emitters 1044a, 1044b, 1044c may share a common light collimator 1302. In some embodiments, the micro-display 1030 may be a full-color micro-display and each light emitter 1044a, 1044b, 1044c may be configured to emit light of a different component color. Advantageously, the offset areas 1402a, 1402b, 1402c may correspond to the in-coupling optical elements of a waveguide in some embodiments. For example, the areas 1402a, 1402b, 1402c may correspond to the in-coupling optical element 1022a, 1022b, 1022c, respectively, of FIGS. 11A and 12. Thus, the light collimators 1302 and the offset orientations of the light emitters 1044a, 1044b, 1044c may provide an advantageously simple three-pupil projection system 1010 using a full-color emissive micro-display.

Figure 27:
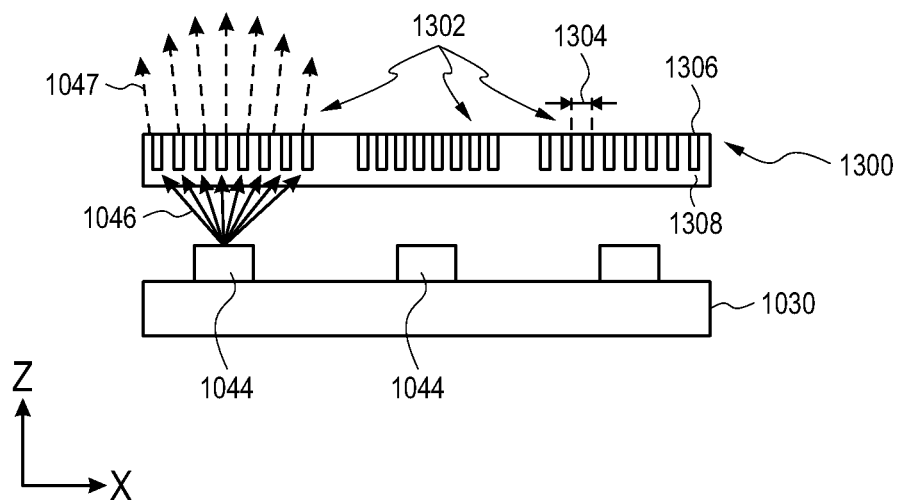
FIG. 27 illustrates an example of a side view of individual light emitters of an emissive micro-display with an overlying nano-lens array.

As noted herein, the light collimator 1302 may also take the form of a nano-lens. FIG. 27 illustrates an example of a side view of individual light emitters 1044 of an emissive micro-display 1030 with an overlying array 1300 of light collimators 1302 which are nano-lenses. As discussed herein, individual ones of the light emitters 1044 may each have an associated light collimator 1302. The light collimators 1302 redirect light from the light emitters 1044 to narrow the large angular emission profile 1046 of the light emitters 1044, to output light with the narrowed angular emission profile 1047.

With continued reference to FIG. 27, in some embodiments, the light collimators 1302 may be grating structures. In some embodiments, the light collimators 1302 may be gratings formed by alternating elongated discrete expanses (e.g., lines) of material having different refractive indices. For example, expanses of material 1306 may be elongated into and out of the page and may be formed in and separated by material of the substrate 1308. In some embodiments, the elongated expanses of material 1306 may have sub-wavelength widths and pitch (e.g., widths and pitch that are smaller than the wavelengths of light that the light collimators 1302 are configured to receive from the associated light emitters 1044). In some embodiments, the pitch 1304 may be 30-300 nm, the depth of the grating may be 10-1000 nm, the refractive index of the material forming the substrate 1308 may be 1.5-3.5, and the refractive index of the material forming the grating features 1306 may be 1.5-2.5 (and different from the refractive index of the material forming the substrate 1308).

The illustrated grating structure may be formed by various methods. For example, the substrate 1308 may be etched or nano-imprinted to define trenches, and the trenches may be filled with material of a different refractive index from the substrate 1308 to form the grating features 1306.

Advantageously, nano-lens arrays may provide various benefits. For example, the light collection efficiencies of the nano-lenslets may be large, e.g., 80-95%, including 85-90%, with excellent reductions in angular emission profiles, e.g., reductions to 30-40° (from) 180°. In addition, low levels of cross-talk may be achieved, since each of the nano-lens light collimators 1302 may have physical dimensions and properties (e.g., pitch, depth, the refractive indices of materials forming the feature 1306 and substrate 1308) selected to act on light of particular colors and possibly particular angles of incidence, while preferably providing high extinction ratios (for wavelengths of light of other colors). In addition, the nano-lens arrays may have flat profiles (e.g., be formed on a flat substrate), which may facilitates integration with micro-displays that may be flat panels, and may also facilitate manufacturing and provide high reproducibility and precision in forming the nano-lens array. For example, highly reproducible trench formation and deposition processes may be used to form each nano-lens. Moreover, these processes allow, with greater ease and reproducibility, for variations between nano-lenses of an array than are typically achieved when forming curved lens with similar variations.

Figure 28:
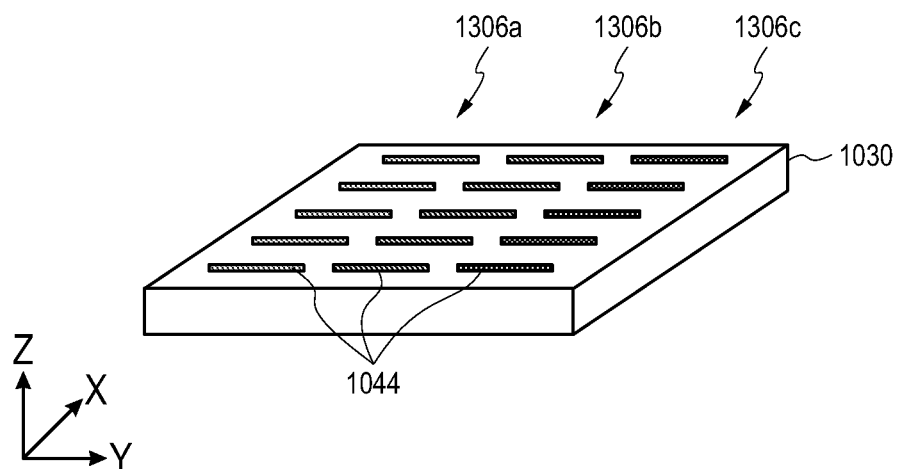
FIG. 28 is a perspective view of an example of the emissive micro-display of FIG. 27.

With reference now to FIG. 28, a perspective view of an example of an emissive micro-display 1030 is illustrated. It will be appreciated that the light collimator arrays 1300 advantageously allow light emitted from a micro-display to be routed as desired. As result, in some embodiments, the light emitters of a full-color micro-display may be organized as desired, e.g., for ease of manufacturing or implementation in the display device. In some embodiments, the light emitters 1044 may be arranged in rows or columns 1306a, 1306b, 1306c. Each row or column may include light emitters 1044 configured to emit light of the same component color. In displays where three component colors are utilized, there may be groups of three rows or columns which repeat across the micro-display 1030. It will be appreciated that where more component colors are utilized, each repeating group may have that number of rows or columns. For example, where four component colors are utilized, each group may have four rows or four columns, with one row or one column formed by light emitters configured to emit light of a single component color.

In some embodiments, some rows or columns may be repeated to increase the number of light emitters of a particular component color. For example, light emitters of some component colors may occupy multiple rows or columns. This may facilitate color balancing and/or may be utilized to address differential aging or reductions in light emission intensity over time.

With reference to FIGS. 27 and 28, in some embodiments, the light emitters 1044 may each have an associated light collimator 1302. In some other embodiments, each line 1306a, 1306b, 1306c of multiple light emitters 1044 may have a single associated light collimator 1302. That single associated light collimator 1302 may extend across substantially the entirety of the associated line 1306a, 1306b, or 1306c. In some other embodiments, the associated light collimator 1302 may be elongated and extend over a plurality of light emitters 1044 forming a portion of of an associated line 1306a, 1306b, or 1306c, and multiple similar light collimators 1302 may be provided along each of the associated lines 1306a, 1306b, 1306c.

With continued reference to FIG. 28, each light emitter 1044 may be elongated along a particular axis (e.g., along the y-axis as illustrated); that is, each light emitter has a length along the particular axis, the length being longer than a width of the light emitter. In addition, a set of light emitters configured to emit light of the same component color may be arranged in a line 1306a, 1306b, or 1306c (e.g. a row or column) extending along an axis (e.g., the x-axis) which crosses (e.g., is orthogonal to) the light emitter 1044's elongate axis. Thus, in some embodiments, light emitters 1044 of the same component color form a line 1306a, 1306b, or 1306c of light emitters, with the line extending along a first axis (e.g., the x-axis), and with individual light emitters 1044 within the line elongated along a second axis (e.g., the y-axis).

In contrast, it will be appreciated that full-color micro-display typically include sub-pixels of each component color, with the sub-pixels arranged in particular relatively closely-packed spatial orientations in groups, with these groups reproduced across an array. Each group of sub-pixels may form a pixel in an image. In some cases, the sub-pixels are elongated along an axis, and rows or columns of sub-pixels of the same component color extent along that same axis. It will be appreciated that such an arrangement allows the sub-pixels of each group to be located close together, which may have benefits for image quality and pixel density. In the illustrated arrangement of FIG. 28, however, sub-pixels of different component colors are relatively far apart, due to the elongate shape of the light emitters 1044; that is, the light emitters of the line 1306a are relatively far apart from the light emitters of the line 1306c since the elongated shape of the light emitters of the line 1306b causes the light emitters 1306a and 1306c to be spaced out more than neighboring light emitters of a given line of light emitters. While this may be expected to provide unacceptably poor image quality if the image formed on the surface of the micro-display 1030 was directly relayed to a user's eye, the use of the light collimator array 1300 advantageously allows light of different colors to be routed as desired to form a high quality image. For example, light of each component color may be used to form separate monochrome images which are then routed to and combined in an eyepiece, such as the eyepiece 1020 (e.g., FIGS. 11A and 12-14).

With reference to FIGS. 27 and 28, in some embodiments, the light emitters 1044 may each have an associated light collimator 1302. In some other embodiments, each line 1306a, 1306b, 1306c of light emitters 1044 may have a single associated light collimator 1302. That single associated light collimator 1302 may extend across substantially the entirety of the associated line 1306a, 1306b, or 1306c. In some other embodiments, the associated light collimator 1302 may be elongated and extend over a plurality of light emitters 1044 forming a portion of an associated line 1306a, 1306b, or 1306c, and multiple similar light collimators 1302 may be provided along each of the associated lines 1306a, 1306b, 1306c.

It will be appreciated that the light collimators 1302 may be utilized to direct light along different light paths to form multi-pupil projections systems. For example, the light collimators 1302 may direct light of different component colors to two or three areas, respectively, for light in-coupling.

Figure 29:
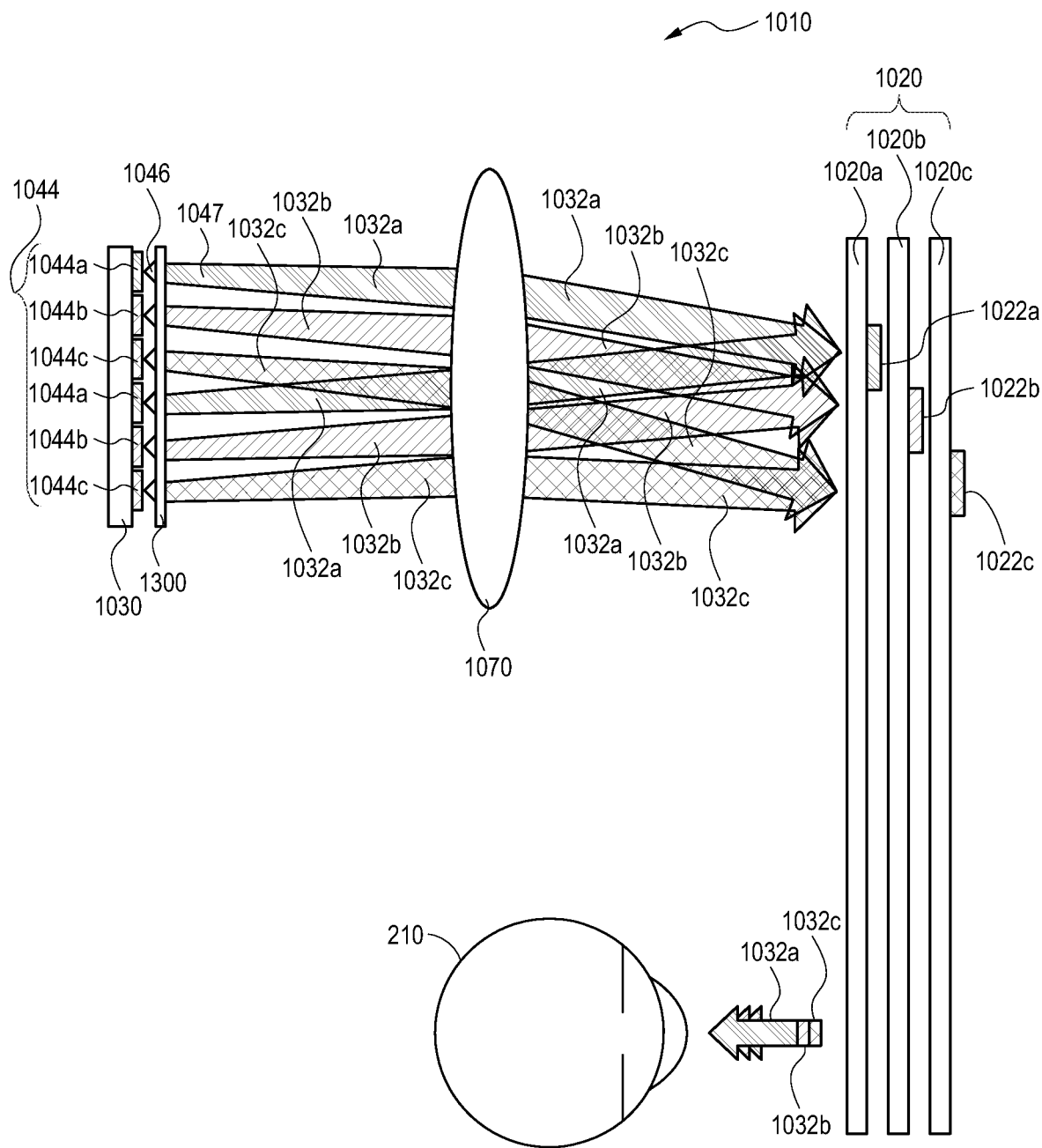
FIG. 29 illustrates an example of a wearable display system with the full-color emissive micro-display of FIG. 28.

FIG. 29 illustrates an example of a wearable display system with the full-color emissive micro-display 1030 of FIG. 28 used to form a multi-pupil projection system 1010. In the illustrated embodiment, the full-color emissive micro-display 1030 emits light of three component colors and forms a three-pupil projection system 1010. The projection system 1010 has three exit pupils through which image light 1032a, 1032b, 1032c of different component colors propagates to three laterally-shifted light in-coupling optical elements 1022a, 1022b, 1022c, respectively, of an eyepiece 1020. The eyepiece 1020 then relays the image light 1032a, 1032b, 1032c to the eye 210 of a user.

The emissive-micro-display 1030 includes an array of light emitters 1044, which may be subdivided into monochrome light emitters 1044a, 1044b, 1044c, which emit the image light 1032a, 1032b, 1032c, respectively. It will be appreciated that the light emitters 1044 emit image light with a broad angular emission profile 1046. The image light propagates through the array 1300 of light collimators, which reduces the angular emission profile to the narrowed angular emission profile 1047.

In addition, the array of 1300 of light collimators is configured to redirect the image light (image light 1032a, 1032b, 1032c) such that the image light is incident on the projection optics 1070 at angles which cause the projection optics 1070 to output the image light such that the image light propagates to the appropriate in-coupling optical element 1022a, 1022b, 1022c. For example, the 1300 array of light collimators is preferably configured to: direct the image light 1032a such that it propagates through the projection optics 1070 and is incident on the in-coupling optical element 1022a; direct the image light 1032b such that it propagates through the projection optics 1070 and is incident on the in-coupling optical element 1022b; and direct the image light 1032c such that it propagates through the projection optics 1070 and is incident on the in-coupling optical element 1022c.

Since different light emitters 1044 may emit light of different wavelengths and may need to be redirected into different directions to reach the appropriate in-coupling optical element, in some embodiments, the light collimators associated with different light emitters 1044 may have different physical parameters (e.g., different pitches, different widths, etc.). Advantageously, the use of flat nano-lenses as light collimators facilitates the formation of light collimators which vary in physical properties across the array 1300 of light collimators. As noted herein, the nano-lenses may be formed using patterning and deposition processes, which facilitates the formation of structures with different pitches, widths, etc. across a substrate.

With reference again to FIG. 24A, it will be appreciated that the illustrated display system shows a single emissive micro-display and omits an optical combiner 1050 (FIGS. 11A and 12-13B). In embodiments utilizing an optical combiner 1050, the reflective surfaces 1052, 1054 (FIGS. 11A, 12-13B, and 30B) in the optical combiner 1050 are preferably specular reflectors, and light from the light emitters 1044 would be expected to retain their large angular emission profiles after being reflected from the reflective surfaces 1052, 1054. Thus, the problems with wasted light shown in FIG. 24A are similarly present when an optical combiner 1050 is utilized.

Figure 30A:
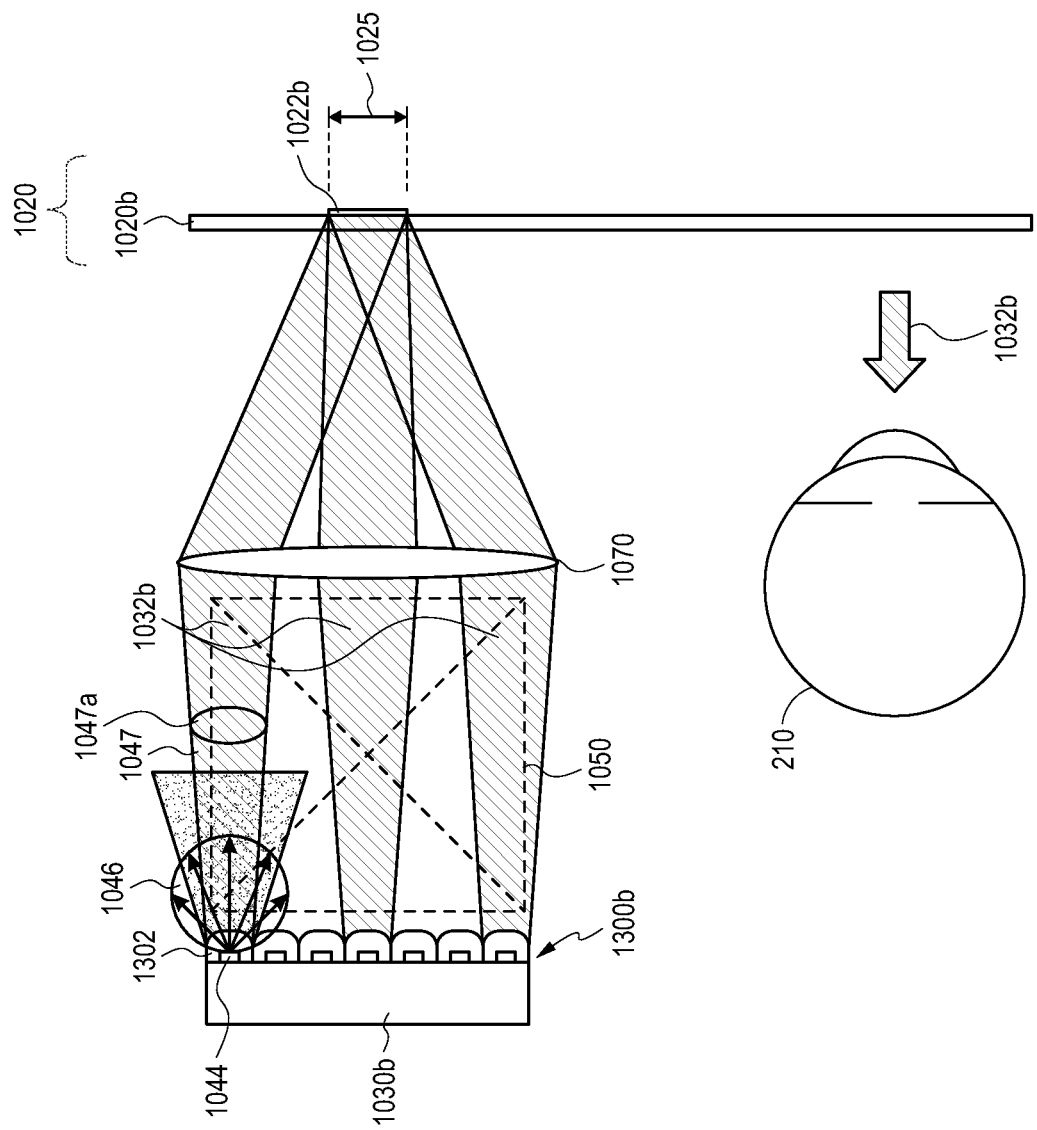
FIG. 30A illustrates an example of a wearable display system with an emissive micro-display and an associated array of light collimators.
Figure 30A:
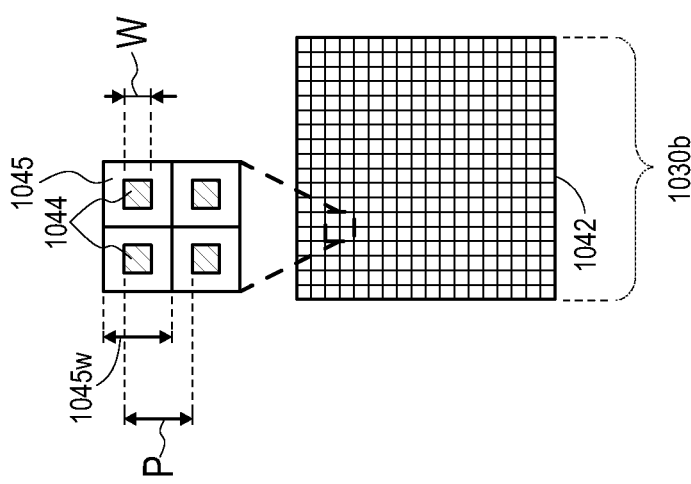

With reference now to FIG. 30A, an example of a wearable display system with an emissive micro-display and an associated array of light collimators is illustrated. FIG. 30A shows additional details regarding the interplay between the light emitters 1044, the light collimators 1302, and the in-coupling optical elements of the eyepiece 1020. The display system includes a micro-display 1030b, which may be a full-color micro-display in some embodiments. In some other embodiments, the micro-display 1030b may be a monochrome micro-display and additional monochrome micro-displays (not shown) may be provided at different faces of the optional optical combiner 1050 (as shown in FIG. 30C).

With continued reference to FIG. 30A, the micro-display 1030b includes an array of light emitters 1044, each of which emits light with a wide angular emission profile (e.g., a Lambertian angular emission profile). Each light emitter 1044 has an associated, dedicated light collimator 1302 which effectively narrows the angular emission profile to a narrowed angular remission profile 1047. Light beams 1032b with the narrowed angular emission profiles pass through the projection optics 1070, which projects or converges those light beams onto the in-coupling optical element 1022b. It will be appreciated that the light beams 1032b have a certain cross-sectional shape and size 1047a. In some embodiments, the in-coupling optical element 1022b has a size and shape which substantially matches or is larger than the cross-sectional shape and size of the light beam 1032b, when that beam 1032b is incident on that in-coupling optical element 1022b. Thus, in some embodiments, the size and shape of the in-coupling optical element 1022b may be selected based upon the cross-sectional size and shape of the light beam 1032b when incident on the in-coupling optical element 1022b. In some other embodiments, other factors (re-bounce mitigation, or the angles or field of view supported by the in-coupling optical elements 1022b) may be utilized to determine the size and shape of the in-coupling optical element 1022b, and the light collimator 1302 may be configured (e.g., sized and shaped) to provide the light beam 1032b with an appropriately sized and shaped cross-section, which is preferably fully or nearly fully encompassed by the size and shape of the in-coupling optical element 1022b. In some embodiments, physical parameters for the light collimator 1302 and the in-coupling optical element 1022b may be mutually modified to provide highly efficient light utilization in conjunction with other desired functionality (e.g., re-bounce mitigation, support for the desired fields of view, etc.). Advantageously, the above-noted light collimation provided by the light collimator 1302, and matching of the cross-sectional size and shape of the light beam 1032b with the size and shape of the in-coupling optical element 1022b allows the in-coupling optical element 1022b to capture a large percentage of the incident light beam 1032b. The in-coupled light then propagates through the waveguide 1020b and is out-coupled to the eye 210.

As illustrated, the micro-display 1030b may comprise an array 1042 of light emitters 1044, each surrounded by non-light-emitting areas 1045 having a total width 1045w. In addition, the light emitters 1044 have a width W and a pitch P. In arrays in which the light emitters 1044 are regularly spaced, each light emitter 1044 and surrounding area 1045 effectively forms a unit cell having the width 1045w, which may be equal to the pitch P.

In some embodiments, the light collimators 1302 are micro-lenses disposed directly on and surrounding associated light emitters 1044. In some embodiments, the width of the micro-lenses 1302 is equal to 1045w, such that neighboring micro-lenses 1302 nearly contact or directly contact one another. It will be appreciated that light from the light emitters 1044 may fill the associated micro-lens 1302, effectively magnifying the area encompassed by the light emitter 1044. Advantageously, such a configuration reduces the perceptibility of the areas 1045 which do not emit light and may otherwise be visible as dark spaces to a user. However, because micro-lens 1302 effectively magnifies the associated light emitter 1044 such that it extends across the entire area of the micro-lens 1302, the areas 1045 may be masked.

With continued reference to FIG. 30A, the relative sizes of the light emitters 1044 and light collimators 1302 may be selected such that light from the light emitters 1044 fills the associated light collimators 1302. For example, the light emitters 1044 may be spaced sufficiently far apart such that micro-lens collimators 1302 having the desired curvature may be formed extending over individual ones of the light emitters 1044. In addition, as noted above, the size and shape of the intra-coupling optical element 1022b is preferably selected such that it matches or exceeds the cross-sectional shape and size of the light beam 1032b when incident on that in-coupling optical element 1022b. Consequently, in some embodiments, a width 1025 of the in-coupling optical element 1022b is equal to or greater than the width of the micro-lens 1302 (which may have a width equal to 1045w or P). Preferably, the width 1025 is greater than the width of the micro-lens 1302, or 1045w or P, to account for some spread in the light beam 1032b. As discussed herein, the width 1025 may also be selected to mitigate rebounce and may be shorter than the length (which is orthogonal to the width) of the in-coupling optical element 1022b. In some embodiments, the width 1025 may extend along the same axis as the direction of propagation of incoupled light 1032b through the waveguide 1020b before being out-coupled for propagation to the eye 210.

Figure 30B:
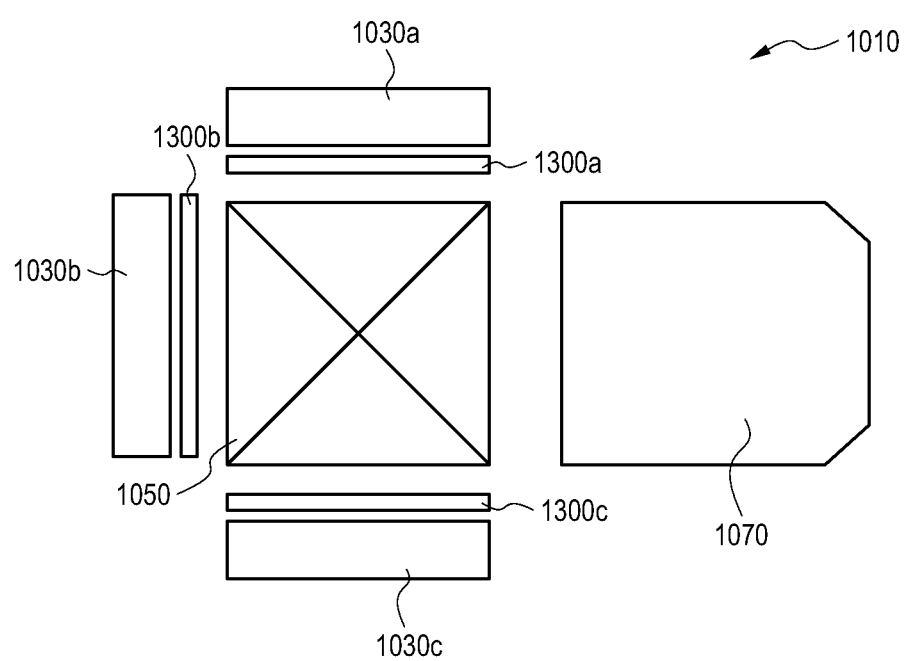
FIG. 30B illustrates an example of a light projection system with multiple emissive micro-displays, each with an associated array of light collimators.
Figure 30C:
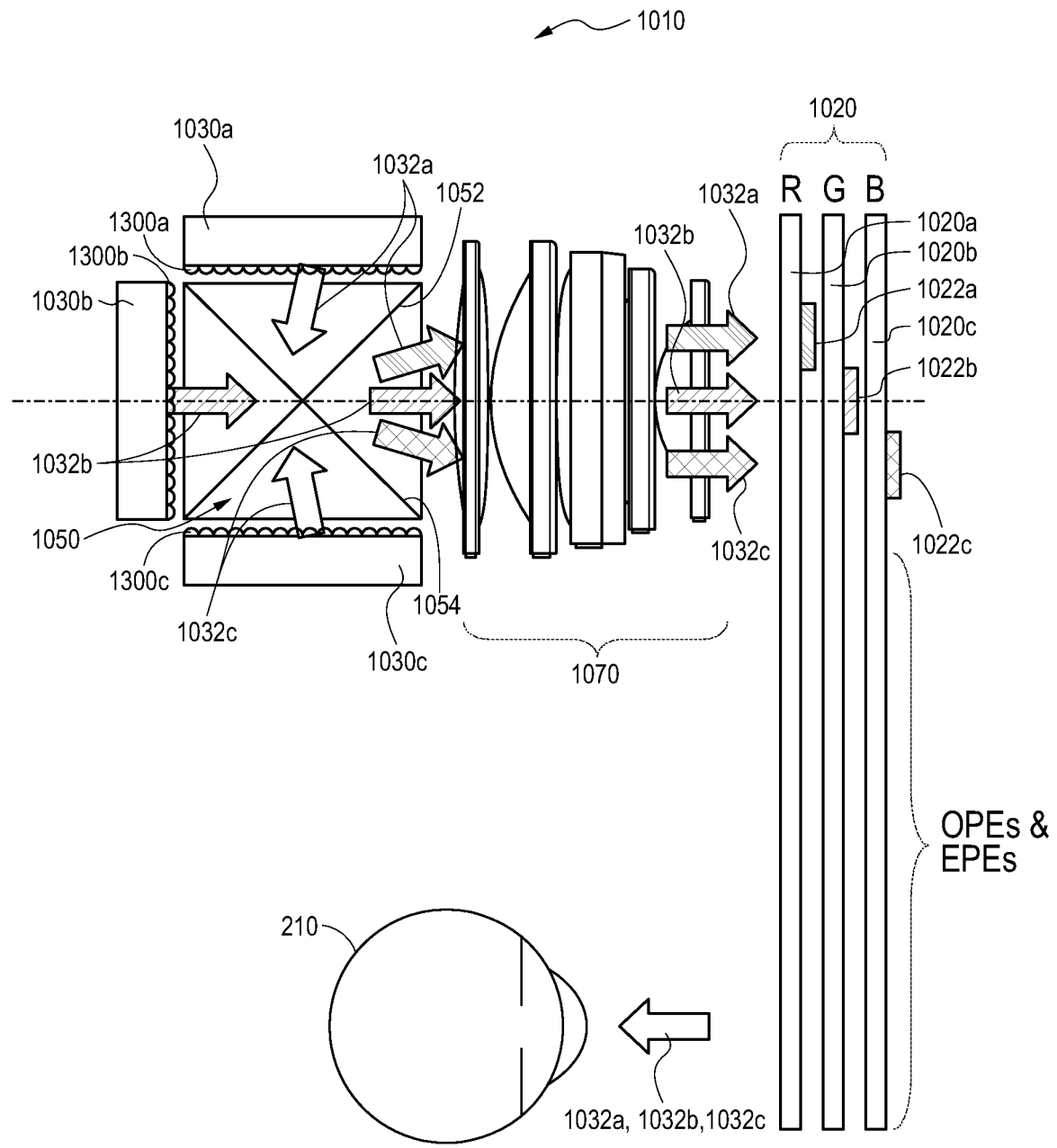
FIG. 30C illustrates an example of a wearable display system with multiple emissive micro-displays, each with an associated array of light collimators.

With reference now to FIG. 30B, an example of a light projection system 1010 with multiple emissive micro-displays 1030a, 1030b, 1030c, and associated arrays 1300a, 1300b, 1300c of light collimators, respectively, is illustrated. The angular emission profiles of light emitted by the micro-displays 1030a, 1030b, 1030c are narrowed by the light collimator arrays 1300a, 1300b, 1300c, thereby facilitating the collection of a large percentage of the emitted light by the projection optics 1070 after the light propagates through the optical combiner 1050. The projection optics 1070 then directs the light to an eyepiece such as the eyepiece 1020 (e.g., FIGS. 11A and 12-14) (not shown).

FIG. 30C illustrates an example of a wearable display system with multiple emissive micro-displays 1030a, 1030b, 1030c, each with an associated array 1300a, 1300b, 1300c, respectively, of light collimators. The illustrated display system includes a plurality of micro-displays 1030a, 1030b, 1030c for emitting light with image information. As illustrated, the micro-displays 1030a, 1030b, 1030c may be micro-LED panels. In some embodiments, the micro-displays may be monochrome micro-LED panels, each configured to emit a different component color. For example, the micro-display 1030a may be configured to emit light 1032a which is red, the micro-display 1030b may be configured to emit light 1032b which is green, and the micro-display 1030c may be configured to emit light 1032c which is blue.

Each micro-display 1030a, 1030b, 1030c may have an associated array 1300a, 1300b, 1300c, respectively, of light collimators. The light collimators narrow the angular emission profile of light 1032a, 1032b, 1032c from light emitters of the associated micro-display. In some embodiments, individual light emitters have a dedicated associated light collimator (as shown in FIG. 30A).

With continued reference to FIG. 30C, the arrays 1300a, 1300b, 1300c of light collimators are between the associated micro-displays 1030a, 1030b, 1030c and the optical combiner 1050, which may be an X-cube. As illustrated, the optical combiner 1050 has internal reflective surfaces 1052, 1054 for reflecting incident light out of an output face of the optical combiner. In addition to narrowing the angular emission profile of incident light, the arrays 1300a, 1300c of light collimators may be configured to redirect light from associated micro-displays 1030a, 1030c such that the light strikes the internal reflective surfaces 1052, 1054 of the optical combiner 1050 at angles appropriate to propagate towards the associated light in-coupling optical elements 1022a, 1022c, respectively. In some embodiments, in order to redirect light in a particular direction, the arrays 1300a, 1300c of light collimators may comprise micro-lens or reflective wells, which may be asymmetrical and/or the light emitters may be disposed off-center relative to the micro-lens or reflective wells, as disclosed herein.

With continued reference to FIG. 30C, projection optics 1070 (e.g., projection lens) is disposed at the output face of the optical combiner 1050 to receive image light exiting from that optical combiner. The projection optics 1070 may comprise lenses configured to converge or focus image light onto the eyepiece 1020. As illustrated, the eyepiece 1020 may comprise a plurality of waveguides, each of which is configured to in-couple and out-couple light of a particular color. For example, waveguide 1020a may be configured to receive red light 1032a from the micro-display 1030a, waveguide 1020b may be configured to receive green light 1032b from the micro-display 1030b, and waveguide 1020c may be configured to receive blue light 1032c from the micro-display 1030c. Each waveguide 1020a, 1020b, 1020c has an associated light in-coupling optical elements 1022a, 1022b, 1022c, respectively, for in coupling light therein. In addition, as discussed herein, the waveguides 1020a, 1020b, 1020c may correspond to the waveguides 670, 680, 690, respectively, of FIG. 9B and may each have associated orthogonal pupil expanders (OPE's) and exit pupil expanders (EPE's), which ultimately out-couple the light 1032a, 1032b, 1032c to a user.

As discussed herein, the wearable display system incorporating micro-displays is preferably configured to output light with different amounts of wavefront divergence, to provide comfortable accommodation-vergence matching for the user. These different amounts of wavefront divergence may be achieved using out-coupling optical elements with different optical powers. As discussed herein, the out-coupling optical elements may be present on or in waveguides of an eyepiece such as the eyepiece 1020 (e.g., FIGS. 11A and 12-14). In some embodiments, lenses may be utilized to augment the wavefront divergence provided by the out-couple optical elements or may be used to provide the desired wavefront divergence in configurations where the out-couple optical elements are configured to output collimated light.

Figure 31A:
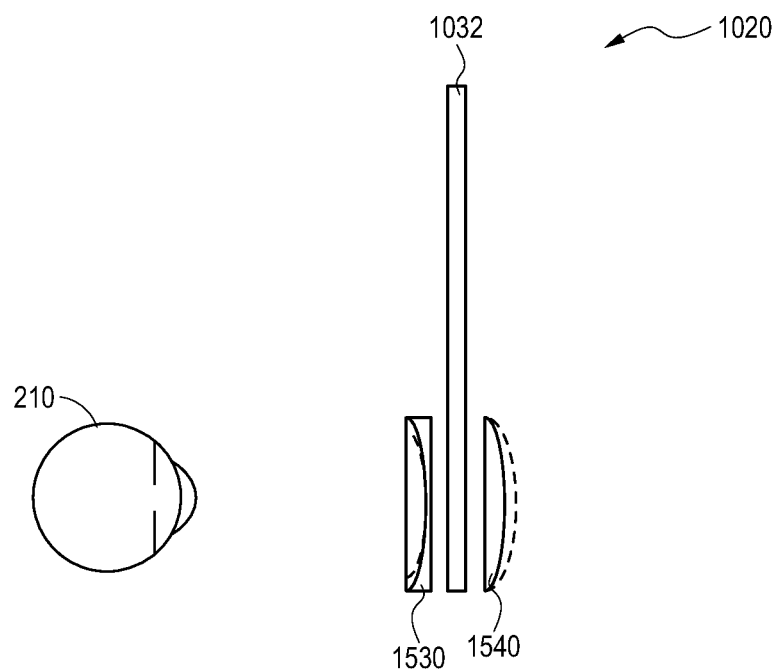
FIGS. 31A and 31B illustrate examples of waveguide assemblies having variable focus elements for varying the wavefront divergence of light to a viewer.
Figure 31B:
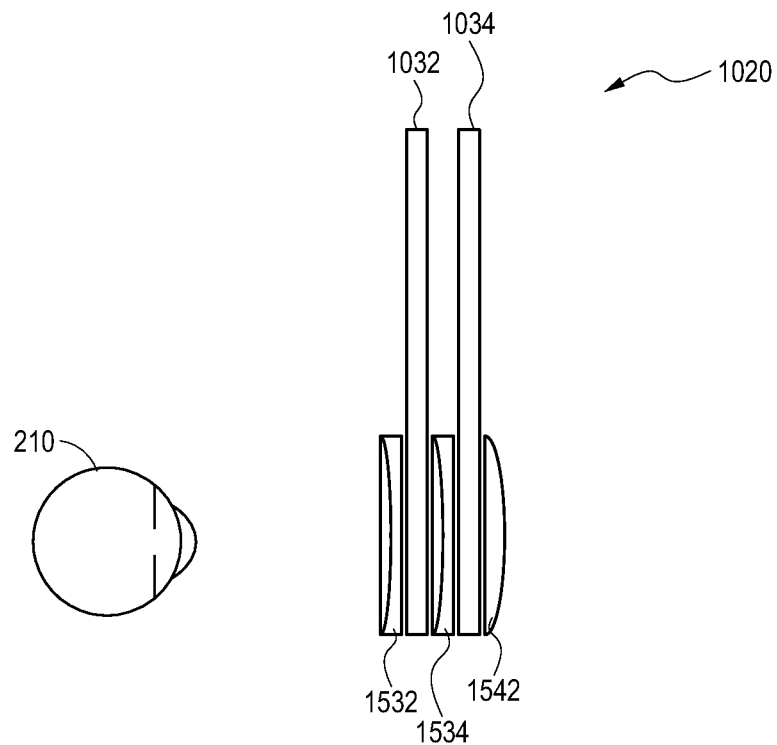

FIGS. 31A and 31B illustrate examples of eyepieces 1020 having lens for varying the wavefront divergence of light to a viewer. FIG. 31A illustrates an eyepiece 1020 having a waveguide structure 1032. In some embodiments, as discussed herein, light of all component colors may be in-coupled into a single waveguide, such that the waveguide structure 1032 includes only the single waveguide. This advantageously provides for a compact eyepiece. In some other embodiments, the waveguide structure 1032 may be understood to include a plurality of waveguides (e.g., the waveguides 1032a, 1032b, 1032c of FIGS. 11A and 12-13A), each of which may be configured to relay light of a single component color to a user's eye.

In some embodiments, the variable focus lens elements 1530, 1540 may be disposed on either side of the waveguide structure 1032. The variable focus lens elements 1530, 1540 may be in the path of image light from the waveguide structure 1032 to the eye 210, and also in the path of light from the ambient environment through the waveguide structure 1003 2 to the eye 210. The variable focus optical element 1530 may modulate the wavefront divergence of image light outputted by the waveguide structure 1032 to the eye 210. It will be appreciated that the variable focus optical element 1530 may have optical power which may distort the eye 210's view of the world. Consequently, in some embodiments, a second variable focus optical element 1540 may be provided on the world side of the waveguide structure 1032. The second variable focus optical element 1540 may provide optical power opposite to that of the variable focus optical element 1530 (or opposite to the net optical power of the optical element 1530 and the waveguide structure 1032, where the waveguide structure 1032 has optical power), so that the net optical power of the variable focus lens elements 1530, 1540 and the waveguide structure 1032 is substantially zero.

Preferably, the optical power of the variable focus lens elements 1530, 1540 may be dynamically altered, for example, by applying an electrical signal thereto. In some embodiments, the variable focus lens elements 1530, 1540 may comprise a transmissive optical element such as a dynamic lens (e.g., a liquid crystal lens, an electro-active lens, a conventional refractive lens with moving elements, a mechanical-deformation-based lens, an electrowetting lens, an elastomeric lens, or a plurality of fluids with different refractive indices). By altering the variable focus lens elements' shape, refractive index, or other characteristics, the wavefront of incident light may be changed. In some embodiments, the variable focus lens elements 1530, 1540 may comprise a layer of liquid crystal sandwiched between two substrates. The substrates may comprise an optically transmissive material such as glass, plastic, acrylic, etc.

In some embodiments, in addition or as alternative to providing variable amounts of wavefront divergence for placing virtual content on different depth planes, the variable focus lens elements 1530, 1540 and waveguide structure 1032 may advantageously provide a net optical power equal to the user's prescription optical power for corrective lenses. Thus, the eyepiece 1020 may serve as a substitute for lenses used to correct for refractive errors, including myopia, hyperopia, presbyopia, and astigmatism. Further details regarding the use of variable focus lens elements as substitutes for corrective lenses may be found in U.S. application Ser. No. 15/481,255, filed Apr. 6, 2017, the entire disclosure of which is incorporated by reference herein.

With reference now to FIG. 31B, in some embodiments, the eyepiece 1020 may include static, rather than variable, lens elements. As with FIG. 31B, the waveguide structure 1032 may include a single waveguide (e.g., which may relay light of different colors) or a plurality of waveguides (e.g., each of which may relay light of a single component color). Similarly, the waveguide structure 1034 may include a single waveguide (e.g., which may relay light of different colors) or a plurality of waveguides (e.g., each of which may relay light of a single component color). The one or both of the waveguide structures 1032, 1034 may have optical power and may output light with particular amounts of wavefront divergence, or may simply output collimated light.

With continued reference to FIG. 31B, the eyepiece 1020 may include static lens elements 1532, 1534, 1542 in some embodiments. Each of these lens elements are disposed in the path of light from the ambient environment through waveguide structures 1032, 1034 into the eye 210. In addition, the lens element 1532 is between a waveguide structure 1003 2 and the eye 210. The lens element 1532 modifies a wavefront divergence of light outputted by the waveguide structure 1032 to the eye 210.

The lens element 1534 modifies a wavefront divergence of light outputted by the waveguide structure 1034 to the eye 210. It will be appreciated that the light from the waveguide structure 1034 also passes through the lens element 1532. Thus, the wavefront divergence of light outputted by the waveguide structure 1034 is modified by both the lens element 1534 and the lens element 1532 (and the waveguide structure 1032 in cases where the waveguide structure 1003 2 has optical power). In some embodiments, the lens elements 1532, 1534 and the waveguide structure 1032 provide a particular net optical power for light outputted from the waveguide structure 1034.

The illustrated embodiment provides two different levels of wavefront divergence, one for light outputted from the waveguide structure 1032 and a second for light outputted by a waveguide structure 1034. As a result, virtual objects may be placed on two different depth planes, corresponding to the different levels of wavefront divergence. In some embodiments, an additional level of wavefront divergence and, thus, an additional depth plane may be provided by adding an additional waveguide structure between lens element 1532 and the eye 210, with an additional lens element between the additional waveguide structure and the eye 210. Further levels of wavefront divergence may be similarly added, by adding further waveguide structures and lens elements.

With continued reference to FIG. 31B, it will be appreciated that the lens elements 1532, 1534 and the waveguide structures 1032, 1034 provide a net optical power that may distort the users view of the world. As a result, lens element 1542 may be used to counter the optical power and distortion of ambient light. In some embodiments, the optical power of the lens element 1542 is set to negate the aggregate optical power provided by the lens elements 1532, 1534 and the waveguide structures 1032, 1034. In some other embodiments, the net optical power of the lens element 1542; the lens elements 1532, 1534; and the waveguide structures 1032, 1034 is equal to a user's prescription optical power for corrective lenses.

With reference now to FIGS. 11A-31B, it will be appreciated that the illustrated components of any of the wearable display systems may be supported on the frame 80 (FIG. 9E). As such, these components may each be effectively mounted on the head of a user 90 as part of a wearable display system.

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the virtual content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A head-mounted display system comprising:
    a head-mountable frame;
    a plurality of emissive micro-displays supported by the frame, wherein the emissive micro-displays are configured to output image light;
    an eyepiece supported by the frame, wherein the eyepiece is configured to receive the image light from the emissive micro-displays and to direct the image light to an eye of a user upon mounting the frame on the user; and
    a plurality of arrays of light collimators, wherein each of the plurality of micro-displays has an associated array of light collimators that is configured to capture and reduce an angular emission profile of light from the respective micro-display.

2. The head-mounted display system of claim 1, further comprising an X-cube prism, wherein each of the emissive micro-displays face a different side of the X-cube prism.

3. The head-mounted display system of claim 2, wherein the emissive micro-displays are monochrome micro-displays.

4. The head-mounted display system of claim 1, wherein the emissive micro-displays comprise arrays of micro-LEDs.

5. The head-mounted display system of claim 1, wherein each micro-display comprises an array of light emitters, wherein each light emitter has an associated light collimator.

6. The head-mounted display system of claim 1, wherein each micro-display comprises rows of light emitters, wherein some rows of light emitters emit light of different colors than other rows of light emitters, and wherein light emitters of each row emit light of a same color.

7. The head-mounted display system of claim 6, wherein the light collimators comprise gratings elongated along a long axis of an associated row of light emitters.

8. The head-mounted display system of claim 1, further comprising a waveguide assembly comprising one or more waveguides, each waveguide comprising:
   an in-coupling optical element configured to in-couple light from the micro-display into the waveguide; and
   an out-coupling optical element configured to out-couple in-coupled light out of the waveguide.

9. The head-mounted display system of claim 8, wherein the waveguide assembly is configured to output the out-coupled light with variable amounts of wavefront divergence corresponding to a plurality of depth planes.

10. The head-mounted display system of claim 9, wherein the waveguide assembly comprises a plurality of sets of waveguides, wherein each set of waveguides comprises a dedicated waveguide for a component color, wherein each set of waveguides comprises out-coupling optical elements configured to output light with wavefront divergence corresponding to a common depth plane, wherein different sets of waveguides output light with different amounts of wavefront divergence corresponding to different depth planes.

11. The head-mounted display system of claim 9, further comprising variable focus lens elements, wherein the waveguide assembly is between first and second variable focus lens elements, wherein the first variable focus lens element is configured to modify a wavefront divergence of light outputted by the waveguide assembly, wherein the second variable focus lens element is configured to modify a wavefront divergence of light from an external world to the second variable focus lens element.

12. The head-mounted display system of claim 8, wherein the waveguide assembly comprises a stack of waveguides, wherein the plurality of emissive micro-displays are configured to output light of a plurality of component colors, wherein the waveguide assembly comprises at least one dedicated waveguide for light of each component color.

13. The head-mounted display system of claim 12, further comprising:
   an X-cube prism, wherein each of the emissive micro-displays face a different side of the X-cube prism; and
   projection optics configured to receive light from the X-cube prism and to converge the received light towards the waveguide assembly.

14. The head-mounted display system of claim 13, wherein the in-coupling optical elements of at least two waveguides are laterally offset as seen in a head-on view in a direction of light propagating to the in-coupling optical elements, wherein at least one of the arrays of light collimators is configured to direct light into a corresponding side of the X-cube prism at a non-normal angle relative to the corresponding side, and wherein light passing through the at least one of the light collimators converges on a corresponding in-coupling optical element while light passing through an other of the light collimators converges on a different in-coupling optical element.

15. The head-mounted display system of claim 12, further comprising a color filter between two neighboring waveguides of the stack of waveguides, wherein a first of the neighboring waveguides precedes a second of the neighboring waveguides in a light path extending from the micro-display, wherein the color filter is configured to selectively absorb light of a wavelength corresponding to a wavelength of light configured to be in-coupled by the in-coupling optical element of the first of the neighboring waveguides.

16. The head-mounted display system of claim 15, further comprising:
   a third waveguide following the second of the neighboring waveguides in the light path; and
   an other color filter configured to selectively absorb light of a wavelength corresponding to a wavelength of light configured to be in-coupled by the in-coupling optical element of the second of the neighboring waveguides.

17. The head-mounted display system of claim 12, wherein positions of the in-coupling optical elements of each waveguide of the waveguide assembly overlap as seen in a head-on view in a direction of light propagating to the in-coupling optical elements.

18. The head-mounted display system of claim 12, further comprising absorptive color filters on major surfaces of at least some of the waveguides, wherein the absorptive color filters on major surfaces of a waveguide are configured to absorb light of wavelengths in-coupled into a corresponding waveguide.

19. The head-mounted display system of claim 8, wherein each in-coupling optical element is configured to in-couple light with the in-coupled light propagating generally in a propagation direction through an associated waveguide, wherein the in-coupling optical element occupies an area having a width parallel to the propagation direction and a length along an axis crossing the propagation direction, wherein the length is greater than the width.

* * * * *